(12) United States Patent
Negoro et al.

(10) Patent No.: US 6,726,966 B2
(45) Date of Patent: Apr. 27, 2004

(54) PROCESS FOR VERTICAL ALIGNMENT OF ROD-LIKE LIQUID CRYSTAL MOLECULES

(75) Inventors: Masayuki Negoro, Kanagawa (JP); Ken Kawata, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 17 days.

(21) Appl. No.: 10/108,374

(22) Filed: Mar. 29, 2002

(65) Prior Publication Data
US 2003/0003246 A1 Jan. 2, 2003

(30) Foreign Application Priority Data

Mar. 30, 2001 (JP) ......................... 2001-101908

(51) Int. Cl.$^7$ .................. C09K 19/56; C09K 19/02; C09K 19/04
(52) U.S. Cl. ................... 428/1.23; 428/1.2; 252/299.4; 252/299.6; 252/299.61; 252/299.62; 252/299.63
(58) Field of Search .................. 428/1.1, 1.2, 1.21, 428/1.23, 1.25, 1.26, 1.27, 1.28, 421, 446, 447, 448; 252/299.01, 299.4, 299.1, 299.2, 299.3, 299.5, 299.6, 299.61, 299.62, 299.63, 299.64, 299.65, 299.66, 299.67, 299.68, 299.7

(56) References Cited

U.S. PATENT DOCUMENTS

2002/0039627 A1 * 4/2002 Ichihasi et al. ............... 428/1.1

* cited by examiner

Primary Examiner—Robert Dawson
Assistant Examiner—Michael J. Feely
(74) Attorney, Agent, or Firm—Burns, Doane, Swecker & Mathis, LLP

(57) ABSTRACT

A process for alignment of rod-like liquid crystal molecules comprises the steps of: forming an orientation layer for vertical alignment on a support; and forming a liquid crystal layer containing rod-like liquid crystal molecules on the orientation layer to align the rod-like liquid crystal molecules at an average inclined angle of 50 to 90°. The liquid crystal layer further contains a compound represented by the formula (I):

$$(Hb-L^1-Cy^1-L^2-)_n Cy^2 \qquad (I)$$

wherein Hb is an aliphatic group having 6 to 40 carbon atoms or an siloxanoxy group substituted with an aliphatic group having 6 to 40 carbon atoms, each of $L^1$ and $L^2$ is a single bond or a divalent linking group, $Cy^1$ is a divalent aromatic group or a divalent heterocyclic group, n is 2, 3 or 4, and $Cy^2$ is an n-valent aromatic group or an n-valent heterocyclic group.

16 Claims, No Drawings

PROCESS FOR VERTICAL ALIGNMENT OF ROD-LIKE LIQUID CRYSTAL MOLECULES

FIELD OF THE INVENTION

The present invention relates to a process for alignment of rod-like liquid crystal molecules at an average inclined angle of 50° to 90°. The invention also relates to an optically anisotropic element in which rod-like liquid crystal molecules are aligned at an average inclined angle of 50° to 90°.

BACKGROUND OF THE INVENTION

A liquid crystal display of transmission type comprises a liquid crystal cell provided between two polarizing plates. A liquid crystal display of reflection type comprises a reflection plate, a liquid crystal cell and a polarizing plate in this order.

The liquid crystal cell comprises rod-like liquid crystal molecules provided between a pair of substrates. The liquid crystal cell further comprises an electrode layer, which has a function of applying a voltage to the rod-like liquid crystal molecules. Each of the substrates has an orientation layer by which the rod-like liquid crystal molecules are aligned. The rod-like liquid crystal molecules are placed between two orientation layers. It is relatively easy to control alignment of the liquid crystal molecules by using the two orientation layers.

The liquid crystal display preferably further comprises an optical compensatory sheet (phase retarder) between the liquid crystal cell and the polarizing plate. The optical compensatory sheet has a function of preventing the displayed image from undesirable coloring. The optical compensatory sheet has another function of enlarging a viewing angle of the liquid crystal cell.

A stretched birefringent polymer film has been conventionally used as the optical compensatory sheet. An optically anisotropic element using liquid crystal molecules has recently been used as the optical compensatory sheet in place of the stretched birefringent polymer film. The optically anisotropic element comprises a transparent support and an optically anisotropic layer, which is formed from liquid crystal molecules.

The liquid crystal molecules are aligned in the optically anisotropic element, and alignment is fixed to form the optically anisotropic layer. An orientation layer is provided between the transparent support and the optically anisotropic layer to align the liquid crystal molecules.

SUMMERY OF THE INVENTION

It is difficult for only one orientation layer to align rod-like liquid crystal molecules evenly and essentially vertically from the interface with the orientation layer to the interface with air.

An object of the present invention is to align rodlike liquid crystal molecules evenly and essentially vertically from the interface with the orientation layer to the interface with air Another object of the invention is to provide an optically anisotropic element in which rod-like liquid crystal molecules are evenly and essentially vertically aligned.

The present invention provides a process for alignment of rod-like liquid crystal molecules, which comprises the steps of: forming an orientation layer for vertical alignment on a support; and forming a liquid crystal layer containing rod-like liquid crystal molecules and a compound represented by the formula (I) on the orientation layer to align the rod-like liquid crystal molecules at an average inclined angle of 50 to 90°:

$$(Hb-L^1-Cy^1-L^2-)_nCy^2 \qquad (I)$$

in which Hb is an aliphatic group having 6 to 40 carbon atoms or an siloxanoxy group substituted with an aliphatic group having 6 to 40 carbon atoms; $L^1$ is a single bond or a divalent linking group selected from the group consisting of an alkylene group, a fluorine-substituted alkylene group, —O—, —S—, —CO—, —NR—, —SO$_2$— and a combination thereof, wherein R is hydrogen or an alkyl group having 1 to 30 carbon atoms; $Cy^1$ is a divalent aromatic group or a divalent heterocyclic group; $L^2$ is a single bond or a divalent linking group selected from the group consisting of an alkylene group, an alkenylene group, an alkynylene group, —O—, —S—, —CO—, —NR—, —SO$_2$— and a combination thereof, wherein R is hydrogen or an alkyl group having 1 to 30 carbon atoms; n is 2, 3 or 4; and $Cy^2$ is an n-valent aromatic group or an n-valent heterocyclic group.

The invention also provides an optically anisotropic element comprising a transparent support and a liquid crystal layer containing rod-like liquid crystal molecules, wherein the rod-like liquid crystal molecules are aligned at an average inclined angle of 50 to 90°, and the liquid crystal layer further contains a compound represented by the formula (I) in an amount of 0.01 to 20 wt. % based on the amount of the liquid crystal molecules.

In the present specification, the term "average inclined angle" of the rod-like liquid crystal molecules means an average angle between the long axes of the molecules and the surface of the support (or the surface of the orientation layer). Further, the essentially vertical alignment (homeotropic alignment) of the rod-like liquid crystal molecules means that the molecules are aligned at an average inclined angle of 50 to 90°.

The term "orientation layer for vertical alignment" means an orientation layer that has a function of essentially vertically aligning the rod-like liquid crystal molecules placed near the orientation layer.

In the case where rod-like liquid crystal molecules are placed between two orientation layers (for example, in a liquid crystal cell), the liquid crystal molecules do not have a free interface (interface with air). Therefore, it is easy to control the alignment of the liquid crystal molecules by the two orientation layers. In contrast, various alignment defects are often observed on the free interface where only one orientation layer is used. Since the liquid crystal molecules near the free interface are not forced to align, it is very difficult to evenly align the molecules without causing any alignment defects. Further, the alignment of the rod-like liquid crystal molecules near the free interface is often perturbed to form aligning defects, since the free interface is exposed to outer stimuli such as uneven solvent evaporation or air blow for drying.

The applicants have found that a compound represented by the formula (I) can control the alignment of rod-like liquid crystal molecules near the free interface even if there is only one orientation layer. The compound of the formula (I) comprises a hydrophobic group (Hb) connecting to plural cyclic structures ($Cy^1$ and $Cy^2$) showing excluded volume effect.

The compound represented by the formula (I) is mixed with rod-like liquid crystal molecules to prepare a coating solution, which is then applied on the orientation layer (on the support). After that, the compound of the formula (I) can be thickly placed near the free interface. The compound of the formula (I) is not incompatible the rod-like liquid crystal molecules. Therefore, the compound and the rod-like liquid crystal molecules cause a phase separation. The separated compound is placed near the free interface. The hydrophobic group (Hb) in the compound causes the phase separation with the liquid crystal molecules. The phase separation is clearly observed where the hydrophobic group (Hb) is a fluorine-substituted aliphatic group.

Further, the compound must have a relatively rigid part whose polarization is similar to that of the rod-like liquid crystal molecules to promote vertical alignment of rod-like liquid crystal molecules. The plural cyclic structures ($Cy^1$ and $Cy^2$) showing excluded volume effect play the role of that part.

Accordingly, the compound represented by the formula (I) is used as an alignment promoter in the present invention. Therefore, the rod-like liquid crystal molecules are evenly and essentially vertically aligned even near the free interface, where an orientation layer is not provided.

DETAILED DESCRIPTION OF THE INVENTION

[Alignment Promoter]

In the present invention, the compound represented by the formula (I) is used as an alignment promoter for liquid crystal.

$$(Hb-L^1-Cy^1-L^2-)_n Cy^2 \qquad (I)$$

In the formula (I), Hb is an aliphatic group having 6 to 40 carbon atoms or a siloxanoxy group substituted with an aliphatic group having 6 to 40 carbon atoms. The group of Hb preferably is an aliphatic group having 6 to 40 carbon atoms, more preferably is a fluorine-substituted aliphatic group having 6 to 40 carbon atoms or branched aliphatic group having 6 to 40 carbon atoms, and most preferably is a fluorine-substituted alkyl group having 6 to 40 carbon atoms or branched alkyl group having 6 to 40 carbon atoms.

An aliphatic group having a chain structure is preferred to a cyclic aliphatic group. The chain structure of the aliphatic group can be branched. The aliphatic group preferably has 7 to 35 carbon atoms, more preferably has 8 to 30 carbon atoms, further preferably has 9 to 25 carbon atoms, and most preferably has 10 to 20 carbon atoms.

The aliphatic group means an alkyl group, a substituted alkyl group, an alkenyl group, a substituted alkenyl group, an alkynyl group or a substituted alkynyl group. An alkyl group, a substituted alkyl group, an alkenyl group and a substituted alkenyl group are preferred. An alkyl group and a substituted alkyl group are more preferred.

Examples of the substituent groups of the aliphatic groups include a halogen atom, hydroxyl, cyano, nitro, an alkyl group (preferably having 1 to 5 carbon atoms), an alkoxy group, a substituted alkoxy group (e.g., an oligoalkoxy group), an alkenyloxy group (e.g., vinyloxy), an acyl group (e.g., acryloyl, methacryloyl), an acyloxy group (e.g., acryloyloxy, benzoyloxy), sulfamoyl, an aliphatic substituted sulfamoyl group and an epoxy group (e.g., epoxyethyl). A halogen atom is preferred, and fluorine is more preferred.

In the fluorine-substituted aliphatic group, hydrogen atoms are substituted with fluorine atoms in a ratio of preferably 50 to 100%, more preferably 60 to 100%, further preferably 70 to 100%, furthermore preferably 80 to 100%, and most preferably 85 to 100%.

The siloxanoxy group substituted with an aliphatic group preferably has 7 to 35 carbon atoms, more preferably has 8 to 30 carbon atoms, further preferably has 9 to 25 carbon atoms, and most preferably has 10 to 20 carbon atoms.

The siloxanoxy group substituted with an aliphatic group is represented by the following formula.

$$R^1-(SiR^2{}_2-O)_q-$$

In the formula, $R^1$ is hydrogen, hydroxyl or an aliphatic group; $R^2$ is hydrogen, an aliphatic group or an alkoxy group; and q is an integer of 1 to 12.

An aliphatic group having a chained structure is preferred to a cyclic aliphatic group. The chain structure of the aliphatic group can be branched. The aliphatic group preferably has 1 to 12, more preferably has 1 to 8, further preferably has 1 to 6, and most preferably has 1 to 4 carbon atoms.

The aliphatic group means an alkyl group, a substituted alkyl group, an alkenyl group, a substituted alkenyl group, an alkynyl group or a substituted alkynyl group. An alkyl group, a substituted alkyl group, an alkenyl group and a substituted alkenyl group are preferred. An alkyl group and a substituted alkyl group are more preferred.

Examples of the substituent groups of the aliphatic groups include a halogen atom, hydroxyl, cyano, nitro, an alkoxy group, a substituted alkoxy group (e.g., an oligoalkoxy group), an alkenyloxy group (e.g., vinyloxy), an acyl group (e.g., acryloyl, methacryloyl), an acyloxy group (e.g., acryloyloxy, benzoyloxy), sulfamoyl, an aliphatic substituted sulfamoyl group and an epoxy group (e.g., epoxyethyl).

The alkoxy group can have a cyclic or branched structure. The alkoxy group preferably has 1 to 12 carbon atoms, more preferably has 1 to 8 carbon atoms, further preferably has 1 to 6 carbon atoms, and most preferably has 1 to 4 carbon atoms.

Examples of Hb are shown below.

Hb1: n-$C_{16}H_{33}$—
Hb2: n-$C_{20}H_{41}$—
Hb3: n-$C_6H_{13}$—CH(-n-$C_4H_9$)—$CH_2$—$CH_2$—
Hb4: n-$C_{12}H_{25}$—
Hb5: n-$C_{18}H_{37}$—
Hb6: n-$C_{14}H_{29}$—
Hb7: n-$C_{15}H_{31}$—
Hb8: n-$C_{10}H_{21}$—
Hb9: n-$C_{10}H_{21}$—CH(n-$C_4H_9$)—$CH_2$—$CH_2$—
Hb10: n-$C_8F_{17}$—
Hb11: n-$C_8H_{17}$—
Hb12: CH(—$CH_3$)$_2$—{—$C_3H_6$—CH(—$CH_3$)—}$_3$—$C_2H_4$—
Hb13: CH(—$CH_3$)$_2$—{—$C_3H_6$—CH(—$CH_3$)—}$_2$—$C_3H_6$—C(—$CH_3$)=CH—$CH_2$—
Hb14: n-$C_8H_{17}$—CH (-n-$C_6H_{l3}$)—$CH_2$—$CH_2$—
Hb15: n-$C_6H_{13}$—CH(—$C_2H_5$)—$CH_2$—$CH_2$—
Hb16: n-$C_8F_{17}$—CH(-n-$C_4F_9$)—$CH_2$—
Hb17: n-$C_8F_{17}$—CF(-n-$C_6F_{l3}$)—$CF_2$—$CF_2$—
Hb18: n-$C_3F_7$—CF(—$CF_3$)—$CF_2$—
Hb19: Si(—$CH_3$)$_3$—{—Si(—$CH_3$)$_2$—O—}$_6$—O—
Hb20: Si(—$OC_3H_7$) (—$C_{16}F_{33}$) (—$C_2H_4$—$SO_2$—NH—$C_8F_{17}$)—O—

In the formula (I), $L^1$ is a single bond or a divalent linking group selected from the group consisting of an alkylene group, a fluorine-substituted alkylene group, —O—, —S—, —CO—, —NR—, —$SO_2$— and a combination thereof. R is hydrogen or an alkyl group having 1 to 30 carbon atoms. $L^1$ preferably is a divalent linking group selected from the group consisting of an alkylene group, —O—, —S—, —CO—, —NR—, —SO$_2$— and a combination thereof. R preferably is hydrogen or an alkyl group having 1 to 20 carbon atoms, more preferably is hydrogen or an alkyl group having 1 to 15 carbon atoms, and most preferably is hydrogen or an alkyl group having 1 to 12 carbon atoms.

The alkylene group or the fluorine-substituted alkylene group preferably has 1 to 40 carbon atoms, more preferably has 1 to 30 carbon atoms, further preferably has 1 to 20 carbon atoms, furthermore preferably has 1 to 15 carbon atoms, and most preferably has 1 to 12 carbon atoms.

Examples of $L^1$ are shown below. In each of the examples, the left side is attached to Hb, and the right side is attached to $Cy^1$.

L10: a single bond
L11: —O—
L12: —O—CO—
L13: —O—C$_4$H$_8$—CO—
L14: —O—C$_2$H$_4$—O—C$_2$H$_4$—O—
L15: —S—
L16: —N(n-C$_{12}$H$_{25}$)—
L17: —O—CH$_2$CH$_2$—N(n-C$_3$H$_7$)—SO$_2$—
L18: —CF(CF$_3$)—{O—CF$_2$—CF(CF$_3$)}$_3$—O—

In the formula (I), $Cy^1$ is a divalent aromatic group or a divalent heterocyclic group. $Cy^1$ preferably is a divalent aromatic (hydrocarbon) group.

The term "divalent aromatic group" means an arylene group and a substituted arylene group.

Examples of the arylene groups include phenylene, indenylene, naphthylene, fluorenylene, phenanthrenylene, anthracenylene and pyrenylene. Phenylene and naphthylene are preferred.

Examples of the substituent groups of the substituted arylene groups include an aliphatic group, an aromatic group, a heterocyclic group, a halogen atom, an alkoxy group (e.g., methoxy, ethoxy, methoxyethoxy), an aryloxy group (e.g., phenoxy), an arylazo group (e.g., phenylazo), an alkylthio group (e.g., methylthio, ethylthio, propylthio), an alkylamino group (e.g., methylamino, propylamino), an acyl group (e.g., acetyl, propanoyl, octanoyl, benzoyl), an acyloxy group (e.g., acetoxy, pivaloyloxy, benzoyloxy), hydroxyl, mercapto, amino, carboxyl, sulfo, carbamoyl, sulfamoyl and ureido.

In the case that the divalent aromatic group is connected to another aromatic ring as a substituent group through a single bond, a vinylene bond or an ethynylene bond, the compound can function as an alignment promoter of liquid crystal molecules.

The compound can have a group corresponding to Hb—$L^1$— as a substituent group.

The divalent heterocyclic group preferably has a five-membered, six-membered or seven-membered heterocyclic ring, more preferably has a five-membered or six-membered heterocyclic ring, and most preferably six-membered heterocyclic ring. The hetero-atom in the heterocyclic group preferably is nitrogen, oxygen or sulfur.

The heterocyclic ring preferably is an aromatic heterocyclic ring, which is generally unsaturated. The aromatic heterocyclic ring usually has the maximum number of double bonds.

Examples of the heterocyclic rings include furan ring, thiophene ring, pyrrole ring, pyrroline ring, pyrrolidine ring, oxazole ring, isoxazole ring, thiazole ring, isothiazole ring, imidazole ring, imidazoline ring, imidazolidine ring, pyrazole ring, pyrazoline ring, pyrazolidine ring, triazole ring, furazan ring, tetrazole ring, pyran ring, thiin ring, pyridine ring, piperidine ring, oxazine ring, morpholine ring, thiazine ring, pyridazine ring, pyrimidine ring, pyrazine ring, piperazine ring and triazine ring.

The heterocyclic ring can be condensed with another heterocyclic ring, an aliphatic ring or an aromatic ring. Examples of the condensed rings include benzofuran ring, iso benzofuran ring, benzothiophene ring, indole ring, indoline ring, isoindole ring, benzoxazole ring, benzothiazole ring, indazole ring, benzimidazole ring, chromene ring, chroman ring, isochroman ring, quinoline ring, isoquinoline ring, cinnoline ring, phthalazine ring, quinazoline ring, quinoxaline ring, dibenzofuran ring, carbazole ring, xanthene ring, acridine ring, phenanthridine ring, phenanthroline ring, phenazine ring, phenoxazine ring, thianthrene ring, indolidine ring, quinolizine ring, quinuclidine ring, naphthyridine ring, purine ring and pteridine ring.

The divalent heterocyclic group may have a substituent group. Examples of the substituent group are the same as those of the substituted arylene group.

The hetero-atom in the divalent heterocyclic group (for example, nitrogen in piperazine ring) can connect to $L^2$ or the central cyclic group ($Cy^2$) where $L^2$ is a single bond. Further, the connecting hetero-atom can form an onium salt (e.g., oxonium salt, sulfonium salt, ammonium salt).

The cyclic structures of $Cy^1$ and $Cy^2$ (described after) can form a plane structure (namely, a discotic structure).

Examples of $Cy^1$ are shown below. In the case that two or more groups corresponding to Hb—$L^1$— connect to the divalent aromatic or heterocyclic group, one is the Hb—$L^1$— defined by the formula (I) and the others are substituent groups of the divalent aromatic or heterocyclic group.

Cy 101:

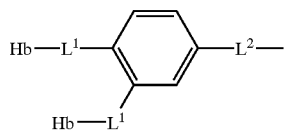

Cy 102:

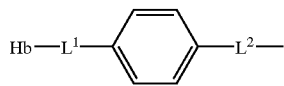

Cy 103:

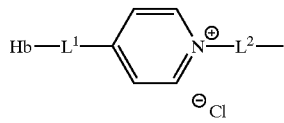

Cy 104:

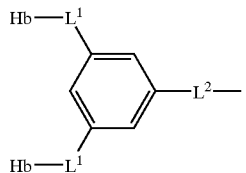

Cy 105:
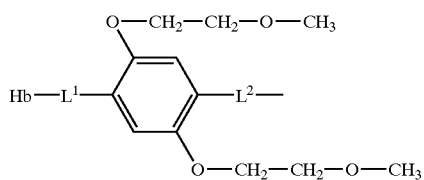
Cy 106:
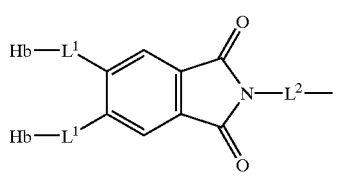
Cy 107:
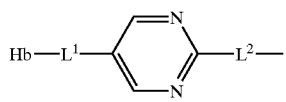
Cy 108:
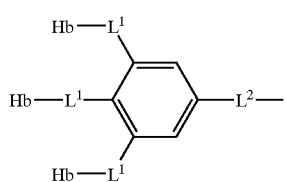
Cy 109:
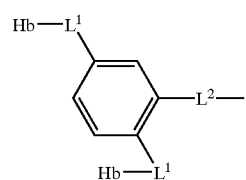
Cy 110:
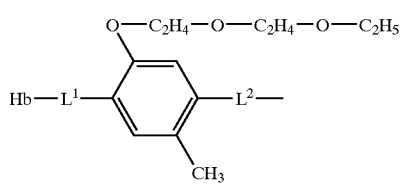
Cy 111:
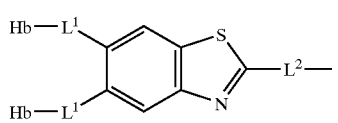
Cy 112:
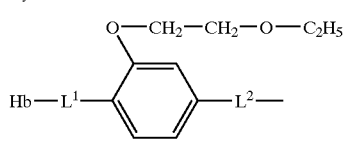
Cy 113:
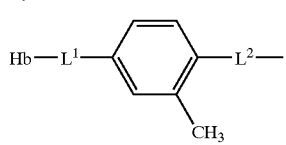
Cy 114:
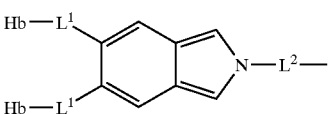
Cy 115:
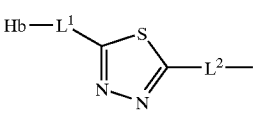
Cy 116:
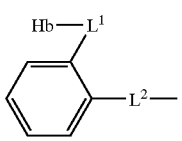
Cy 117:
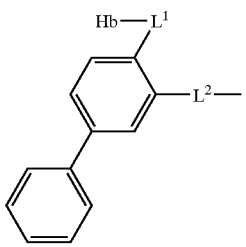
Cy 118:
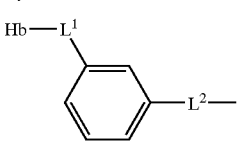
Cy 119:
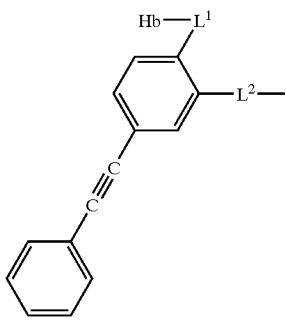
Cy 120:
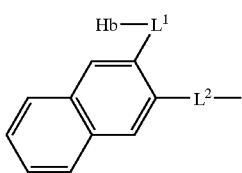

Cy 121:

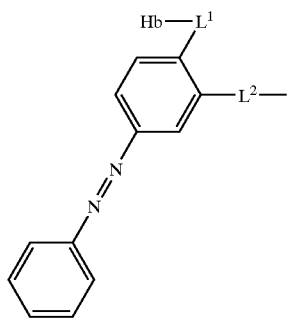

In the formula (I), $L^2$ is a single bond or a divalent linking group selected from the group consisting of an alkylene group, an alkenylene group, an alkynylene group, —O—, —S—, —CO—, —NR—, —SO$_2$— and a combination thereof. R is hydrogen or an alkyl group having 1 to 30 carbon atoms. $L^2$ preferably is a divalent linking group selected from the group consisting of —O—, —S—, —CO—, —NR—, —SO$_2$— and a combination thereof. R preferably is hydrogen or an alkyl group having 1 to 20 carbon atoms, more preferably is hydrogen or an alkyl group having 1 to 15 carbon atoms, and most preferably is hydrogen or an alkyl group having 1 to 12 carbon atoms.

The alkylene group preferably has 1 to 40 carbon atoms, more preferably has 1 to 30 carbon atoms, further preferably has 1 to 20 carbon atoms, furthermore preferably has 1 to 15 carbon atoms, and most preferably has 1 to 12 carbon atoms.

The alkenylene group or the alkynylene group preferably has 2 to 40 carbon atoms, more preferably has 2 to 30 carbon atoms, further preferably has 2 to 20 carbon atoms, furthermore preferably has 2 to 15 carbon atoms, and most preferably has 2 to 12 carbon atoms.

Examples of $L^2$ are shown below. In each of the examples, the left side is attached to $Cy^1$, and the right side is attached to $Cy^2$.

L20: a single bond
L21: —S—
L22: —NH—
L23: —NH—SO$_2$—NH—
L24: —NH—CO—NH—
L25: —SO$_2$—
L26: —O—NH—
L27: —C≡C—
L28: —CH=CH—S—
L29: —CH$_2$—O—
L30: —N(CH$_3$)—
L31: —CO—O—

In the formula (I), n is 2, 3 or 4, preferably is 3 or 4.

In the formula (I), $Cy^2$ is an n-valent aromatic group or an n-valent heterocyclic group.

Examples of the aromatic rings in the aromatic groups include benzene ring, indene ring, naphthalene ring, fluorene ring, phenanthrene ring, anthracene ring and pyrene ring. Benzene ring and naphthalene ring are preferred, and benzene ring is most preferred.

The aromatic group may have a substituent group. Examples of the substituent groups include an aliphatic group, an aromatic group, a heterocyclic group, a halogen atom, an alkoxy group (e.g., methoxy, ethoxy, methoxyethoxy), an aryloxy group (e.g., phenoxy), an arylazo group (e.g., phenylazo), an alkylthio group (e.g., methylthio, ethylthio, propylthio), an alkylamino group (e.g., methylamino, propylamino), an arylamino group (e.g., phenylamino), an acyl group (e.g., acetyl, propanoyl, octanoyl, benzoyl), an acyloxy group (e.g., acetoxy, pivaloyloxy, benzoyloxy), hydroxyl, mercapto, amino, carboxyl, sulfo, carbamoyl, sulfamoyl and ureido.

The heterocyclic group preferably has a five-membered, six-membered or seven-membered heterocyclic ring, more preferably has a five-membered or six-membered heterocyclic ring, and most preferably has a six-membered heterocyclic ring. The hetero-atom in the heterocyclic group preferably is nitrogen, oxygen or sulfur.

The heterocyclic ring preferably is an aromatic heterocyclic ring, which is generally unsaturated. The aromatic heterocyclic ring usually has the maximum number of double bonds.

Examples of the heterocyclic ring include furan ring, thiophene ring, pyrrole ring, pyrroline ring, pyrrolidine ring, oxazole ring, isoxazole ring, thiazole ring, isothiazole ring, imidazole ring, imidazoline ring, imidazolidine ring, pyrazole ring, pyrazoline ring, pyrazolidine ring, triazole ring, furazan ring, tetrazole ring, pyran ring, thiin ring, pyridine ring, piperidine ring, oxazine ring, morpholine ring, thiazine ring, pyridazine ring, pyrimidine ring, pyrazine ring, piperazine ring and triazine ring. Triazine ring is preferred, and 1,3,5-triazine ring is particularly preferred.

The heterocyclic ring can be condensed with another heterocyclic ring, an aliphatic ring or an aromatic ring. The heterocyclic ring preferably is a monocyclic ring.

Examples of $Cy^2$ are shown below.

Cy201(n = 4):

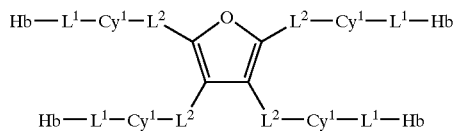

Cy202(n = 4):

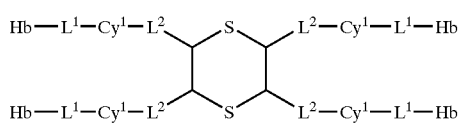

Cy203(n = 4):

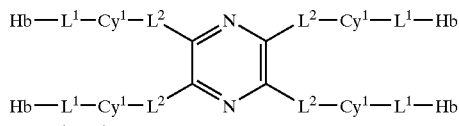

Cy204(n = 3):

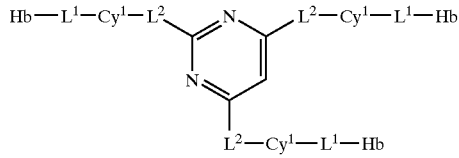

Cy205(n = 3):

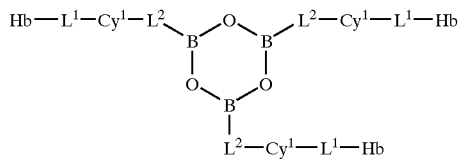

Cy206(n = 3):
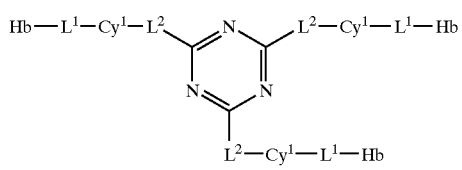
Cy207(n = 3):
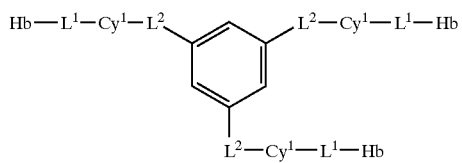
Cy208(n = 2):
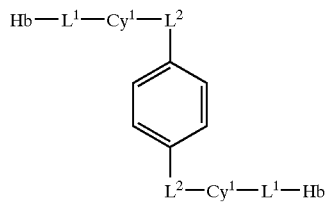
Cy209(n = 2):
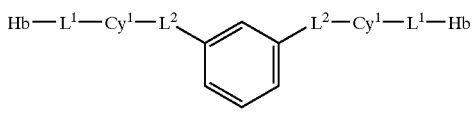
Cy210(n = 2):
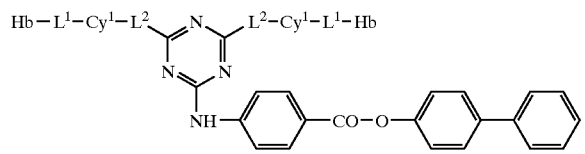
Cy211(n = 2):
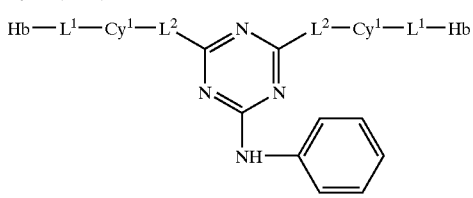
The alignment promoter is a compound in which the hydrophobic group (Hb), the linking groups ($L^1$, $L^2$) and the cyclic groups ($Cy^1$, $Cy^2$) are combined. There is no specific limitation with respect to the combination of the groups.
Examples of the alignment promoter represented by the formula (I) are shown below.
(1)
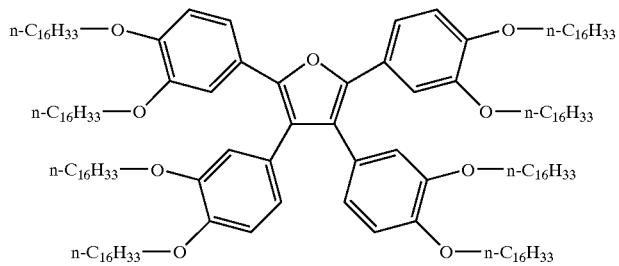
(2)
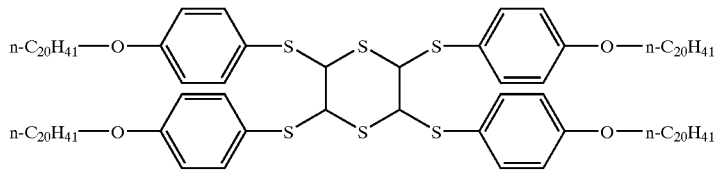
(3)
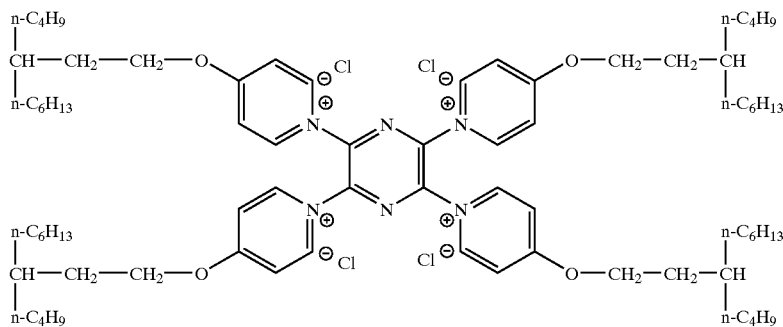

-continued
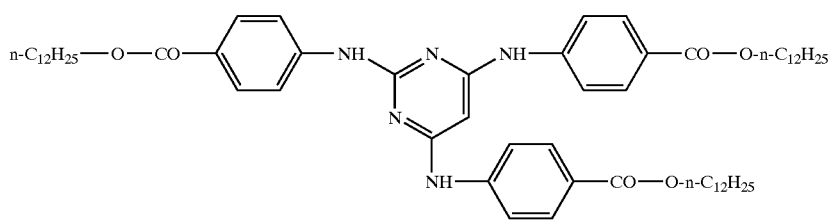
(4)
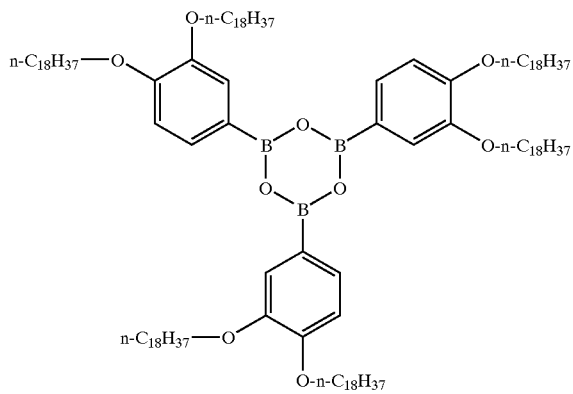
(5)
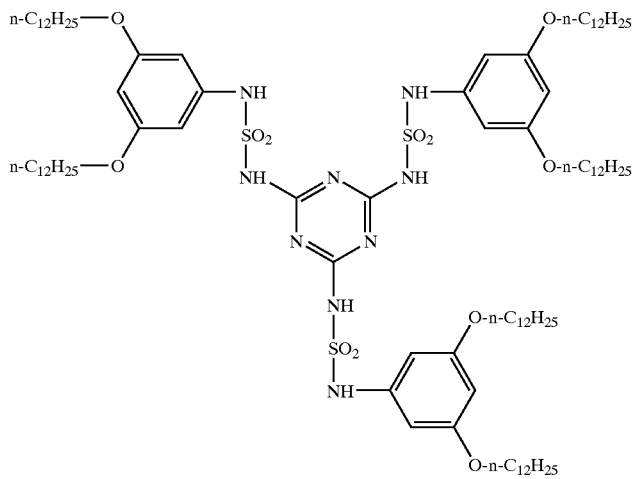
(6)
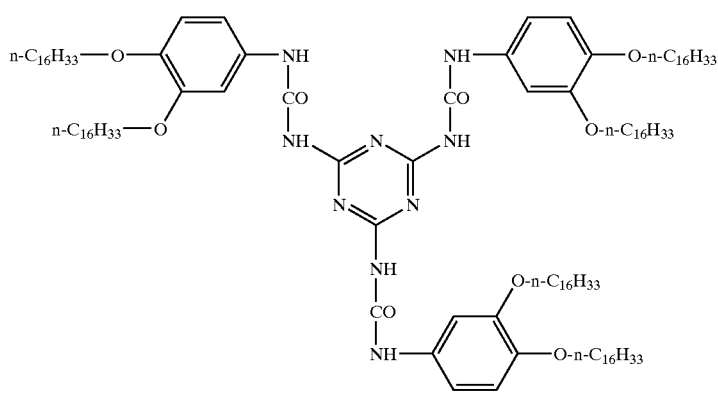
(7)

(8)
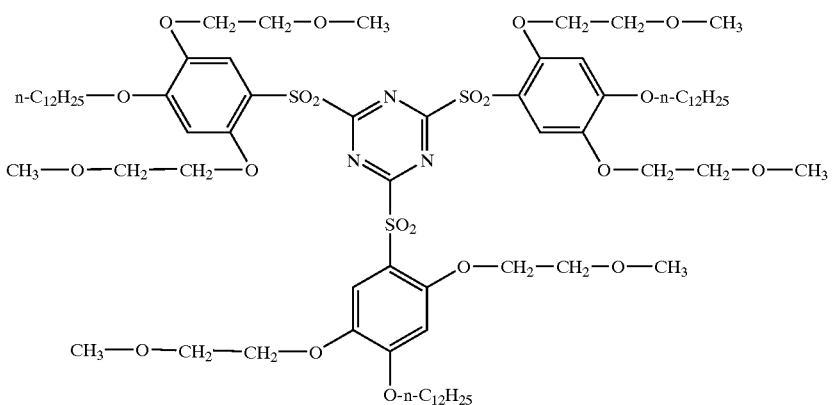
(9)
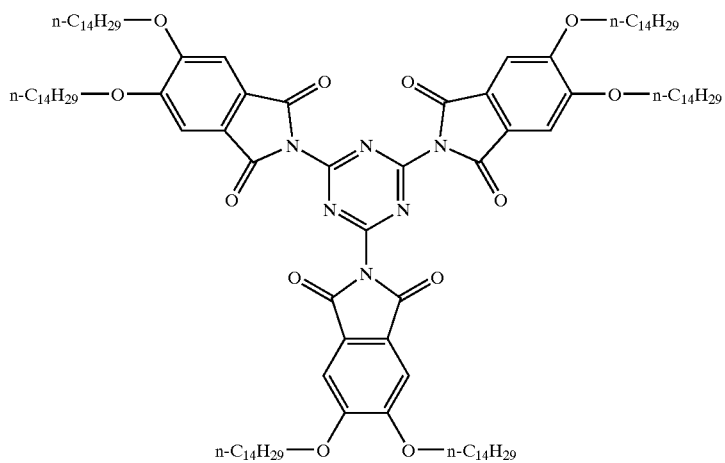
(10)
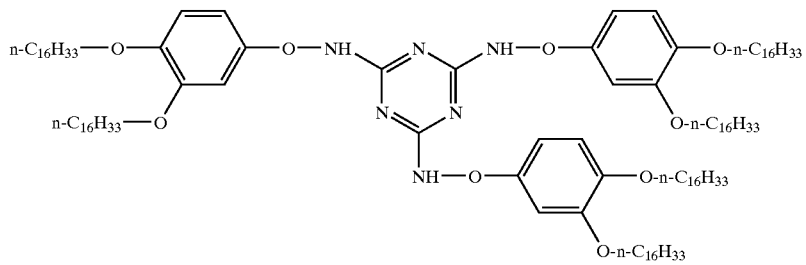
(11)
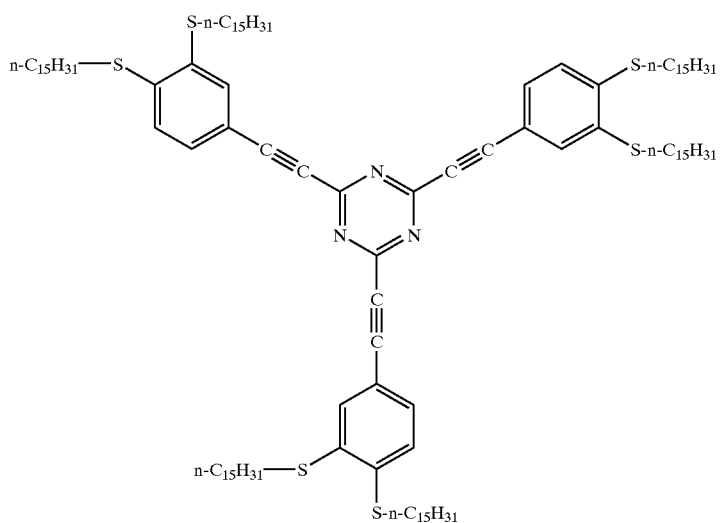

-continued
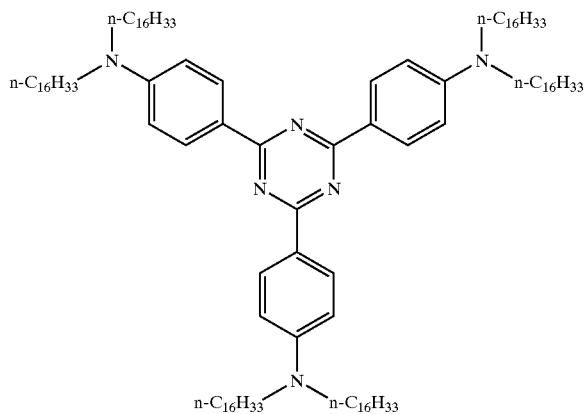
(12)
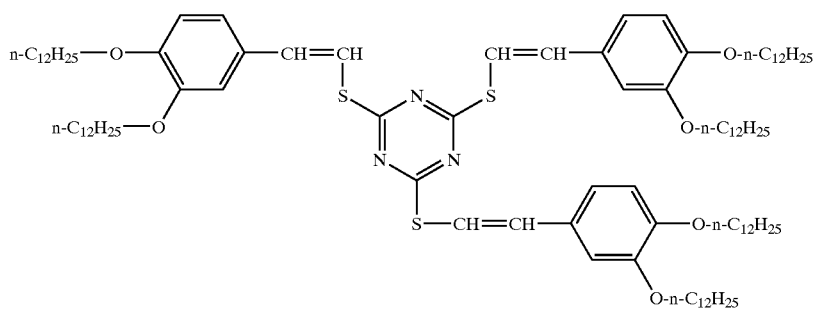
(13)
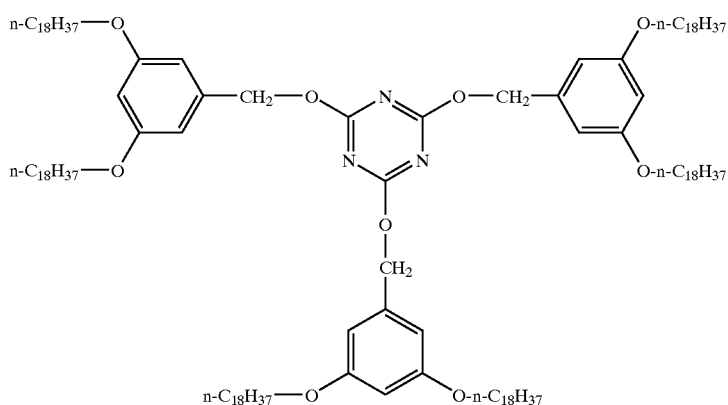
(14)
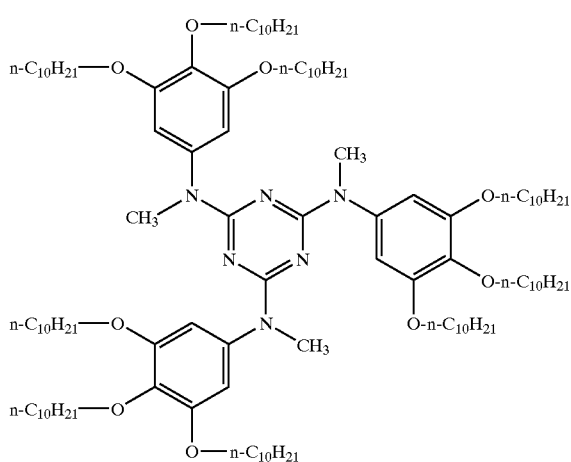
(15)

(16)
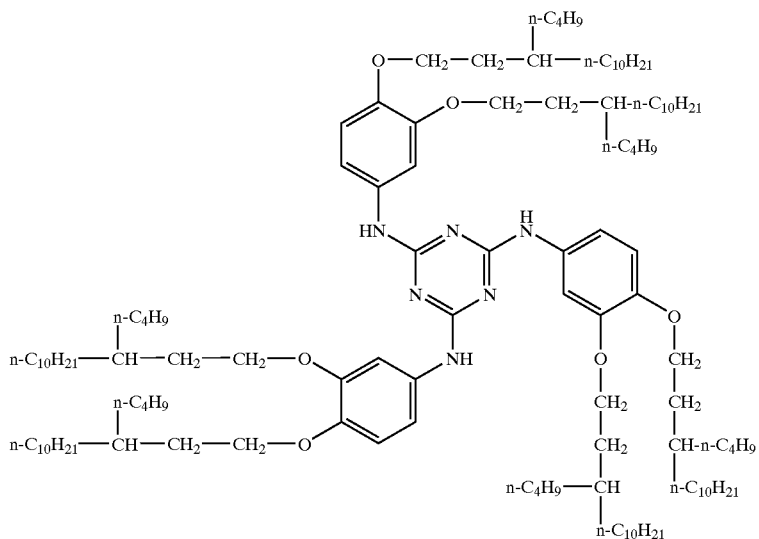
(17)
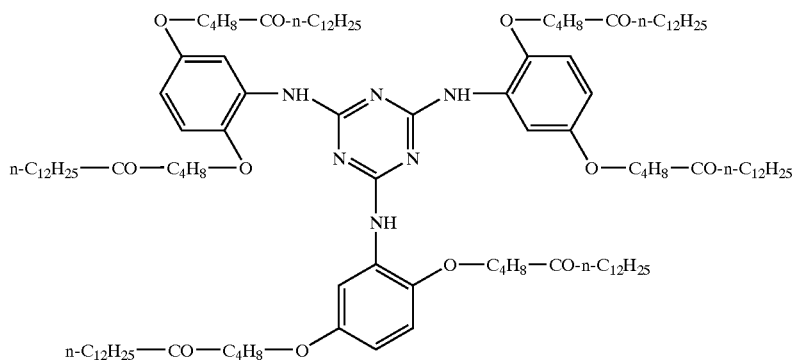
(18)
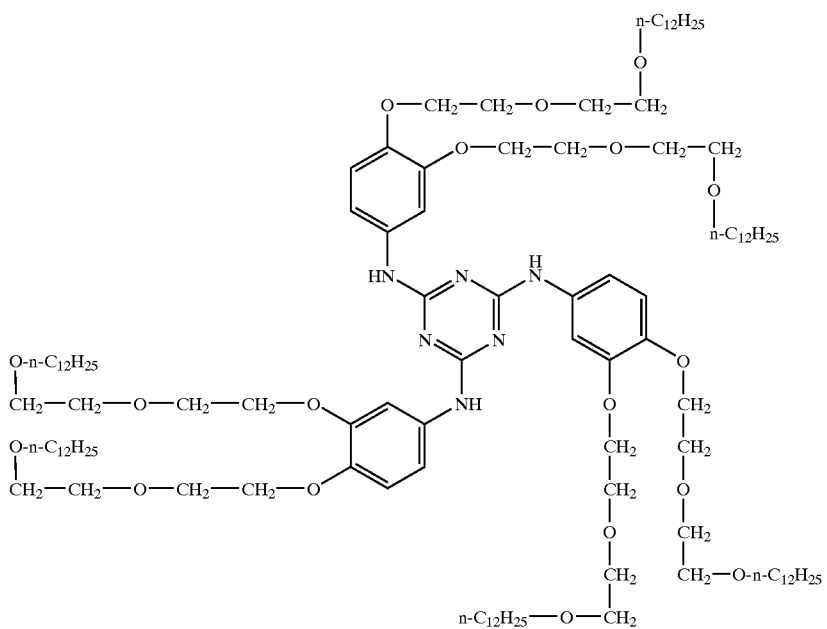

(19)
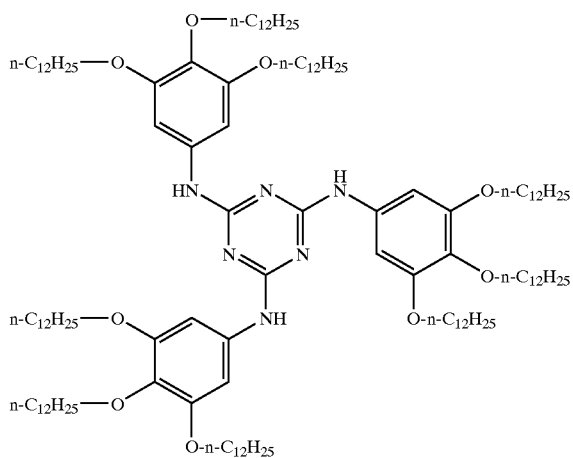
(20)
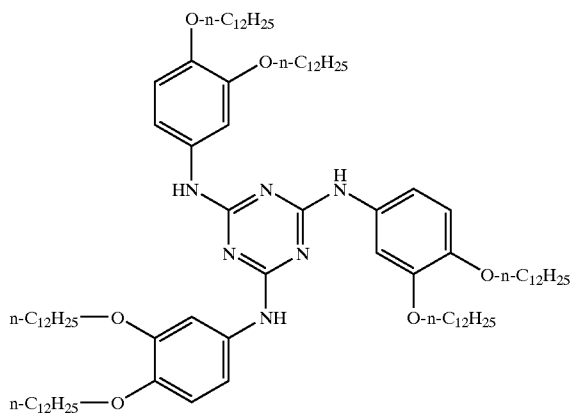
(21)
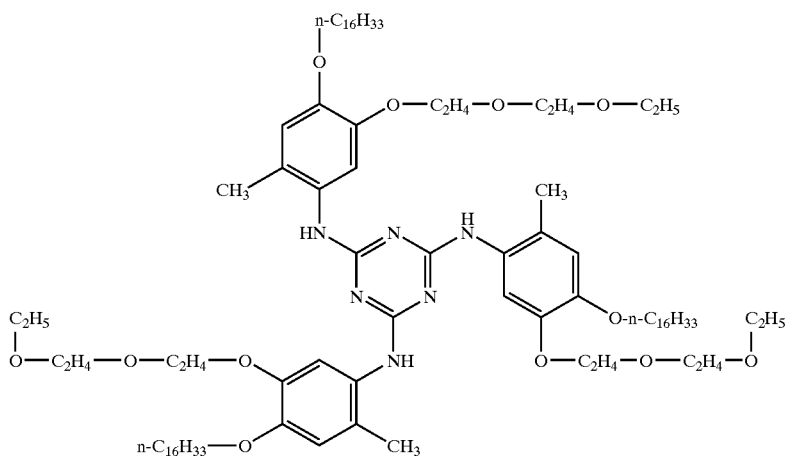

(22)
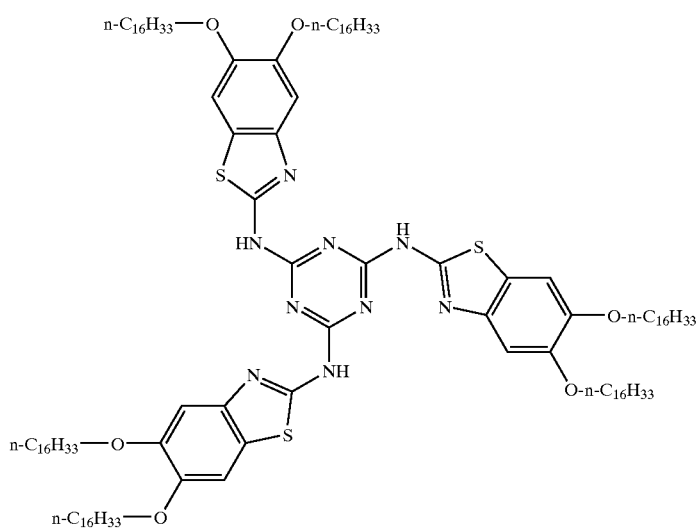
(23)
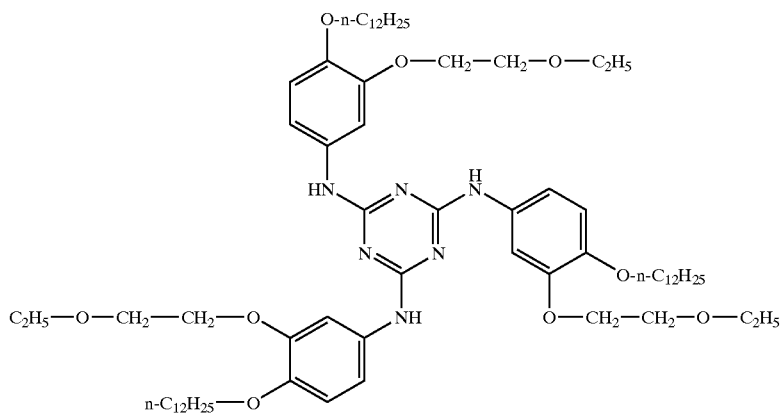
(24)
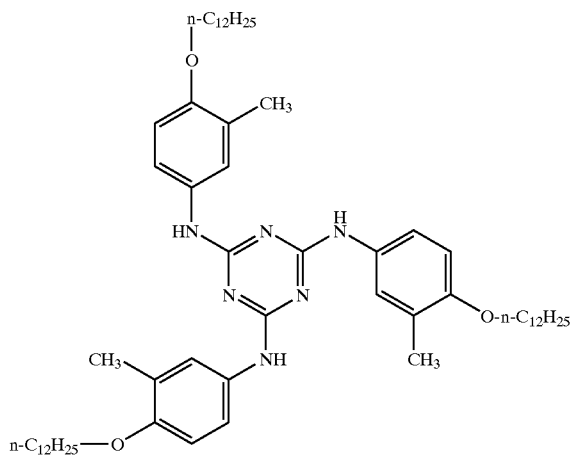

-continued
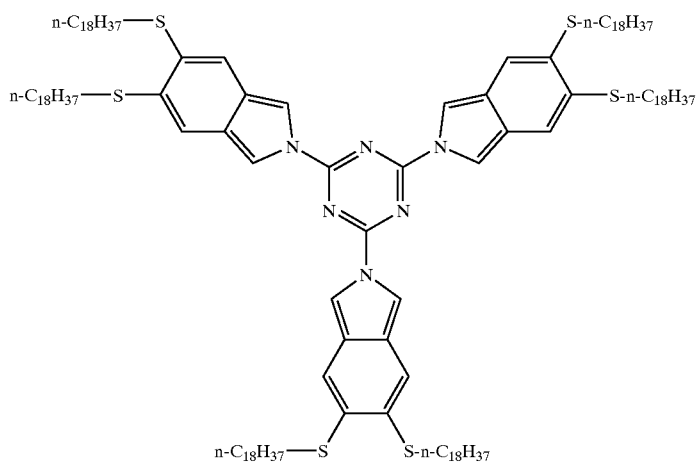
(25)
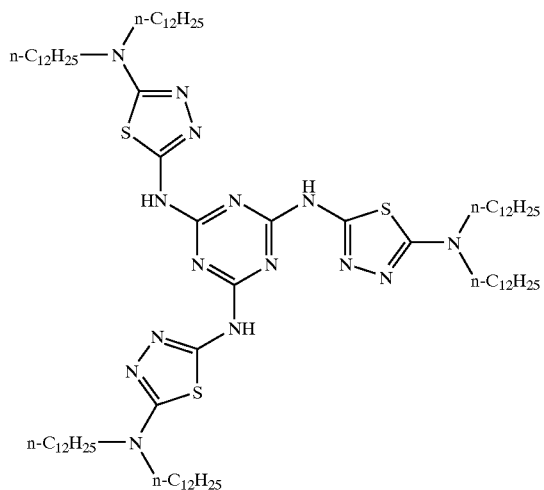
(26)
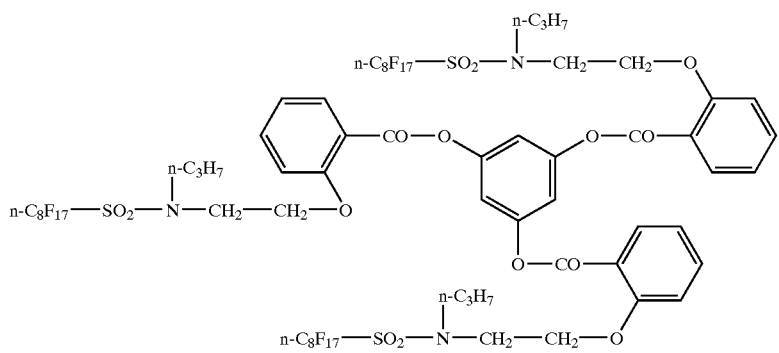
(27)

-continued
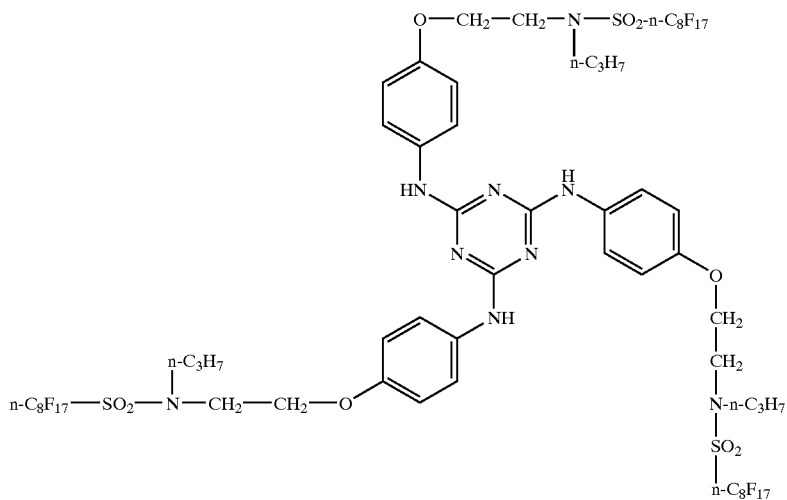
(28)
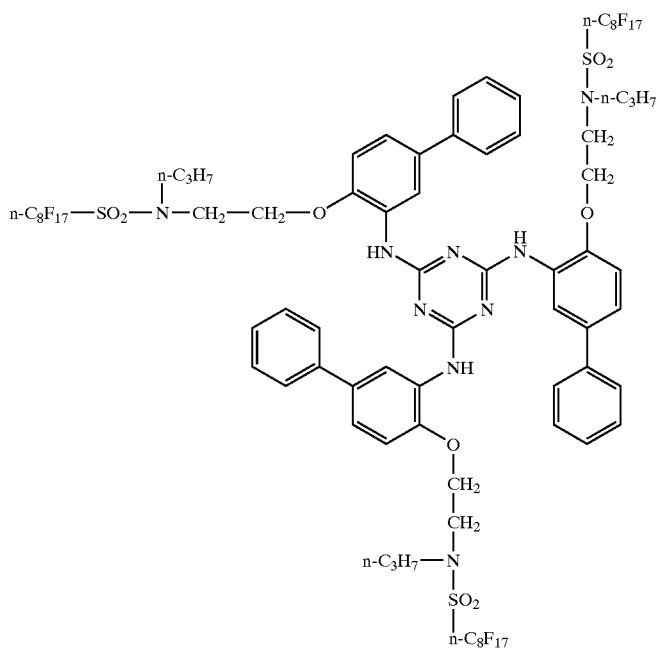
(29)
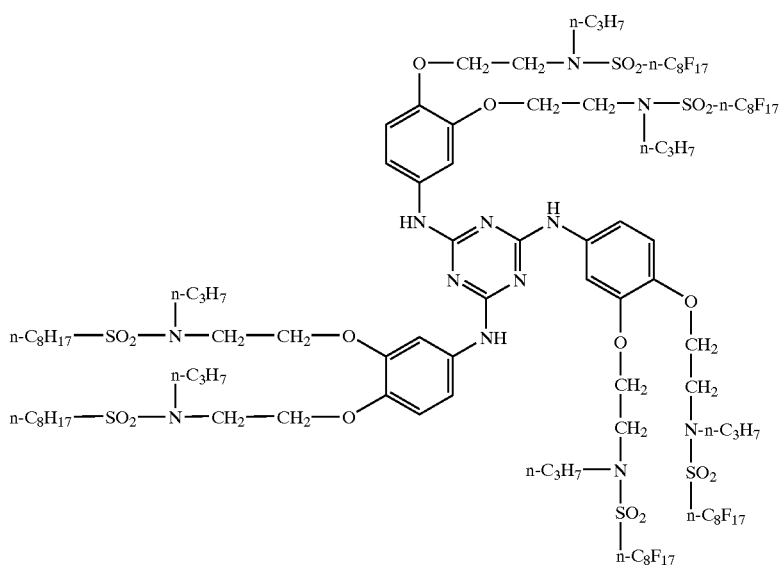
(30)

(31)
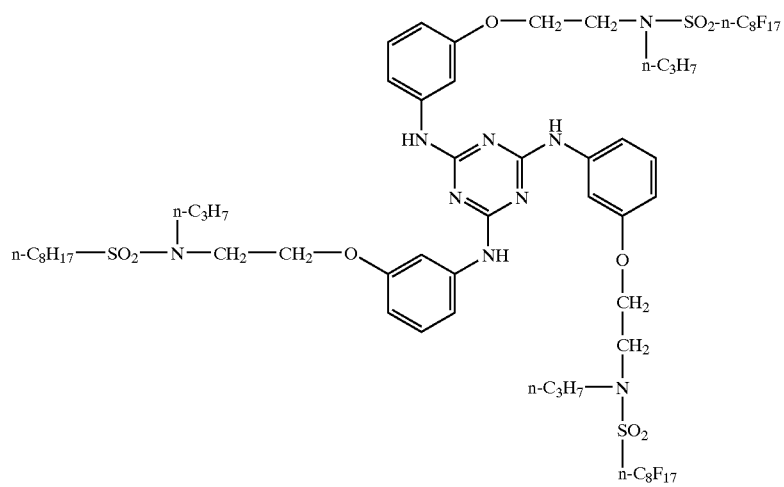
(32)
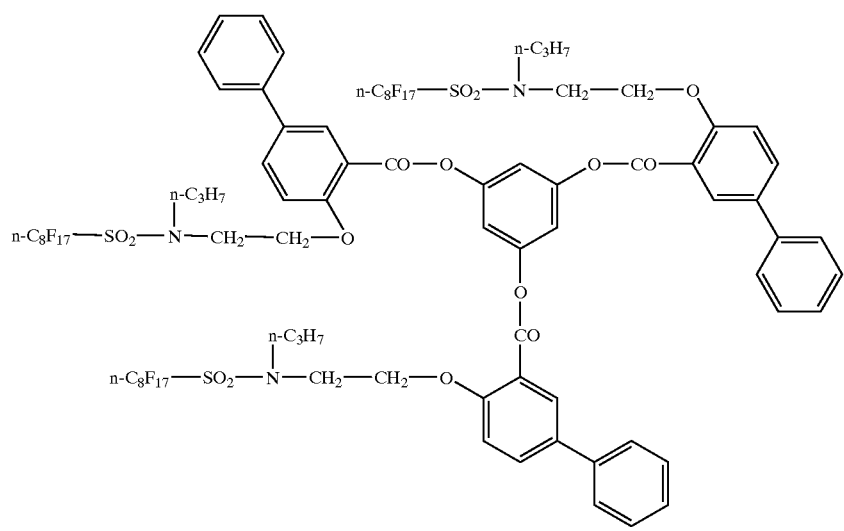
(33)
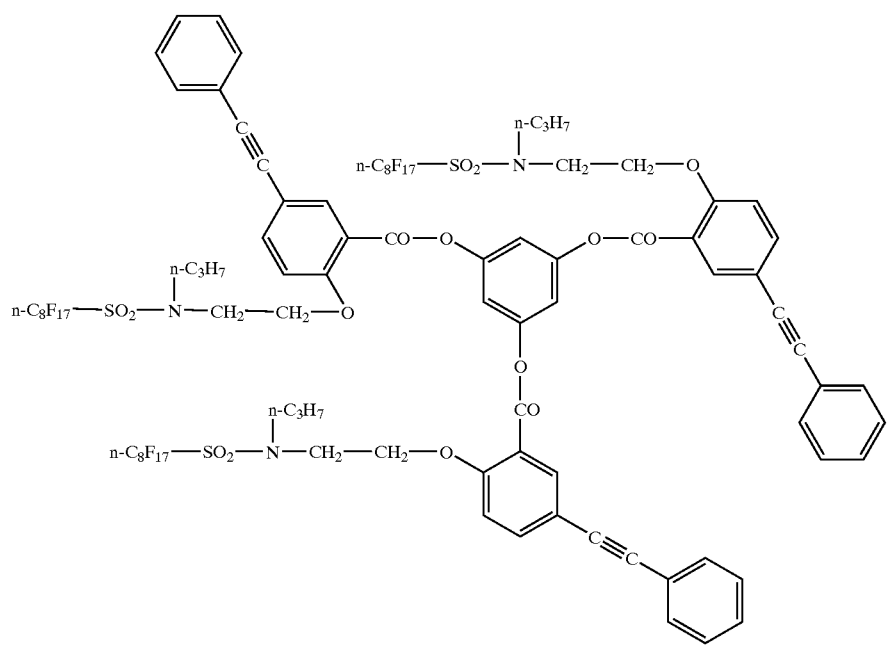

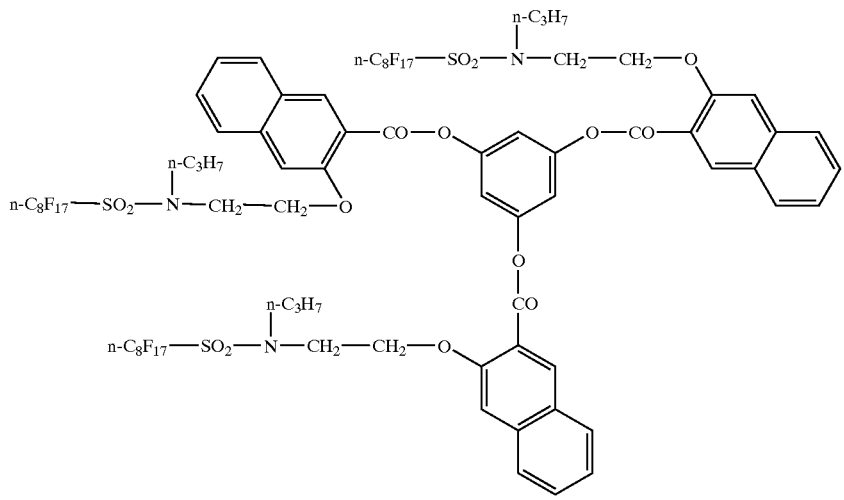
(34)
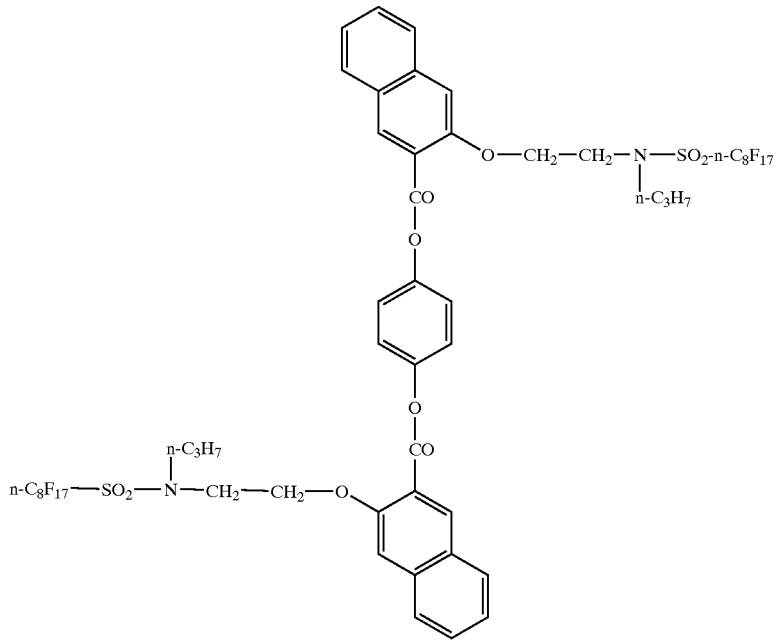
(35)
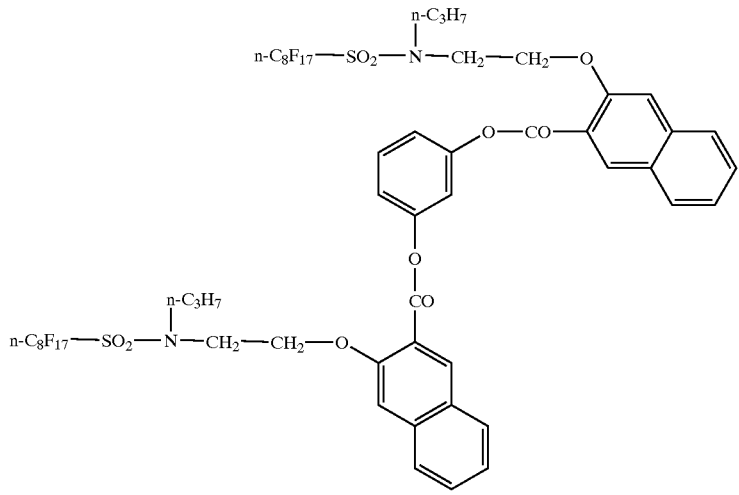
(36)

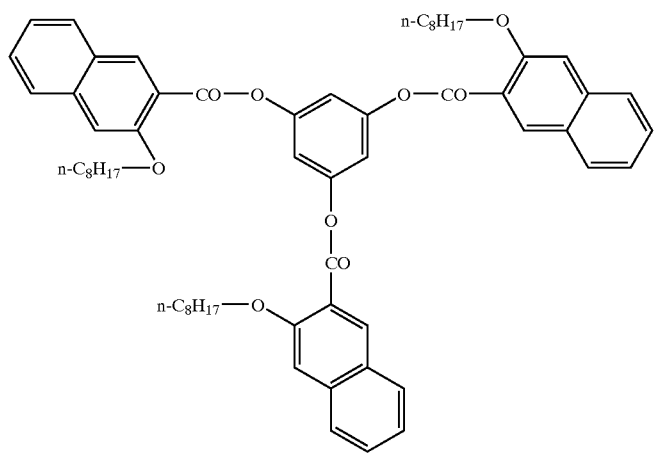
(37)
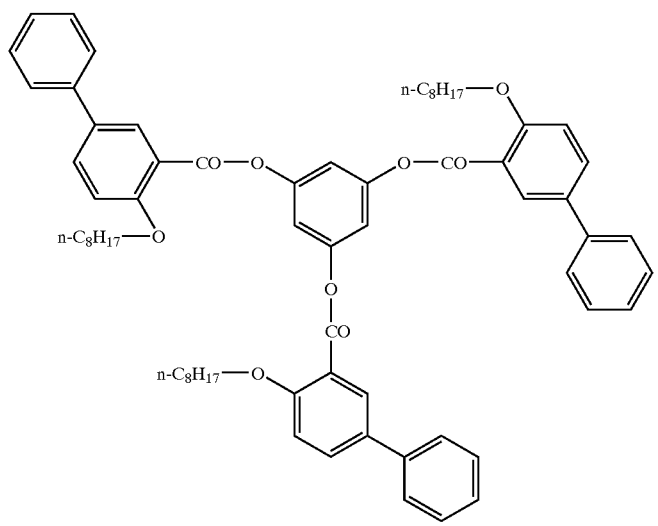
(38)
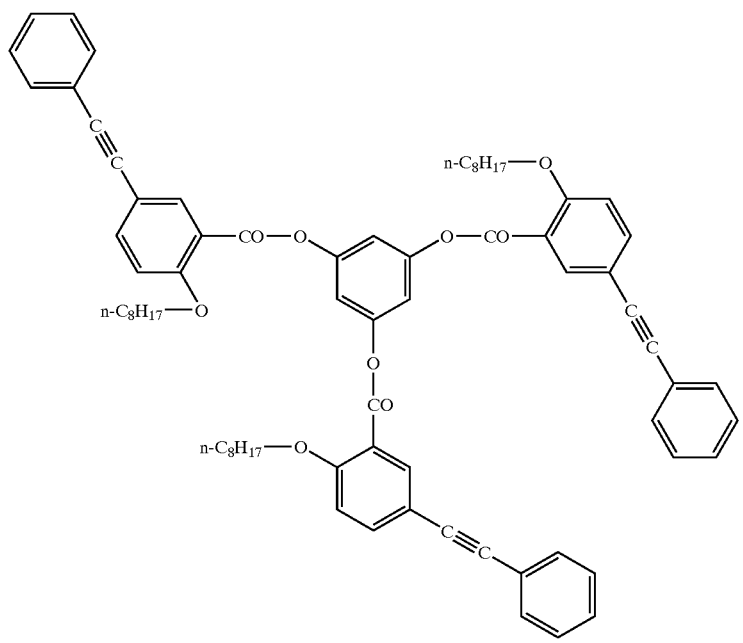
(39)

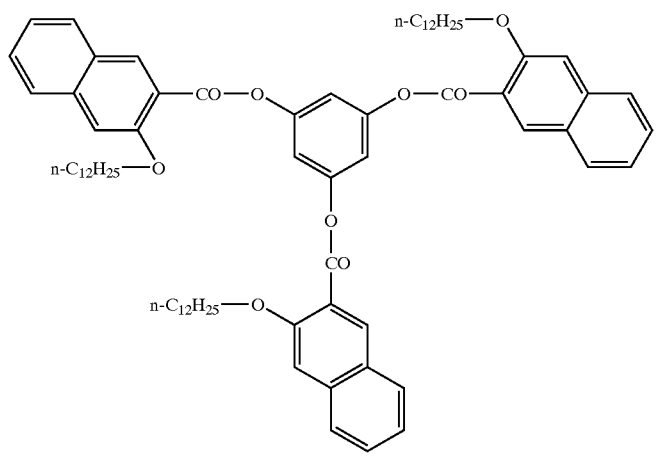
(40)
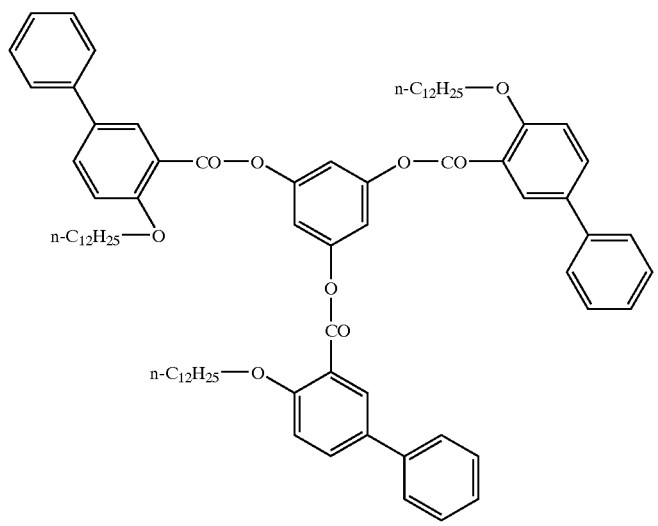
(41)
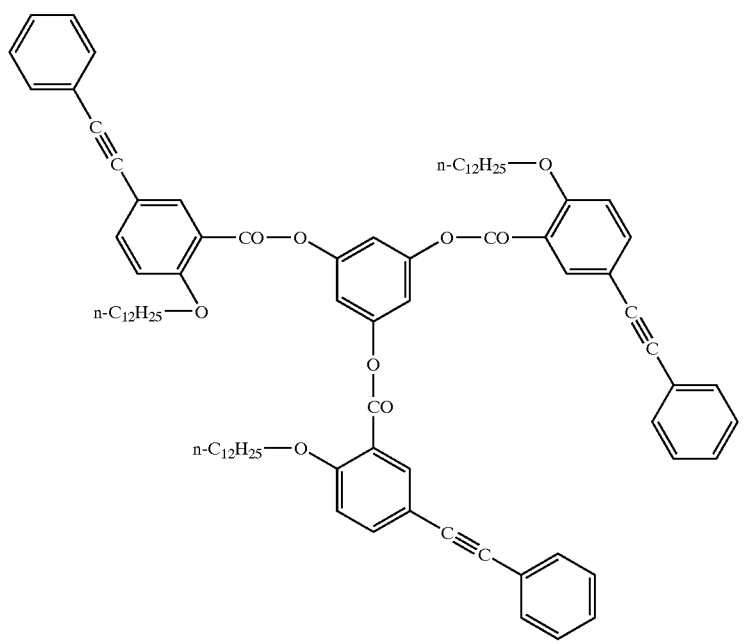
(42)

(43)
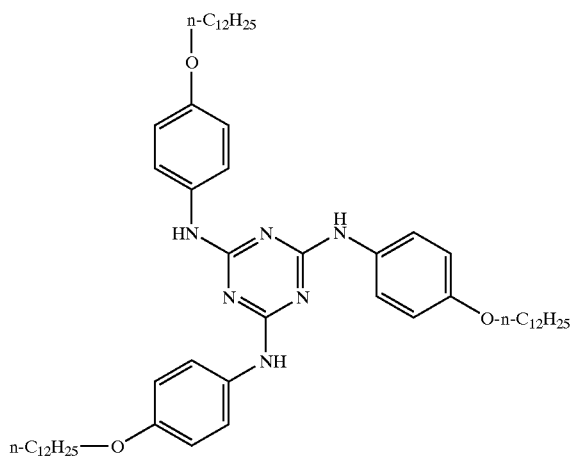
(44)
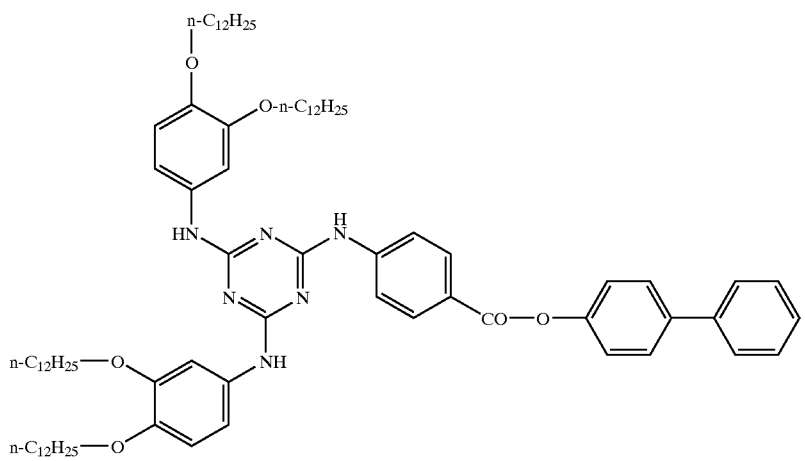
(45)
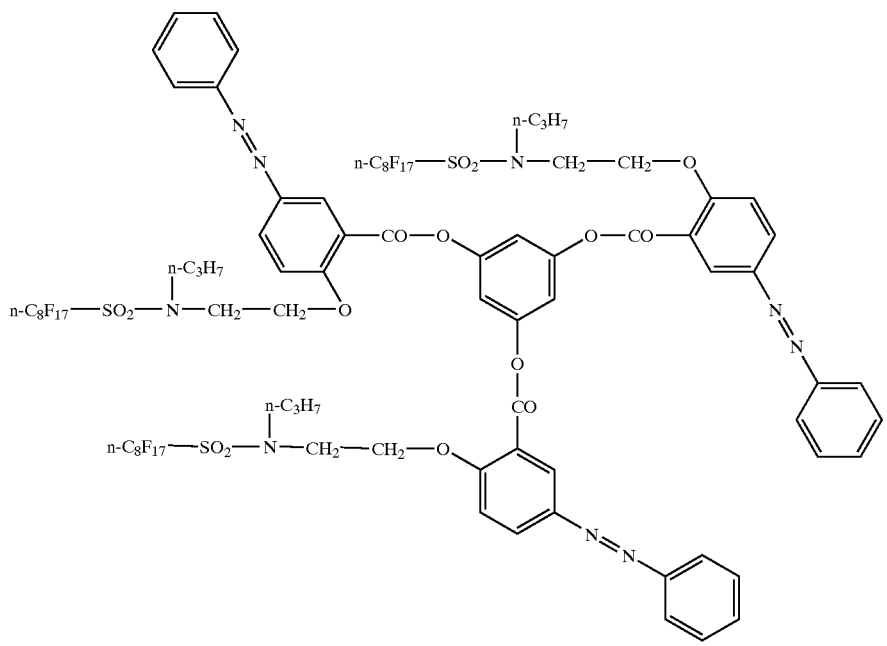

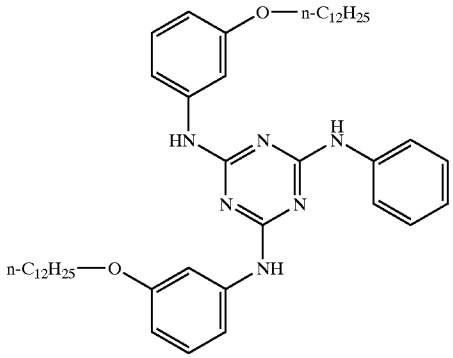

(46)

The applicants presume that each molecule of the compound represented by the formula (I) in the liquid crystal layer takes such a posture that the hydrophobic group (Hb) is on the open side (Hb faces toward air) and that the cyclic structures ($Cy^1$ and $Cy^2$) showing excluded volume effect face toward the rod-like liquid crystal molecules. The cyclic structures ($Cy^1$ and $Cy^2$) showing excluded volume effect constitute a plane structure, or otherwise they form a structure having a part projecting into the rod-like liquid crystal side (for example, a structure in which at least two rings are linked through a single bond, a vinylene bond or an ethynylene bond).

The alignment promoter is used preferably in an amount of preferably 0.01 to 20 wt. %, and more preferably 0.1 to 5 wt based on the amount of the rod-like liquid crystal molecules.

Two or more compounds represented by the formula (I) can be used in combination.

Synthesis Example 1

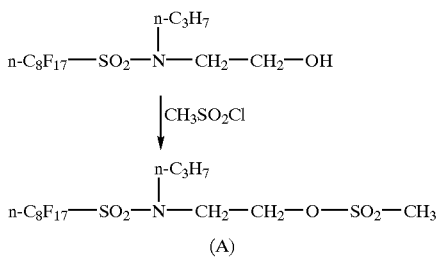

Synthesis of Compound (A)

In a 200 ml three-neck flask equipped with a stirrer, 34.9 g (0.06 mol) of a fluorine-containing surface active agent (Megafac F-104, Dainippon Ink & Chemicals, Inc.), 50 ml of tetrahydrbfuran and 8.37 ml (0.06 mol) of triethylamine were contained and stirred to prepare a solution. After the solution was cooled to −5° C., another solution in which 4.64 ml (0.06 mol) of methanesulfonylchloride was dissolved in 50 ml of tetrahydrofuran was dropped and stirred. The mixture was stirred for 1 hour at room temperature, and then extracted with ethyl acetate/saturated sodium chloride aqueous solution. The phase of ethyl acetate was collected, and dried with sodium sulfate anhydride. From the liquid, ethyl acetate was distilled off under a reduced pressure to obtain 39.3 g of compound (A) (yield: 99%). The obtained product was not purified, and directly used in the next step.

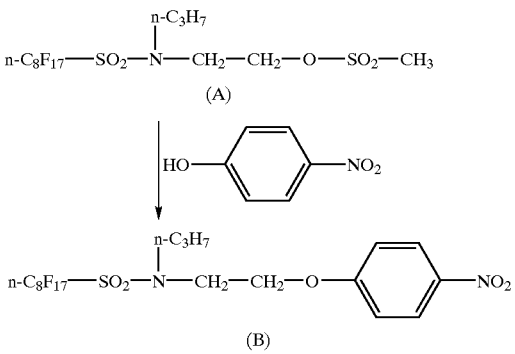

Synthesis of Compound (B)

In a 200 ml three-neck flask equipped with a stirrer, 7.4 g (0.053 mol) of p-nitrophenol, 39.3 g (0.059 mol) of the above-prepared Compound (A) and 100 ml of N-dimethylformamide were contained and stirred to prepare a solution. After 29.5 g (0.21 mol) of potassium carbonate was added, the solution was heated to 130° C. and stirred for 30 minutes. The solution was cooled to room temperature, and then extracted with ethyl acetate/saturated sodium chloride aqueous solution. The phase of ethyl acetate was collected, and dried with sodium sulfate anhydride. From the liquid, ethyl acetate was distilled off under a reduced pressure. The residue and 300 ml of methanol were mixed and stirred to wash the product. Thus, 26.9 g of Compound (B) was obtained (yield: 71%).

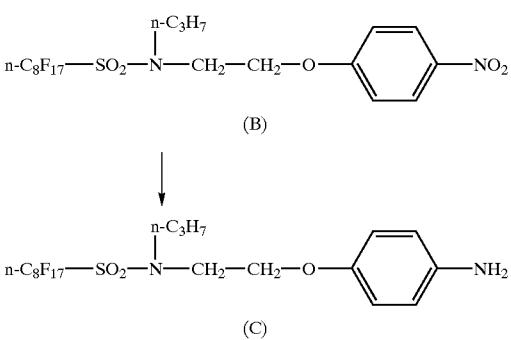

Synthesis of Compound (C)

In a 300 ml three-neck flask equipped with a stirrer and a reflux condenser, 8.48 g (0.152 mol) of reduced iron, 150 ml of isopropyl alcohol, 60 ml of water and 0.30 g (5.7 mmol) of ammonium chloride were mixed. While the mixture was heated to 90° C. under reflux, 26.8 g (0.038 mol) of the above-prepared Compound (B) was gradually added. The reaction mixture was further heated under reflux for 2 hours, and then 100 ml of tetrahydrofuran was added while the temperature was kept at 90° C. The mixture was filtered through celite, and the filtrate was extracted with ethyl acetate/saturated sodium chloride aqueous solution. The phase of ethyl acetate was collected, and dried with sodium sulfate anhydride. From the liquid, ethyl acetate was distilled off under a reduced pressure to obtain 20.5 g of Compound (C) in the form of viscous oil (yield: 80%).

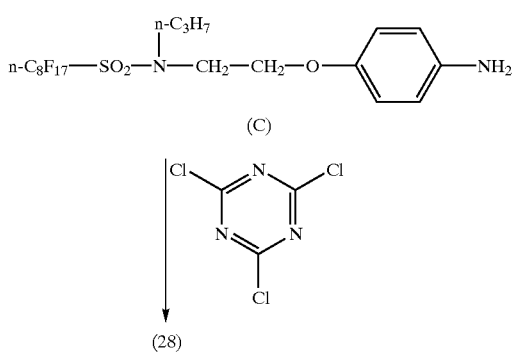

Synthesis of Compound (28)

In a 500 ml three-neck flask equipped with a stirrer and a reflux condenser, 20.4 g of the above-prepared Compound (C), 200 ml of methyl ethyl ketone, 2.03 g (0.011 mol) of cyanuric chloride and 13.8 g (0.10 mol) of potassium carbonate were mixed. The mixture was heated and refluxed at 100° C. under nitrogen gas atmosphere for 6 hours. The mixture was cooled to room temperature, and extracted with ethyl acetate/saturated sodium chloride aqueous solution. The phase of ethyl acetate was collected, and dried with sodium sulfate anhydride. From the liquid, ethyl acetate was distilled off under a reduced pressure. The formed product was recrystallized from 110 ml of acetone and 330 ml of isopropyl alcohol to obtain 7.28 g of Compound (28) (yield: 38%, melting point: 227° C.).

$^1$H-NMR (solvent: CDCl$_3$): 1.0 ppm triplet, 3H; 1.3 ppm multiplet, 2H; 3.4 to 4.0 ppm multiplet, 4H; 4.2 ppm triplet, 2H; 6.9 ppm doublet, 2H; 7.5 ppm doublet, 2H Synthesis Example 2

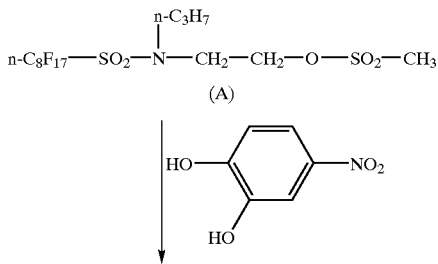

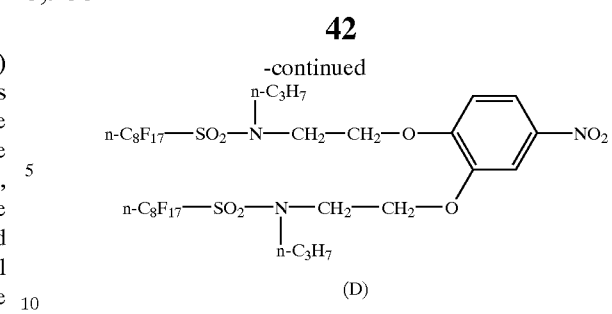

Synthesis of Compound (D)

From Compound (A) prepared in Synthesis example 1 and nitrocatechol, Compound (D) was synthesized in the same manner as the synthesis of Compound (B) in Synthesis example 1 (yield: 84%).

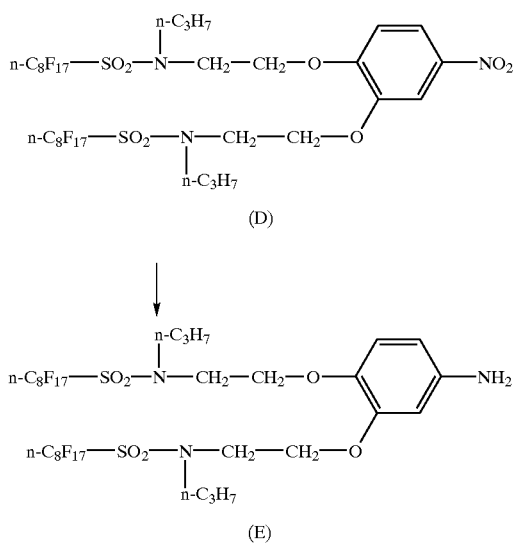

Synthesis of Compound (E)

From the prepared Compound (D), Compound (E) was synthesized in the same manner as the synthesis of Compound (C) in Synthesis example 1 (yield: 88%).

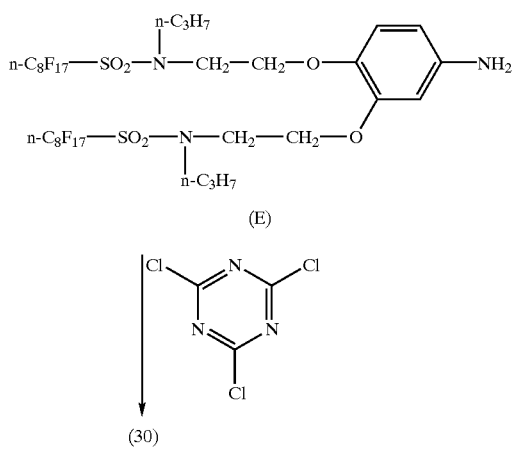

Synthesis of Compound (30)

From the prepared Compound (E) and cyanuric chloride, Compound (30) was synthesized in the same manner as the synthesis of Compound (28) in Synthesis example 1. The product was purified through column chromatography (stationary phase: silica-gel, developer: hexane/ethyl acetate [2/1]) (yield: 33%, melting point: 81–83° C.).

$^1$H-NMR (solvent: CDCl$_3$): 0.9 ppm triplet, 6H; 1.6 to 1.8 ppm multiplet, 4H; 3.4 to 3.6 ppm multiplet, 8H; 4.2 ppm triplet, 4H; 6.8 to 7.4 ppm multiplet, 3H Synthesis Example 3

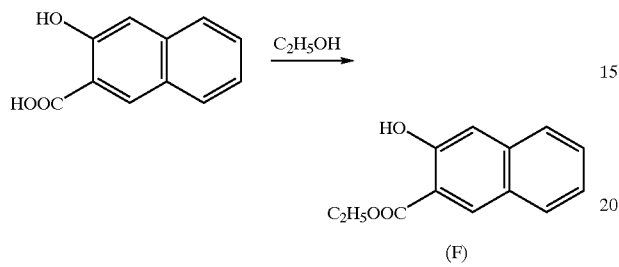

Synthesis of Compound (F)

In 400 ml of ethanol, 20 g (0.11 mol) of 3-hydroxy-2-naphthoic acid and 19 g (0.1 mol) of p-toluenesulfonic acid were dissolved. The solution was heated under reflux for 3 hours, and then poured into 1 liter of water. The mixture was extracted with 1 liter of ethyl acetate. The organic phase was concentrated under reduced pressure, and then purified through showing-gel column chromatography (eluent: hexane/ethyl acetate [20/1]) to obtain 17 g (0.079 mol) of Compound (F).

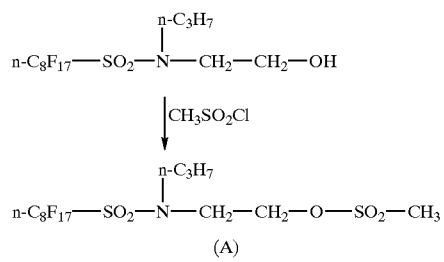

Synthesis of Compound (A)

In 150 ml of tetrahydrofuran, 29 g (0.05 mol) of a fluorine-containing surface active agent (Megafac F-104, Dainippon Ink & Chemicals, Inc.) and 7.1 ml of triethylamine were dissolved. After the solution was cooled to −5° C., another solution in which 4 ml (0.05 mol) of methanesulfonylchloride was dissolved in 50 ml of tetrahydrofuran was dropped so that the temperature might not be 5° C. or more. The solution was then stirred for 1 hour at room temperature, and poured into 1 liter of water. The mixture was extracted with 1 liter of ethyl acetate. The organic phase was concentrated under reduced pressure to obtain Compound (A) in the form of oily product. The obtained product was not purified, and directly used in the next step.

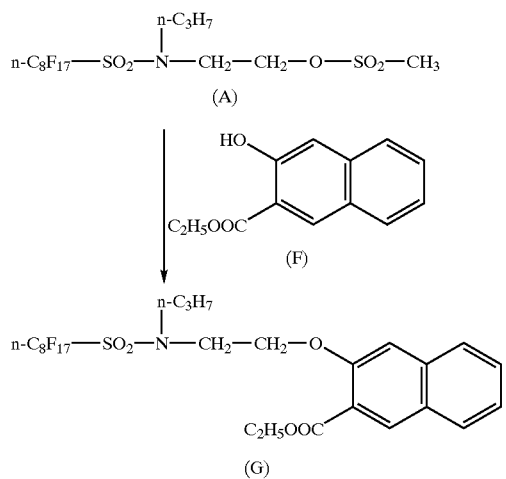

Synthesis of Compound (G)

In 100 ml of N,N-dimethylformamide, the obtained Compound (A) and 10 g (0.046 mol) of Compound (F) were dissolved. After 30 g (0.21 mol) of potassium carbonate was added to the solution, the mixture was heated under reflux at 120° C. for 3 hours. The reaction liquid was poured into 1 liter of water, and extracted with 1 liter of ethyl acetate. After washed with 4% hydrochloric acid, the organic phase was concentrated under reduced pressure and purified through silica-gel column chromatography (eluent: hexane/ethyl acetate [10/1]) to obtain 29 g (0.037 mol) of Compound (G).

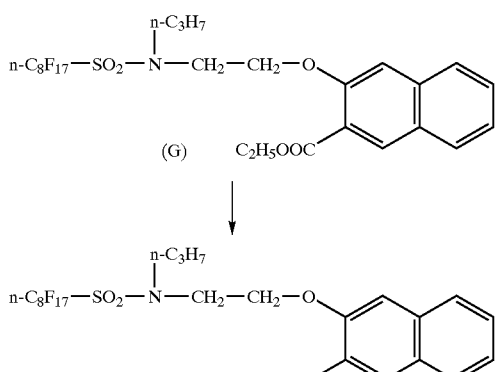

Synthesis of Compound (H)

In 100 ml of ethanol, 29 g (0.037 mol) of the above-obtained Compound (G) was dissolved. To the solution, an alkali solution in which 3 g (0.074 mol) of sodium hydroxide was dissolved in 100 ml of water was added. The mixture was heated under reflux at 80° C. for 1 hour. After the mixture was cooled, 100 ml of hydrochloric acid (1 mol/L) was added. The solution was extracted with 500 ml of ethyl acetate. The organic phase was concentrated under reduced pressure and purified through silica-gel column chromatography (eluent: hexane/ethyl acetate [4/1]) to obtain 26 g (0.035 mol) of Compound (H).

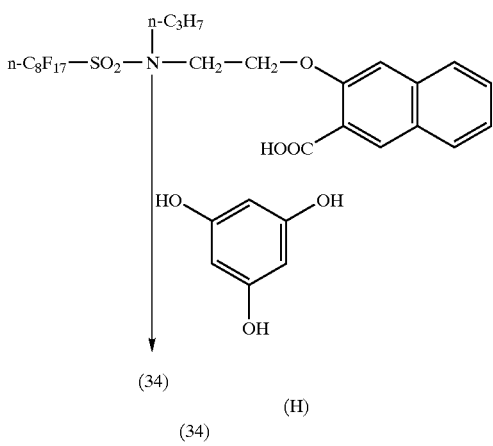

(34)

(H)
(34)

Synthesis of Compound (34)

In 20 ml of tetrahydrofuran, 1.16 ml (0.015 mol) of methanesulfonyl chloride was dissolved. After the solution was cooled to −5° C., another solution in which 11.3 g (0.015 mol) of the prepared Compound (H) and 2.8 ml (0.015 mol) of ethyldiisopropylamine were dissolved in 10 ml of tetrahydrofuran was dropped so that the temperature might not be 5° C. or more. The solution was then stirred for 30 minutes at room temperature, and cooled to 5° C. or below. To the solution, 2.8 ml (0.015 mol) of ethyldiisopropylamine and 0.3 g (2.4 mmol) of 4-N,N-dimethylaminopyridine were added. Successively, 10 ml of a tetrahydroxylfuran solution dissolving 0.74 g (4.6 mmol) of 1,3,5-trihydroxybenzene dihydrate dehydrated with sodium sulfate was dropped. The reaction solution was stirred at room temperature for 3 hours, and poured into 200 ml of water. The mixture was extracted with 200 ml of ethyl acetate. The organic phase was concentrated under reduced pressure, and purified through silica-gel column chromatography (eluent: hexane/ethyl acetate [6/1]) to obtain 8.2 g (3.4 mmol) of Compound (34). [melting point: 113–116° C.]

$^1$H-NMR (solvent: CDCl$_3$, TMS=0 ppm): 8.25 (d, 3H), 7.73 (d, 3H), 7.50 (d, 6H), 7.35 (d, 6H), 7.27 (s, 3H), 7.10 (s, 3H), 7.00 (d, 3H), 4.33 (bs, 6H), 3.40–4.20 (m, 12H), 1.50–1.90 (m, 6H), 0.88 (t, 9H)

Synthesis Example 4

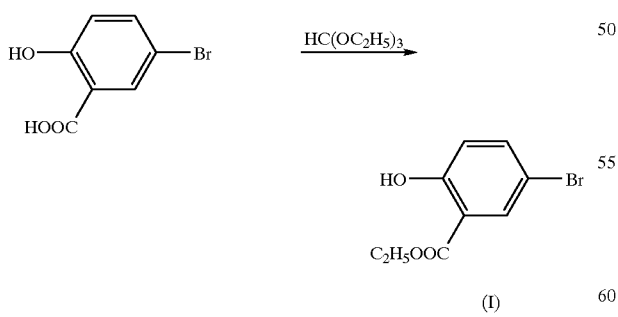

(I)

Synthesis of Compound (I)

After 56 g (0.26 mol) of 5-bromosalicylic acid and 100 ml of ethyl orthoformate were mixed, the mixture was heated to 140° C. and stirred for 3 hours. The reaction liquid was heated and concentrated under reduced pressure to obtain 63 g (0.26 mol) of Compound (I).

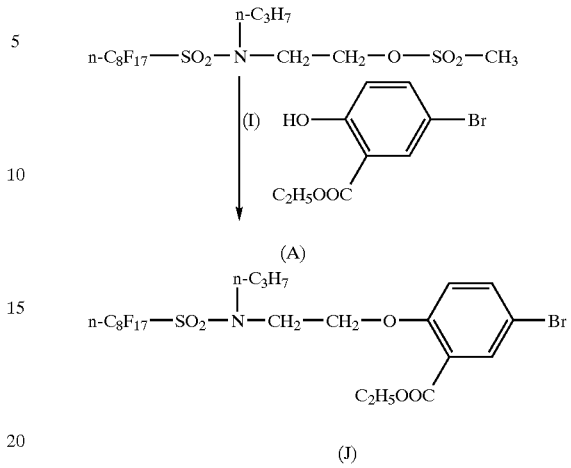

Synthesis of Compound (J)

In 100 ml of N,N-dimethylformamide, Compound (A) prepared in Synthesis example 3 and 13 g (0.053 mol) of the above-prepared Compound (I) were dissolved. After 30 g (0.21 mol) of potassium carbonate was added, the solution was heated and stirred at 120° C. for 3 hours. The reaction liquid was poured into 1 liter of water, and extracted with 1 liter of ethyl acetate. The organic phase was washed with 4% diluted hydrochloric acid, and concentrated under reduced pressure. The concentrate was purified through silica-gel column chromatography (eluent: hexane/ethyl acetate [10/1]) to obtain 41 g (0.05 mol) of Compound (J).

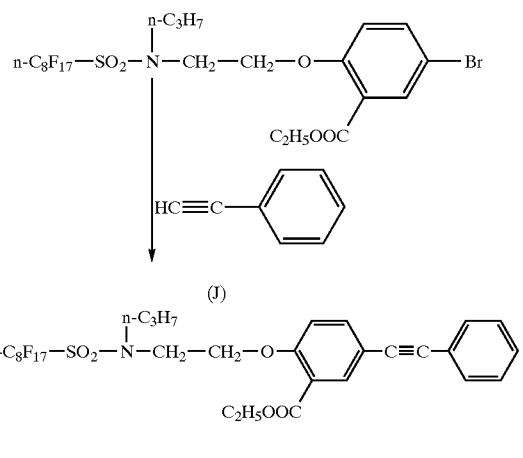

Synthesis of Compound (K)

To 30 ml of triethylamine, 38.4 g (0.047 mol) of the above-prepared Compound (J) and 5.2 g (0.051 mol) of phenylacetylene were added and stirred to dissolve. After 0.1 g of bistriphenylphosphinedichloropalladium, 0.01 g of copper iodide and 0.2 g of triphenylphosphine were added, the liquid was heated and stirred at 120° C. for 3 hours. The resulting solution was poured into 500 ml of water, and then 20 ml of concentrated hydrochloric acid was added. The solution was extracted with 500 ml of ethyl acetate. The organic phase was dried under reduced pressure to obtain Compound (K) in the form of oil. The product was not purified, and directly used in the next step.

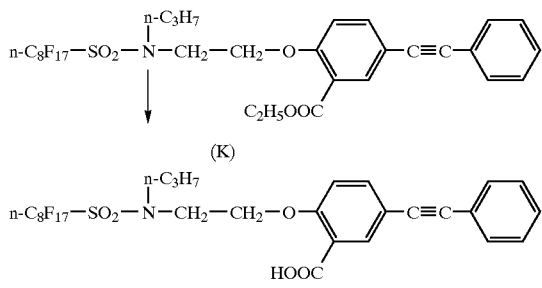

(K)

(L)

Synthesis of Compound (L)

The above-obtained Compound (K) was dissolved in 200 ml of ethanol. To the solution, an alkali solution in which 12 g (0.3 mol) of sodium hydroxide was dissolved in 200 ml of water was added. The mixture was heated and stirred at 80° C. for 1 hour. After the mixture was cooled, 200 ml of water and 30 ml of concentrated hydrochloric acid were added. The solution was extracted with 500 ml of ethyl acetate. The organic phase was concentrated under reduced pressure and purified through silica-gel column chromatography (eluent: hexane/ethyl acetate [4/1]) to obtain 28 g (0.035 mol) of Compound (L).

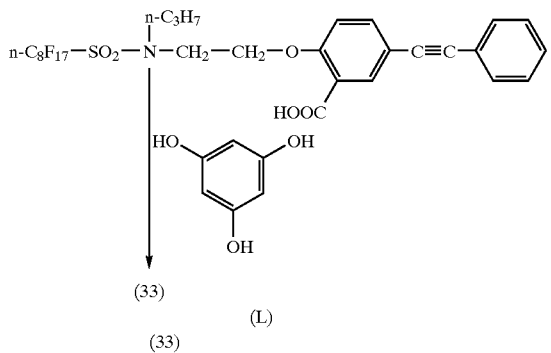

(L)

(33)

(33)

Synthesis of Compound (33)

In 20 ml of tetrahydrofuran, 1.16 ml (0.015 mol) of methanesulfonyl chloride was dissolved. After the solution was cooled to −5° C., another solution in which 12.1 g (0.015 mol) of the prepared Compound (L) and 2.8 ml (0.015 mol) of ethyldiisopropylamine were dissolved in 10 ml of tetrahydrofuran was dropped so that the temperature might not be 5° C. or more. The solution was then stirred for 30 minutes at room temperature, and cooled to 5° C. or below. To the solution, 2.8 ml (0.015 mol) of ethyldiisopropylamine and 0.3 g (2.4 mmol) of 4-N,N-dimethylaminopyridine were added. To the mixture, 0.74 g (4.6 mmol) of 1,3,5-trihydroxybenzene dihydrate dissolved in 10 ml of tetrahydroxyfuran dehydrated with sodium sulfate was dropwise added. The reaction solution was stirred at room temperature for 3 hours, and poured into 200 ml of water. The mixture was extracted with 200 ml of ethyl acetate. The organic phase was concentrated under reduced pressure, and purified through silica-gel column chromatography (eluent: hexane/ethyl acetate [6/1]) to obtain 8 g (3.3 mmol) of Compound (33) (melting point: 148° C.).

$^1$H-NMR (solvent: CDCl$_3$, TMS=0 ppm): 8.60 (s, 3H), 7.95 (d, 3H), 7.85 (d, 3H), 7.60 (t, 3H), 7.40–7.52 (m, 6H), 7.27 (s, 3H), 4.40 (bs, 6H), 3.72–4.10 (m, 6H), 3.56 (t, 6H), 1.50–1.90 (m, 6H), 0.80 (t, 9H)

Synthesis Example 5

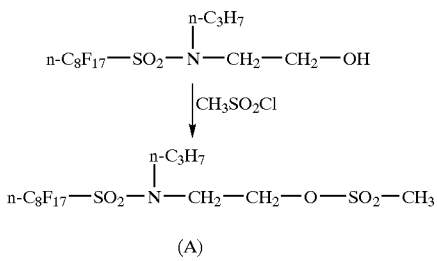

(A)

Synthesis of Compound (A)

In 20 ml of tetrahydrofuran, 58.6 g of a fluorine-containing surface active agent (Megafac F-104, Dainippon Ink & Chemicals, Inc.) and 12.14 g of triethylamine were dissolved. After the solution was cooled with ice and stirred, 12.6 g of methanesulfonylchloride was dropped for about 23 minutes to form white precipitates. The reaction was slightly exothermic. While cooled with ice, the resultant liquid was stirred for 50 minutes. The liquid was then warmed to room temperature, and stirred for 15 minutes. After the completion of the reaction was confirmed with TLC, the reaction liquid was poured into a mixed medium of diluted hydrochloric acid-ethyl acetate. The mixture was extracted, and the organic phase was collected and washed with saturated sodium chloride aqueous solution. After dried with magnesium sulfate, the liquid was concentrated to obtain 66.57 g of Compound (A) in the form of colorless wax. The yield was almost 100%. The product was confirmed with NMR and mass spectroscopy.

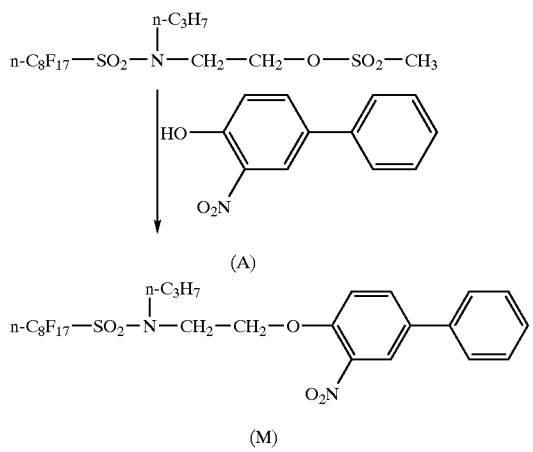

(A)

(M)

Synthesis of Compound (M)

To a mixture of 8.61 g of 2-nitro-4-phenylphenol, 31.84 g of the prepared Compound (A) and 8.9 g of potassium carbonate, 150 ml of dimethylformamide was added. The mixture was heated at 100° C. for 5 hours. After the completion of the reaction was confirmed with TLC, the reaction liquid was poured into a mixed medium of diluted hydrochloric acid-ethyl acetate. The mixture was extracted, and the organic phase was collected and washed with saturated sodium chloride aqueous solution. After dried with magnesium sulfate, the liquid was concentrated to form a product. The crude product was recrystallized with acetonitrile to obtain 27.29 g of Compound (M) in the form of yellowish crystallites. The yield was 87%. The product was confirmed with NMR and mass spectroscopy.

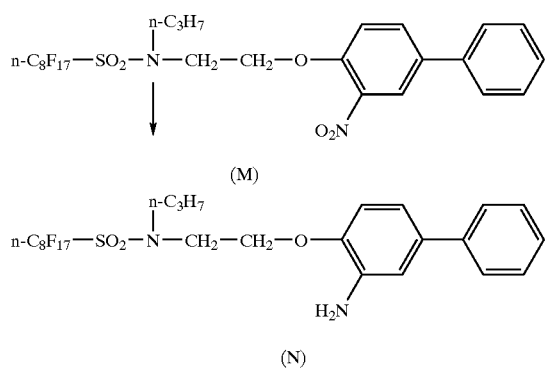

Synthesis of Compound (N)

A mixture of 16 g of reduced iron, 1.6 g of ammonium chloride, 20 ml of water and 200 ml of isopropyl alcohol was heated and stirred under reflux on a steam bath. While the mixture was refluxed for 2.5 hours, the above-prepared Compound (M) was dropped into the mixture. After the completion of the reaction was confirmed with TLC, the hot reaction liquid was filtered through celite. After washed with tetrahydrofuran, the liquid was concentrated to obtain 16.56 g of Compound (N) in the form of gray crystallites. The product was not purified, and directly used in the next step.

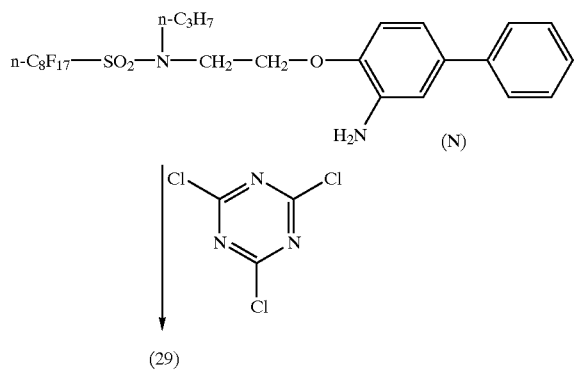

Synthesis of Compound (29)

To a mixture of the above-prepared Compound (N), 3.59 g of potassium carbonate and 1.11 g of cyanuric chloride, 100 ml of methyl ethyl ketone was added. The mixture was heated under reflux for 3 hours. After the completion of the reaction was confirmed with TLC, the reaction liquid was poured into a mixed medium of diluted hydrochloric acid-ethyl acetate. The mixture was extracted, and the organic phase was collected and washed with saturated sodium chloride aqueous solution. After dried with magnesium sulfate, the liquid was concentrated and purified through silica-gel column chromatography (eluent: hexane/ethyl acetate [2/1]) to obtain 8.79 g of Compound (29) in the form of viscous oil. The product was confirmed with mass spectroscopy.

Synthesis Example 6

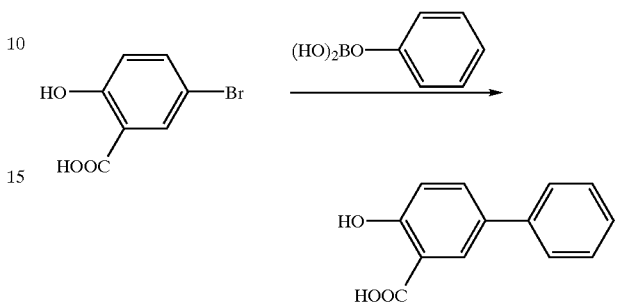

Synthesis of 5-phenylsalicylic acid

In 400 ml of water, 21.7 g of 5-bromosalicylic acid, 13.41 g of phenylboric acid and 15.28 g of potassium carbonate were dissolved. The solution was stirred at room temperature for 40 minutes. After the completion of the reaction was confirmed with TLC, the reaction liquid was poured into a mixed medium of diluted hydrochloric acidethyl acetate. The mixture was extracted, and the organic phase was collected and washed with saturated sodium chloride aqueous solution. After dried with magnesium sulfate, the liquid was concentrated to form a crude product. The product was recrystallized from acetonitrile to obtain 18.58 g of 5-phenylsalicylic acid in the form of colorless crystallites. The yield was 87%. The product was confirmed with NMR and mass spectroscopy.

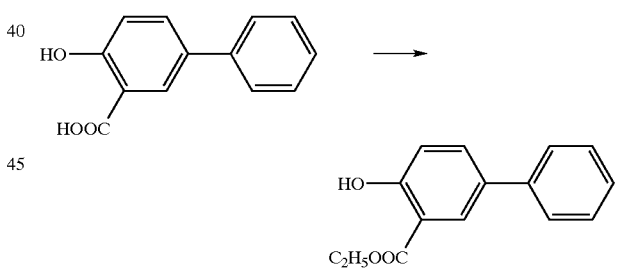

Synthesis of ethyl 5-phenylsalicylate

To 18.58 g of 5-phenylsalicylic acid, 350 ml of ethanol, 100 ml of toluene and 42 ml of concentrated sulfuric acid were added. The mixture was heated under reflux for 14 hours. After it was confirmed with TLC that the starting materials were almost disappeared, the reaction liquid was poured into a mixed medium of diluted hydrochloric acid-ethyl acetate. The mixture was extracted, and the organic phase was collected and washed with saturated sodium chloride aqueous solution. After dried with magnesium sulfate, the liquid was concentrated to form a crude product. The product was recrystallized from ethanol to obtain 11.53 g of ethyl 5-phenylsalicylate in the form of colorless crystallites. The yield was 55%. The product was confirmed with NMR and mass spectroscopy.

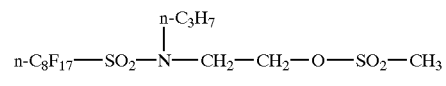

(A)

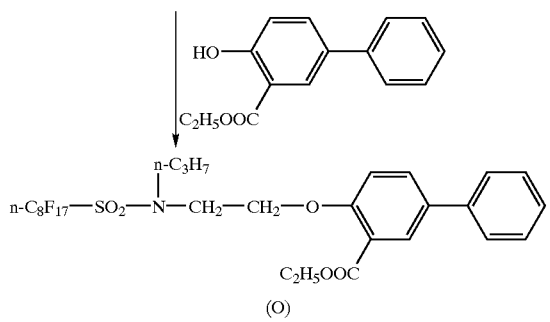

(O)

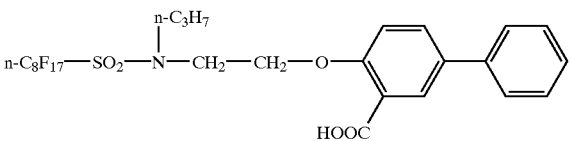

(P)

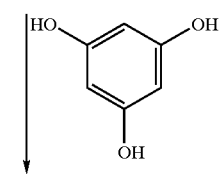

(32)

Synthesis of Compound (O)

A mixture of 11.46 g of ethyl 5-phenylsalicylate, 34.03 g of Compound (A) prepared in Synthesis example 1, 11.2 g of potassium carbonate and 150 ml of dimethylformamide was heated and stirred at 100° C. After the completion of the reaction was confirmed with TLC, the reaction liquid was poured into a mixed medium of diluted hydrochloric acid-ethyl acetate. The mixture was extracted, and the organic phase was collected and washed with saturated sodium chloride aqueous solution. After dried with magnesium sulfate, the liquid was concentrated to form a crude product. The product was recrystallized from acetonitrile to obtain 33.10 g of Compound (O) in the form of colorless crystallites. The yield was 86%. The product was confirmed with NMR and mass spectroscopy.

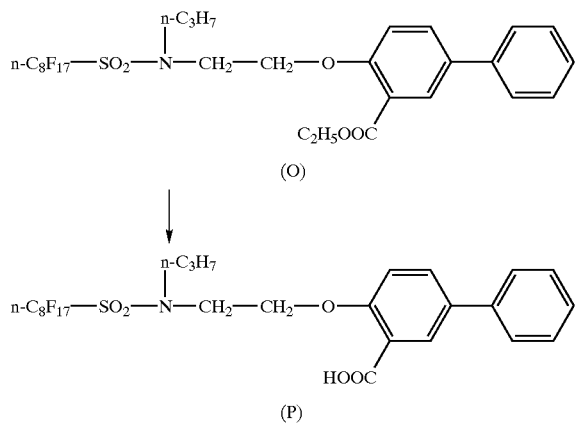

Synthesis of Compound (P)

In 20 ml of tetrahydrofuran, 15.8 g of Compound (O) was dissolved. While cooled with ice, the solution was stirred. To the resultant solution, an alkali solution in which 4.0 g of sodium hydroxide was dissolved in 20 ml of water was added. While heated at 60° C., the reaction liquid was stirred for 2 hours. After the completion of the reaction was confirmed with TLC, diluted hydrochloric acid was dropped to the liquid to form white crystallites. The product was washed with water to obtain 1.27 g of Compound (P). The yield was quantitative.

Synthesis of Compound (32)

In 60 ml of methylene chloride, 7.03 g of Compound (P) was dissolved. After one drop of dimethylformamide was added, 1.2 ml of oxalylchloride was dropped to the solution at room temperature under nitrogen gas atmosphere. The reaction liquid was heated under reflux for 2.5 hours. After the completion of the reaction was confirmed with TLC, methylene chloride was distilled off at 60° C. under reduced pressure to form white precipitate. The precipitate was dissolved in 80 ml of tetrahydrofuran, and then 0.38 g of 1,3,5-trihydroxybenzene and 5 ml of pyridine were added. The resulting liquid was stirred at 60° C. for 6 hours, and poured into a mixed medium of diluted hydrochloric acid-ethyl acetate. The mixture was extracted, and the organic phase was collected and washed with saturated sodium chloride aqueous solution. After dried with magnesium sulfate, the liquid was concentrated and purified through silica-gel column chromatography (eluent: chloroform/hexane [4/3]) to form a crude product. The product was recrystallized from acetonitrile to obtain 3.24 g of Compound (32) in the form of colorless crystallites. The yield was 45%. The product was confirmed with NMR and mass spectroscopy.

[Rod-Like Liquid Crystal Molecule]

Examples of the rod-like liquid crystal molecules include azomethines, azoxy molecules, cyanobiphenyls, cyanophenyl esters, benzoic esters, phenyl cyclohexanecarbonate esters, cycnophenylcyclohexanes, cyano-substituted phenylpyrimidines, alkoxy-substituted phenylpyrimidines, phenyldioxanes, tolans and alkenylcyclohexylbenzonitriles. The rod-like liquid crystal molecules can be in the form of metal complexes.

A typical liquid crystal cell in which rod-like liquid crystal molecules are essentially vertically aligned is a liquid crystal cell of VA (vertically aligned) mode. A liquid crystal display having the liquid crystal cell of VA mode is described in "Nikkei Micro device", No. 136, pp. 147, (1996); Japanese Patent Provisional Publication No. 2(1990)-176625; and Japanese Patent Publication No. 2,866,372.

The rod-like liquid crystal molecule preferably has a birefringence of 0.001 to 0.7.

The rod-like liquid crystal molecule preferably has a polymerizable group (Q).

Examples of the polymerizable groups (Q) are shown below.

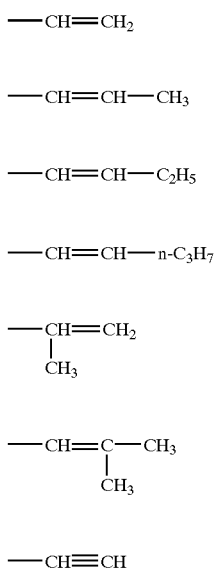
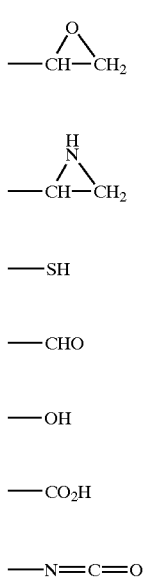

(Q1)
(Q2)
(Q3)
(Q4)
(Q5)
(Q6)
(Q7)
(Q8)
(Q9)
(Q10)
(Q11)
(Q12)
(Q13)
(Q14)
(Q15)
(Q16)
(Q17)

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

The rod-like liquid crystal molecule preferably has an almost symmetrical structure, and accordingly preferably has a polymerizable group at each end.

Examples of the rod-like liquid crystal molecule are shown below.

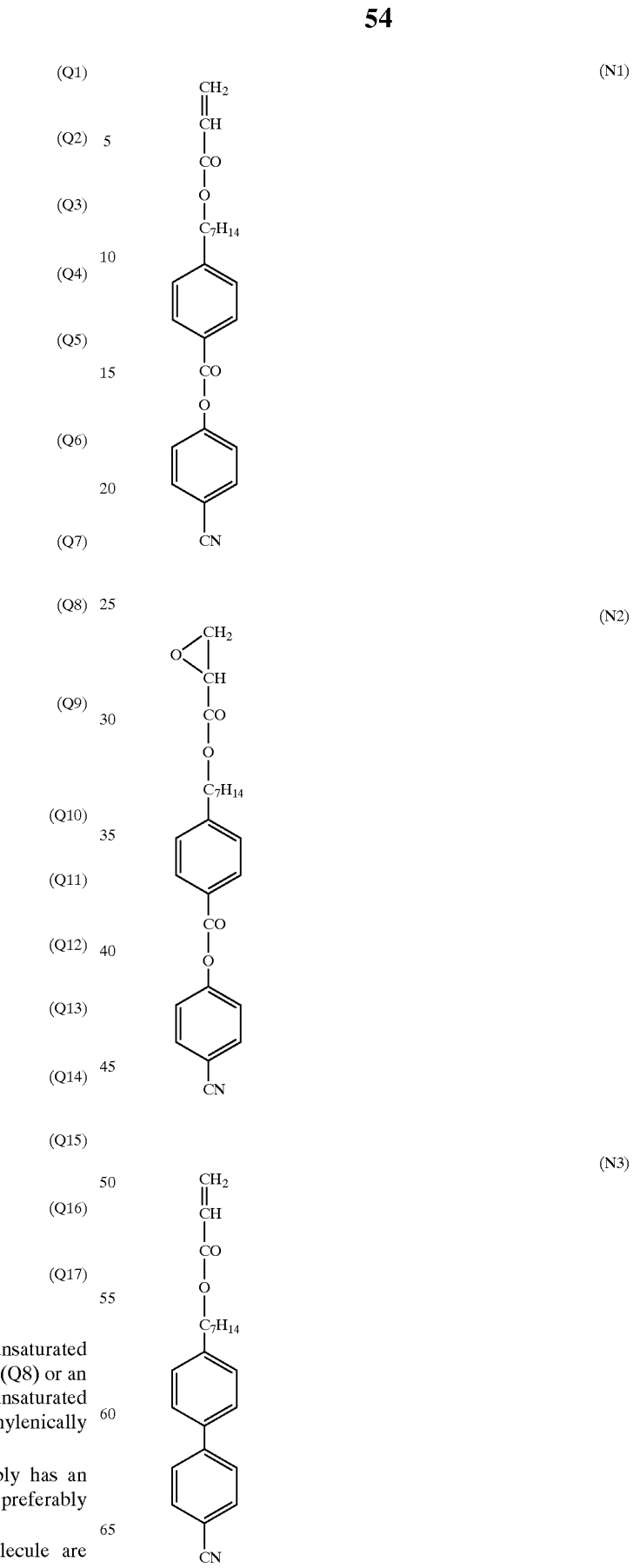

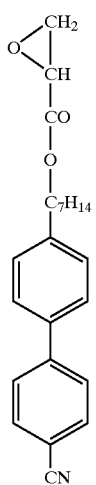
(N4)
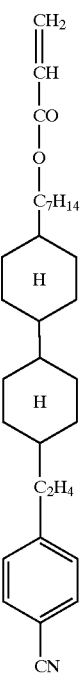
(N7)
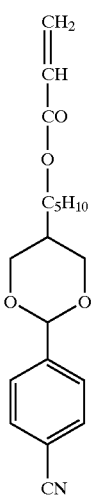
(N8)
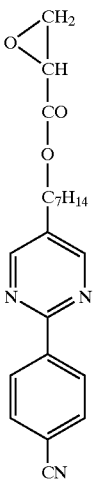
(N9)

(N10)
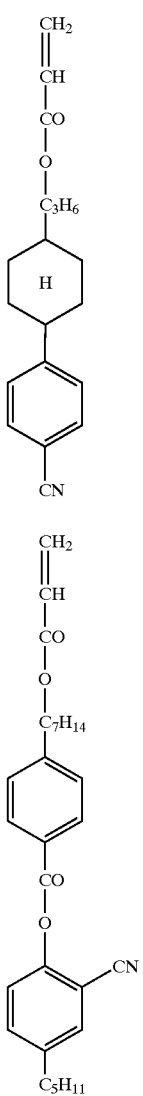
(N11)
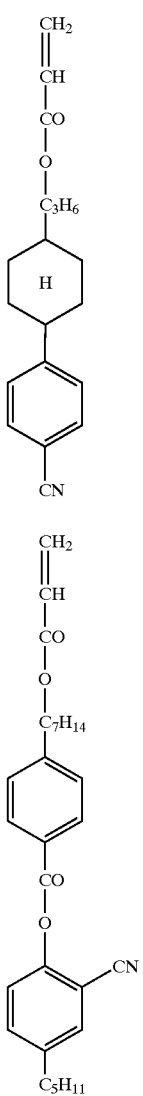
(N12)
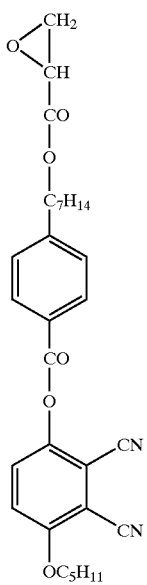
(N13)
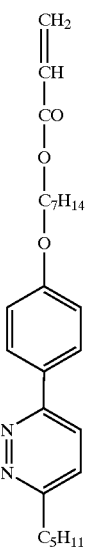
(N14)
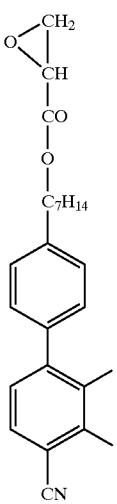
(N15)
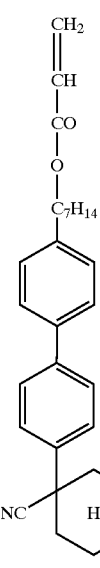

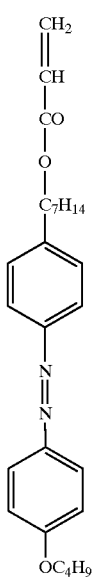
(N16)
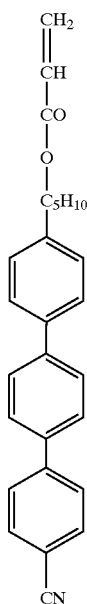
(N18)
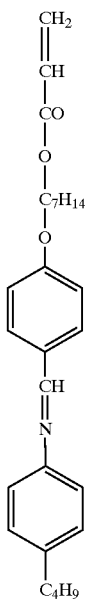
(N17)
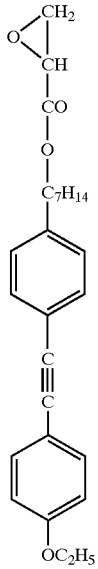
(N19)

(N20)
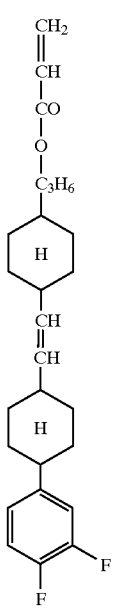
(N21)
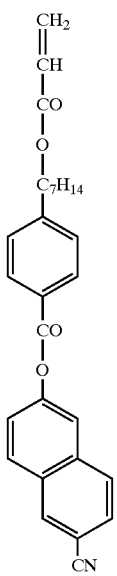
(N22)
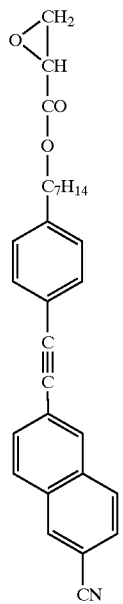
(N23)
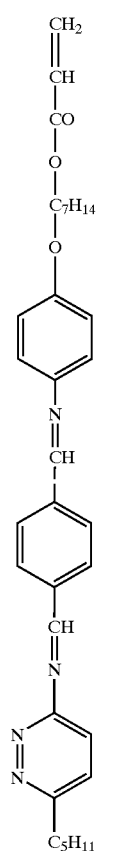

(N24) 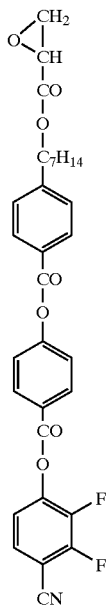
(N25) 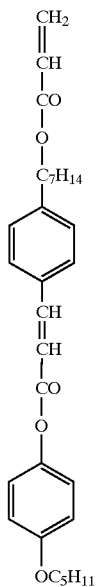
(N26) 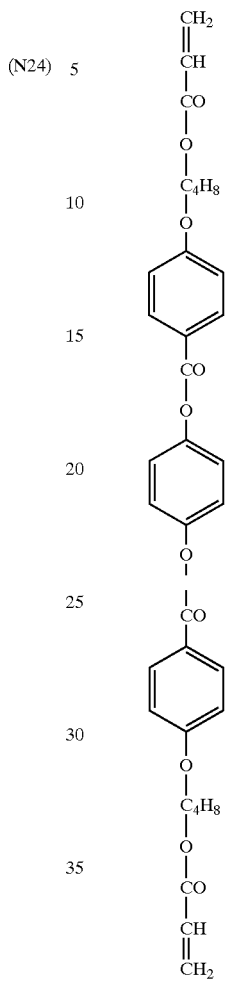
(N27) 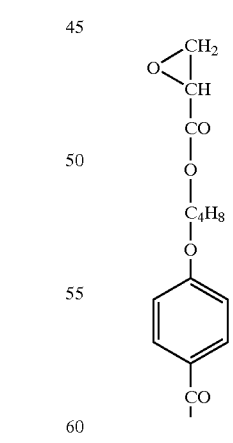

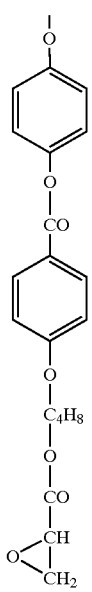
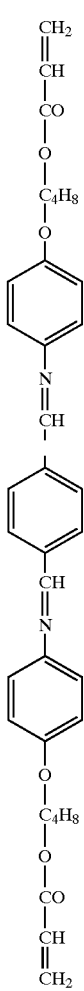
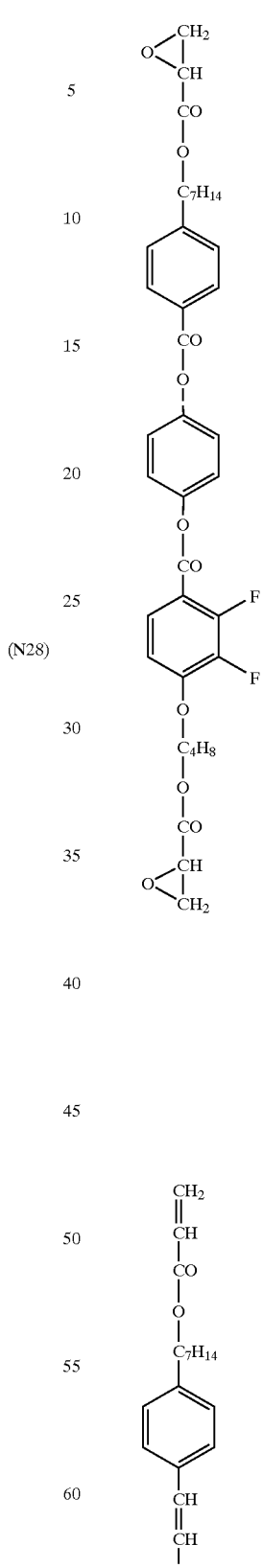

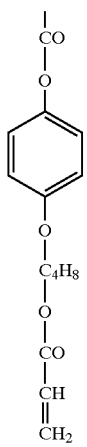
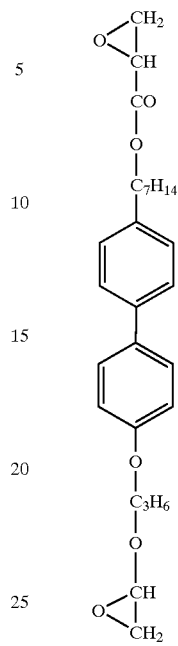
(N31)
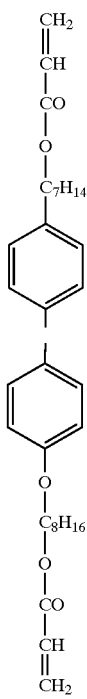
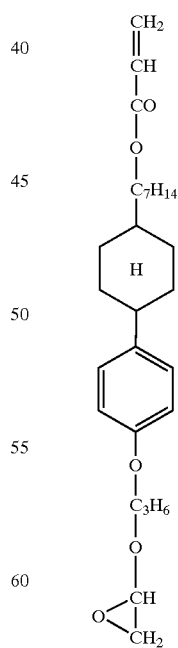
(N32)
(N33)

(N34)
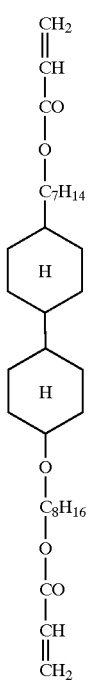
(N35)
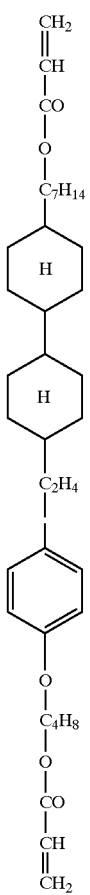
(N36)
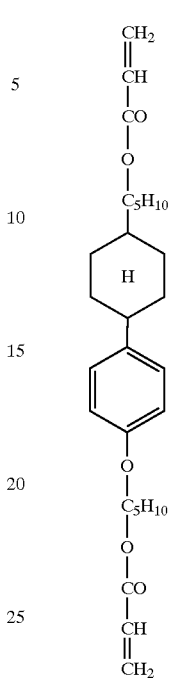
(N37)
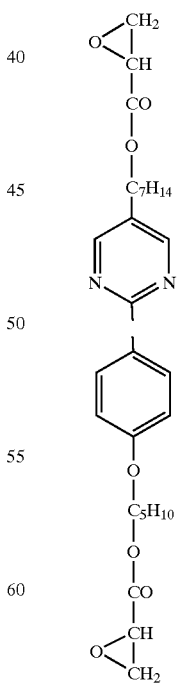

(N38) 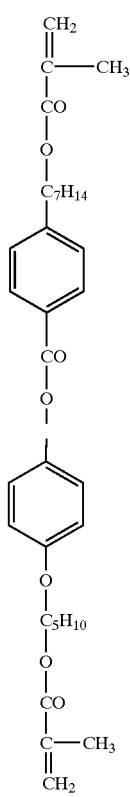
(N39) 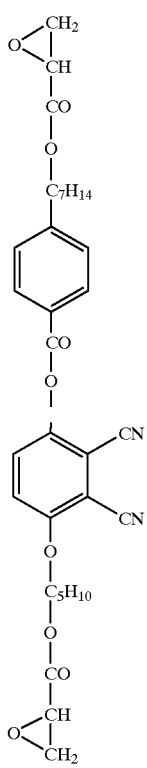
(N40) 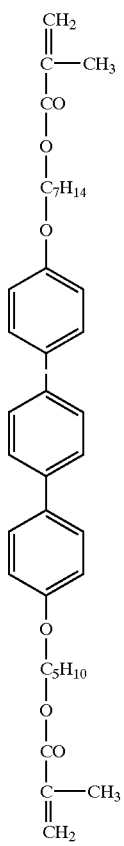
(N41) 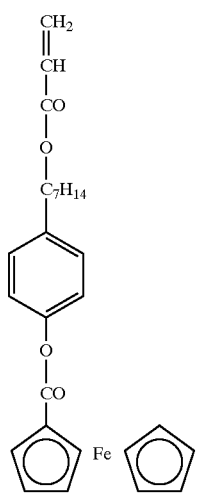

(N42) 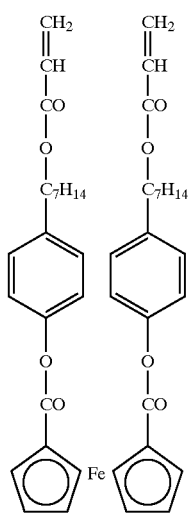
(N43) 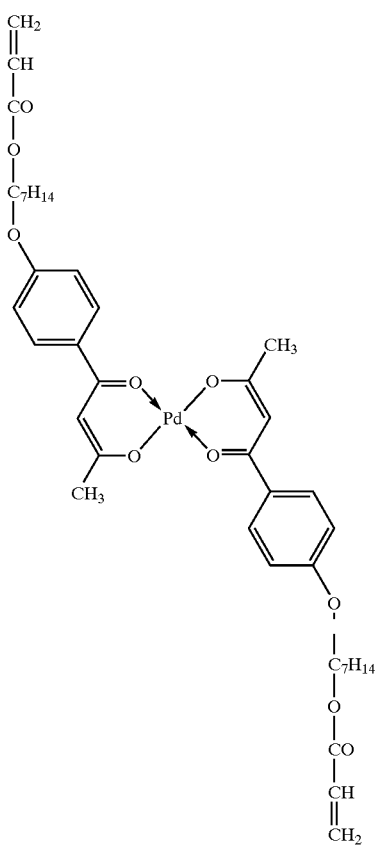
(N44) 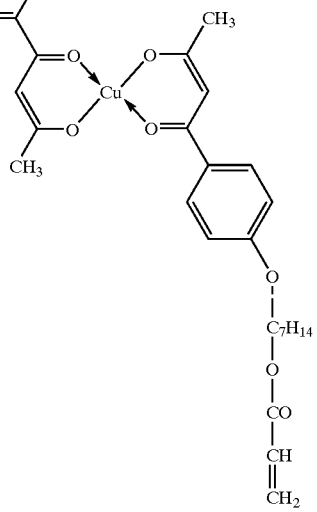
(N45) 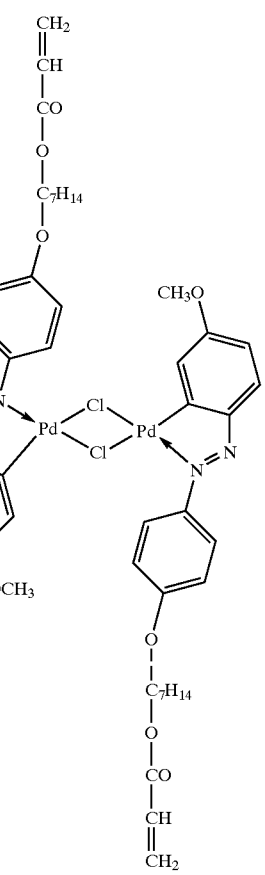

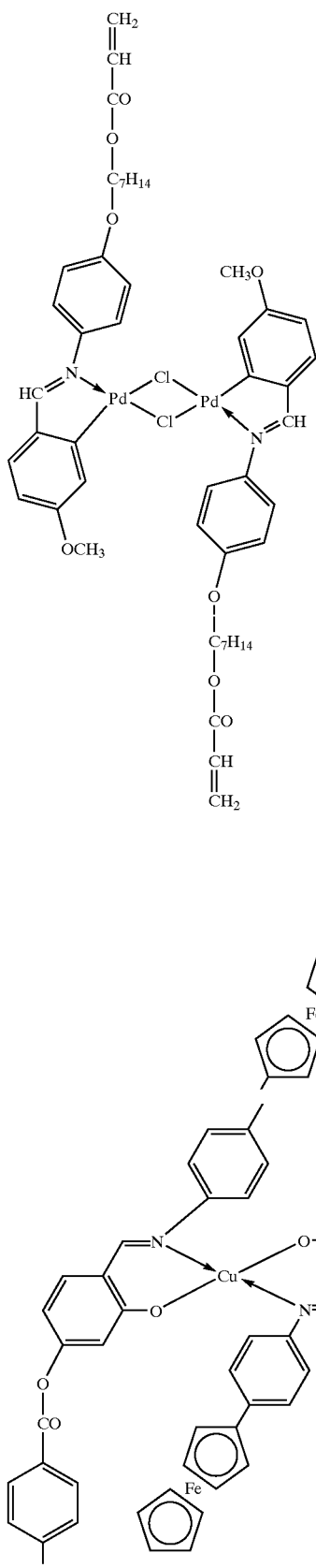
(N46)
(N47)
(N48)
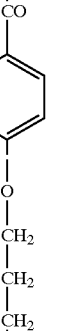

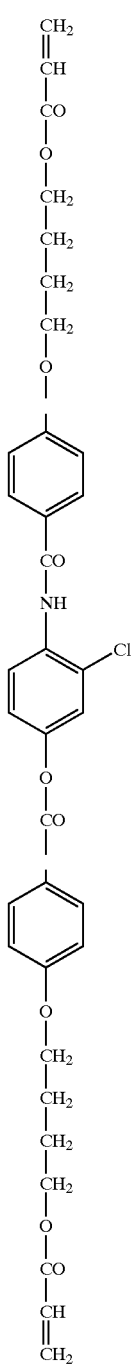 (N49)
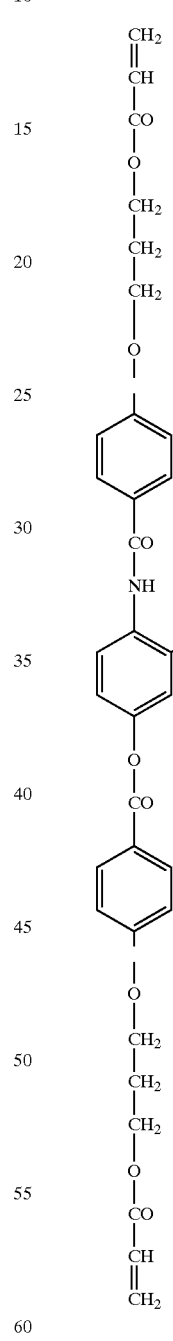 (N50)

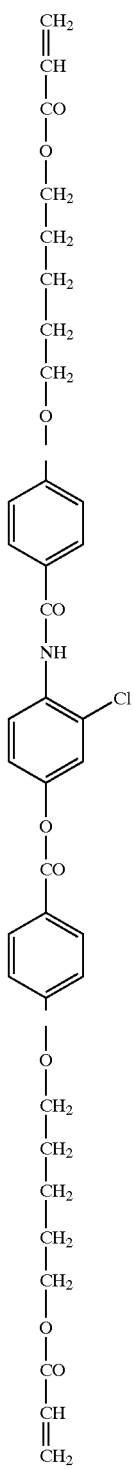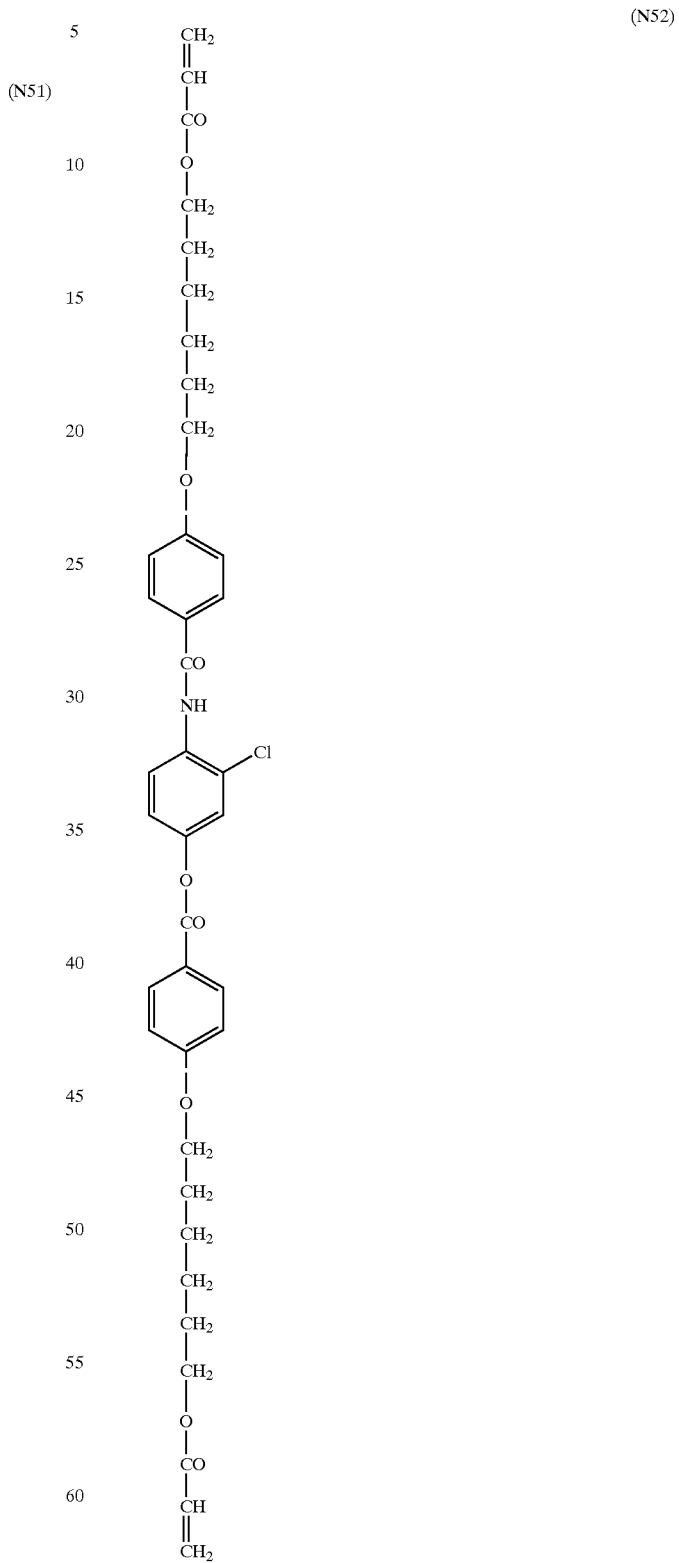

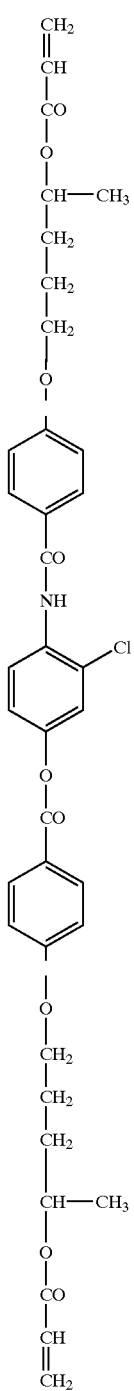
(N53)
(N54)

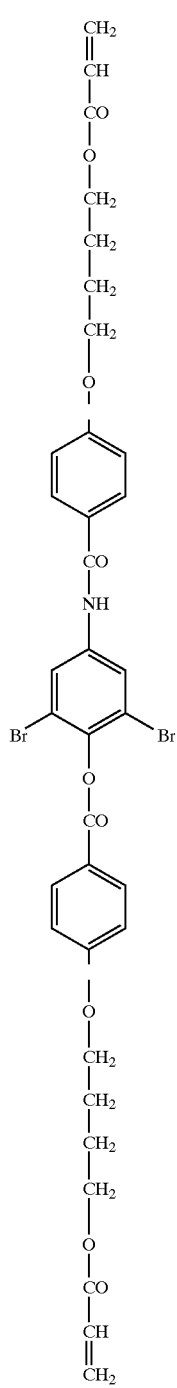
(N55)
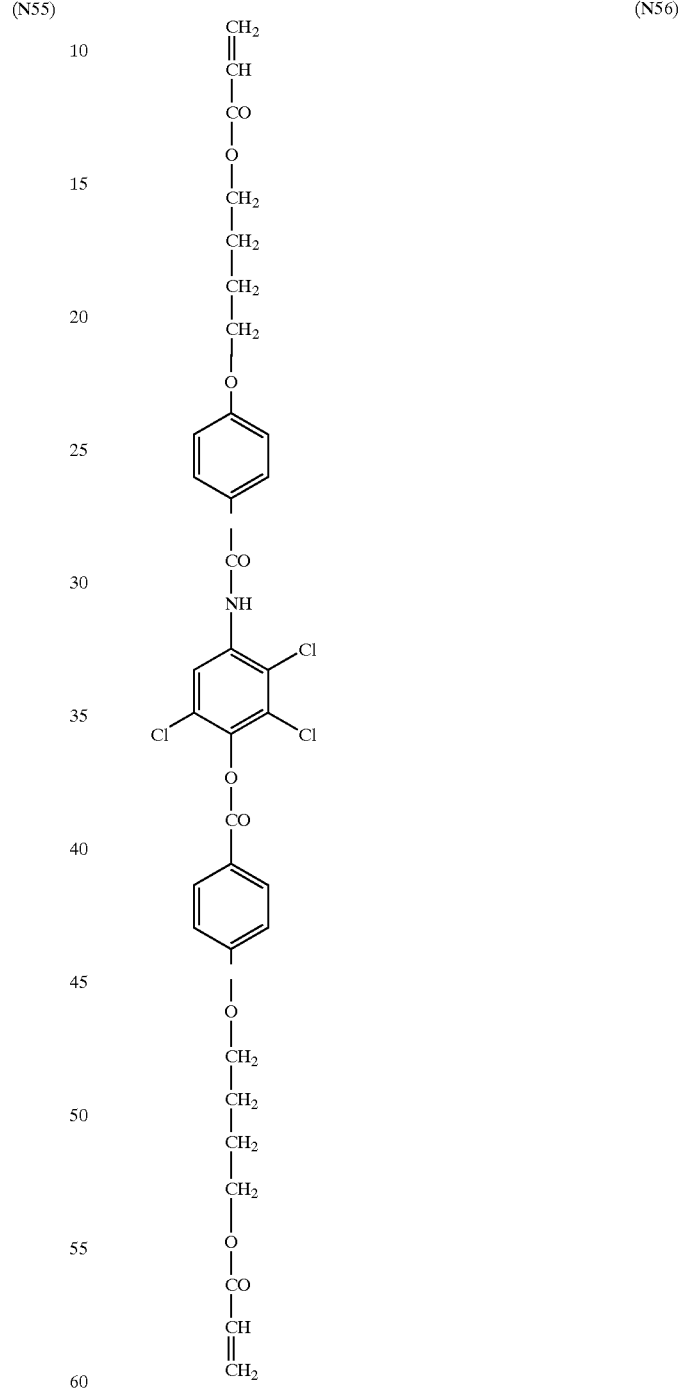
(N56)

(N57)
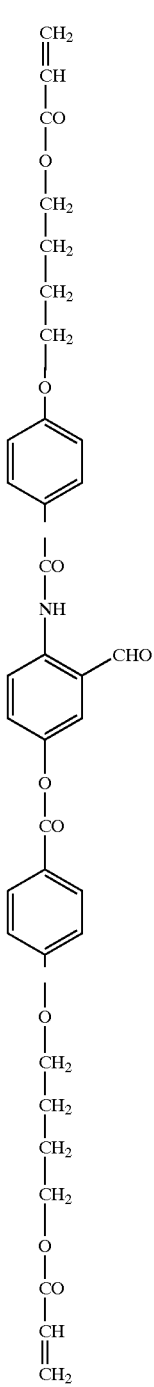
(N58)
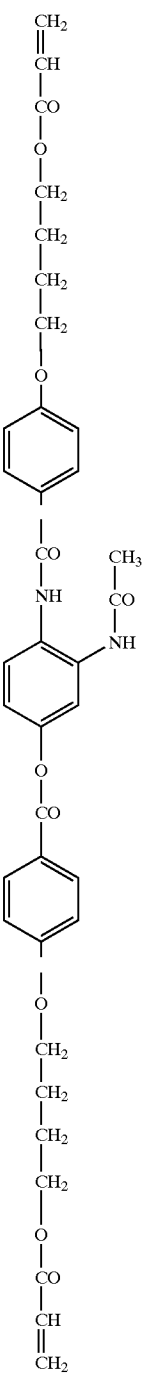

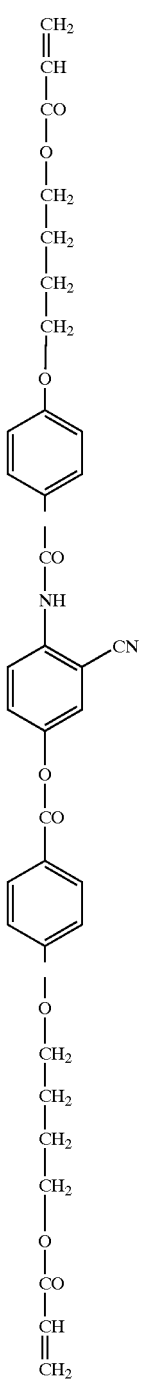
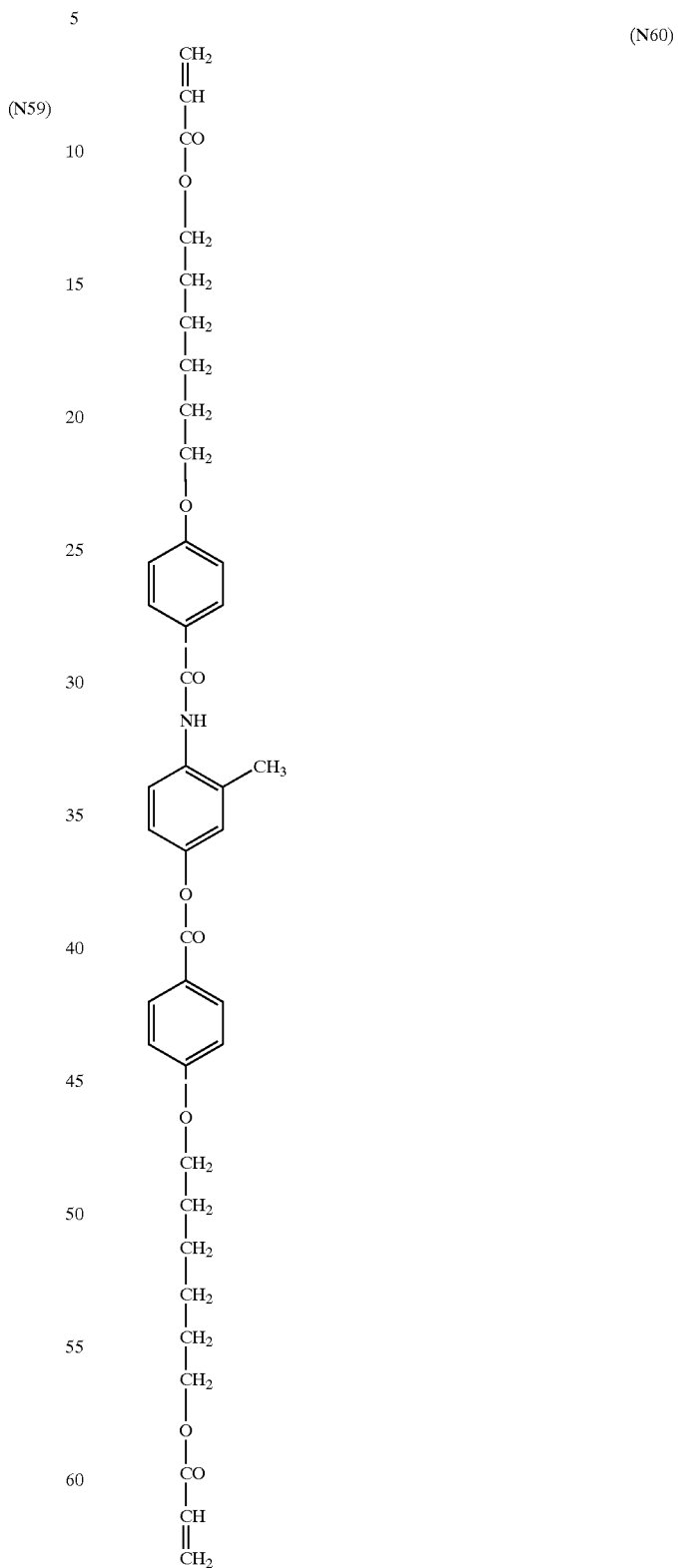

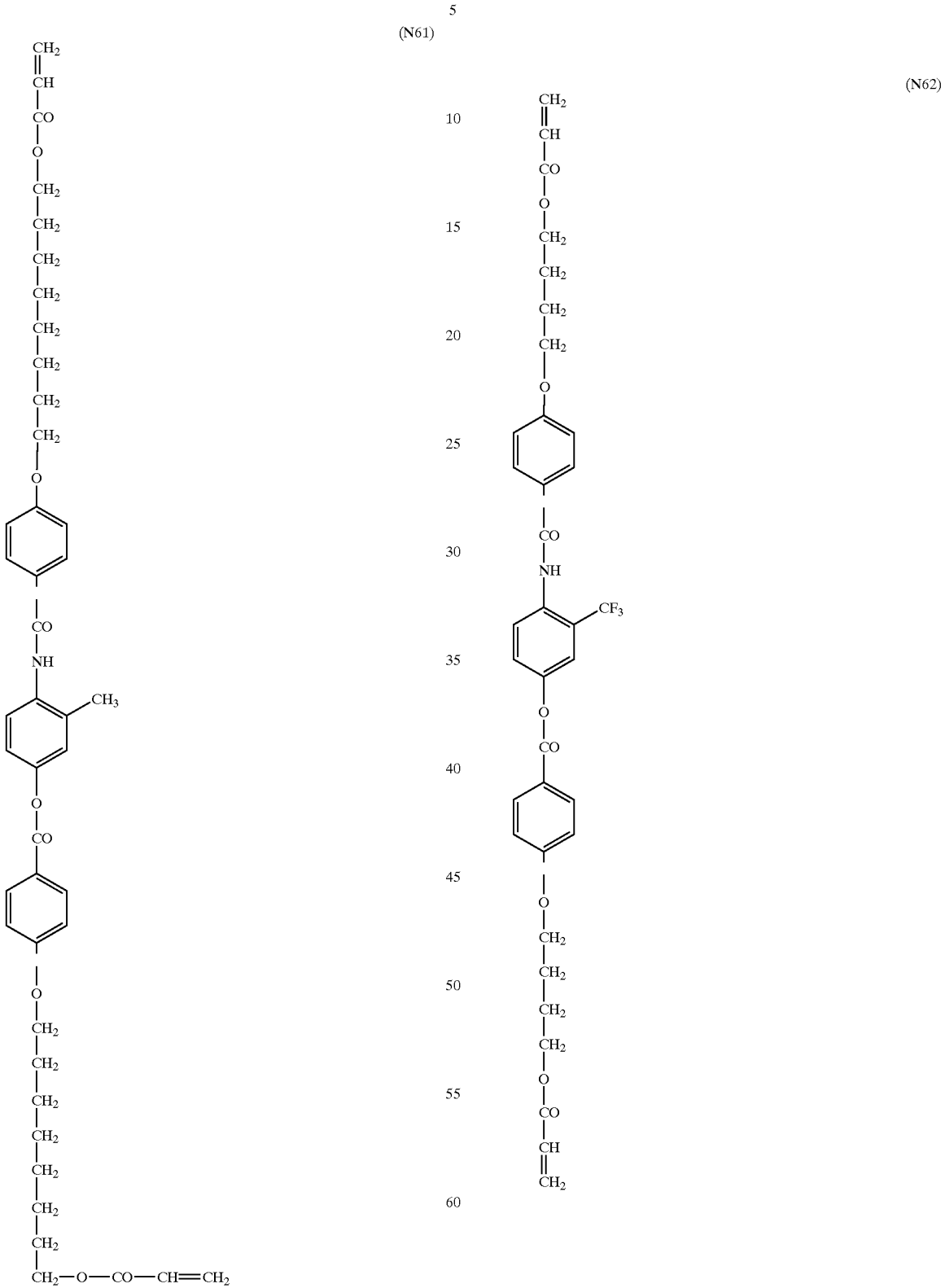

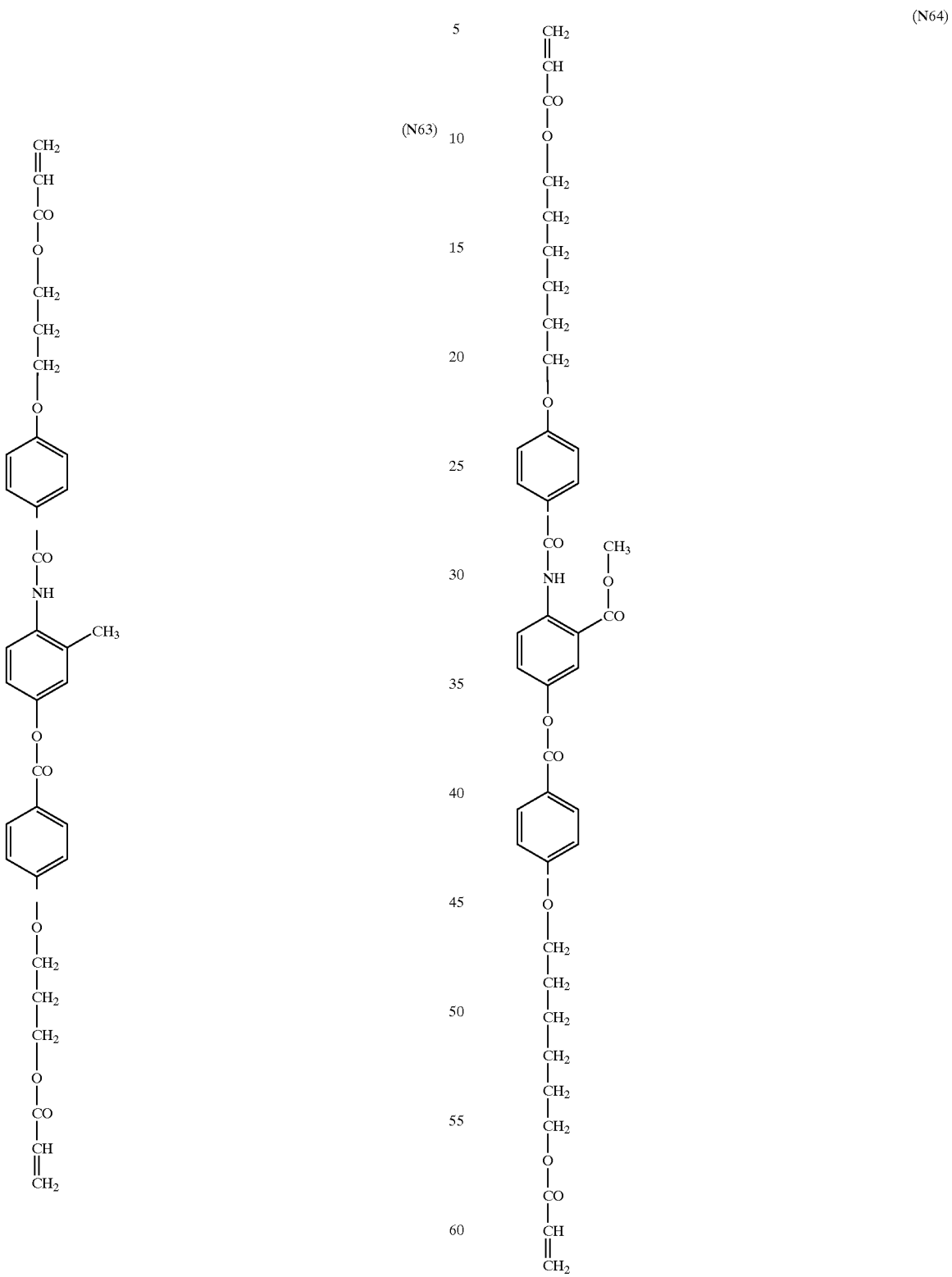

(N65)

(N66)

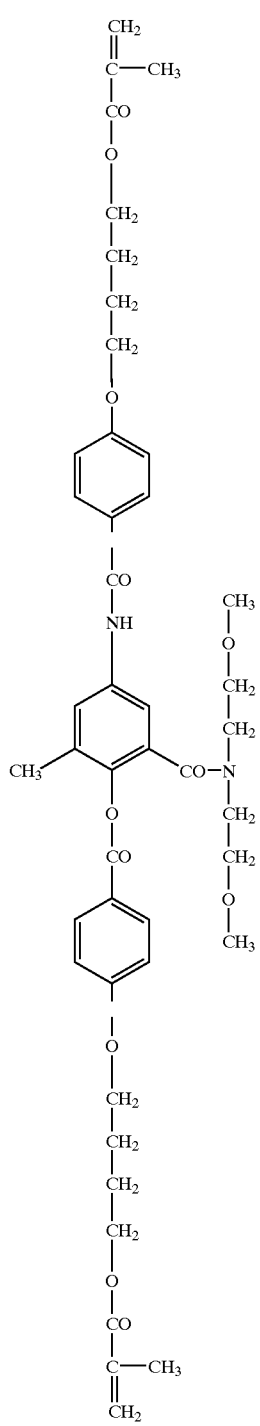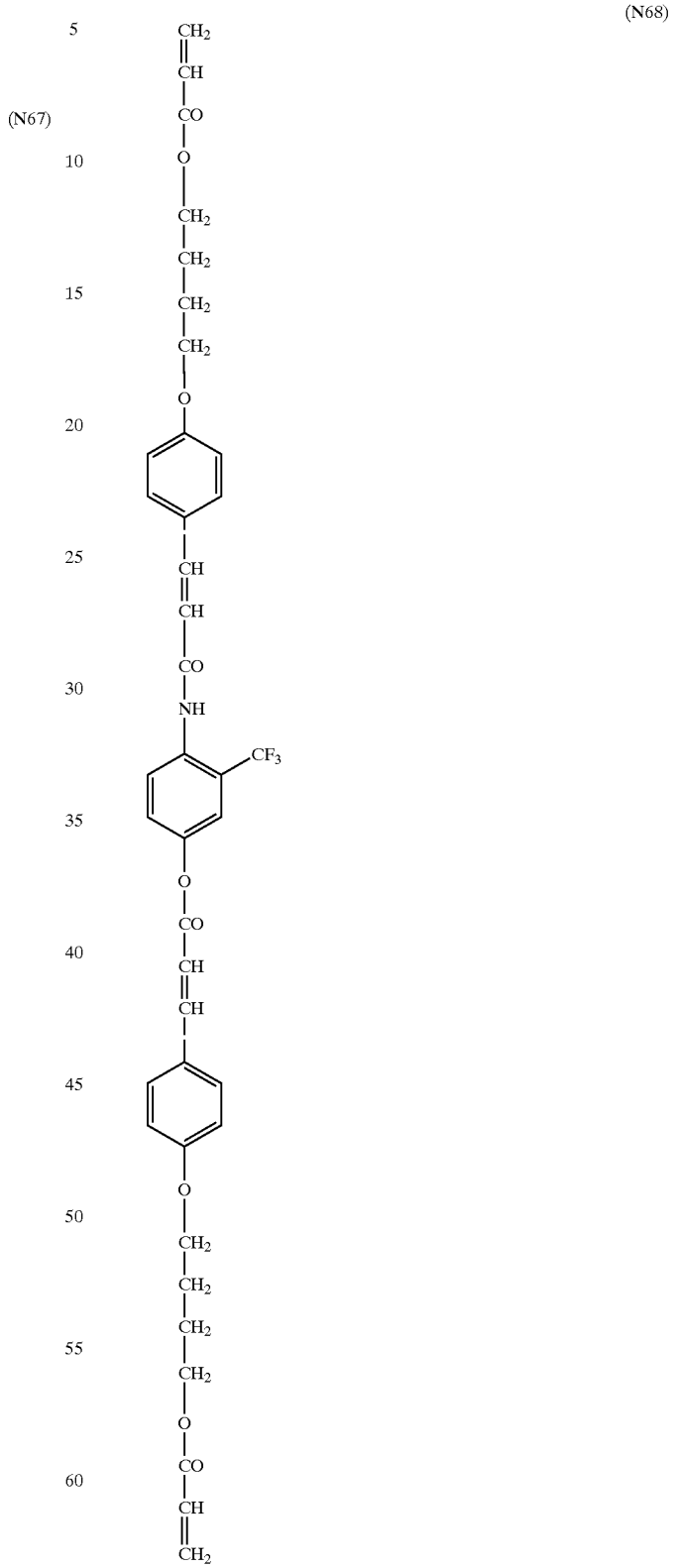

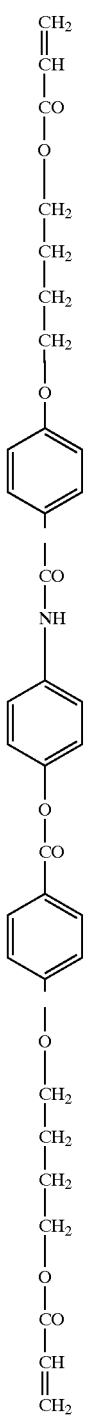
(N69)
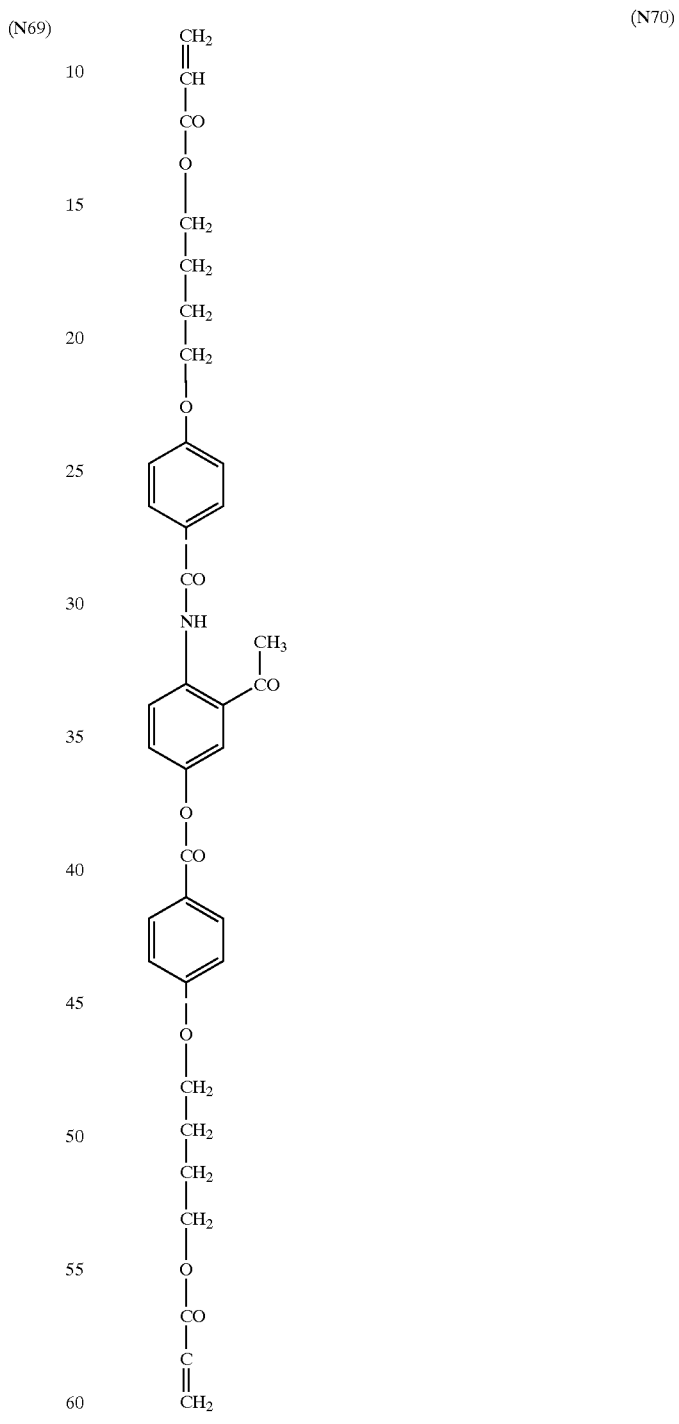
(N70)

-continued (N71)

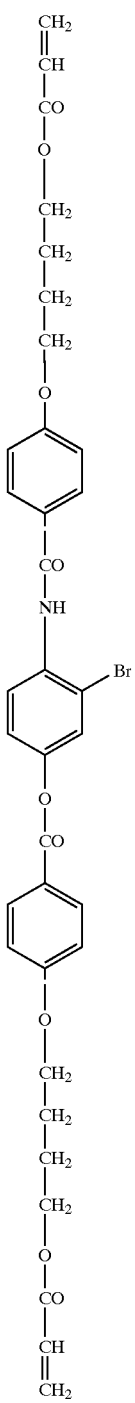

[Formation of Liquid Crystal Layer]

For forming the liquid crystal layer, a liquid crystal composition containing the alignment promoter and the rod-like liquid crystal molecules is applied on the orientation layer.

The liquid crystal composition may further contain a solvent, a polymerization initiator and other additives (e.g., cellulose ester), as well as the alignment promoter and the rod-like liquid crystal molecules.

The solvent for the composition preferably is an organic solvent. Examples of the organic solvents include amides (e.g., N,N-dimethylformamide), sulfoxides (e.g., dimethyl-sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The composition can be coated according to a conventional coating method such as a wire-bar coating method, an extrusion coating method, a direct gravure coating method, a reverse gravure coating method or a die coating method.

The rod-like liquid crystal molecules are preferably fixed with their alignment maintained. Preferably, they are fixed by polymerization reaction of the polymerizable groups (Q).

The polymerization reaction can be classified into a thermal reaction with a thermal polymerization initiator and a photo reaction with a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per cm$^2$, and more preferably in the range of 100 to 800 mJ per cm$^2$. The light irradiation can be conducted while the layer is heated to accelerate the photo polymerization reaction.

The thickness of the liquid crystal layer is preferably in the range of 0.1 to 50 μm, more preferably in the range of 1 to 30 μm, and most preferably in the range of 5 to 20 μm.

The amount of the alignment promoter in the liquid crystal layer is preferably in the range of 0.005 to 0.5 g/m$^2$, more preferably in the range of 0.01 to 0.45 g/m$^2$, further preferably in the range of 0.02 to 0.4 g/m$^2$ and most preferably in the range of 0.03 to 0.35 g/m$^2$.

[Orientation Layer]

In order to align the rod-like liquid crystal molecules vertically (at an average inclined angle of 50° to 90°), a vertically aligning orientation layer is used. For the function of vertically aligning the molecules, a polymer lowering surface energy is preferably used in the orientation layer. The polymer preferably contains a hydrocarbon group having 10 to 100 carbon atoms at the side chain so that the surface energy of the orientation layer may be lowered.

The orientation layer having the vertical aligning function (the function of vertically aligning the rod-like liquid crystal molecules at an average inclined angle of 50° to 90°) has been already practically used, for example, as an orientation layer in a VA (vertically aligned) liquid crystal cell. Such orientation layer may be used in the present invention.

The orientation layer for vertical alignment preferably comprises an acrylic copolymer having the repeating units represented by the following formulas (II) and (III).

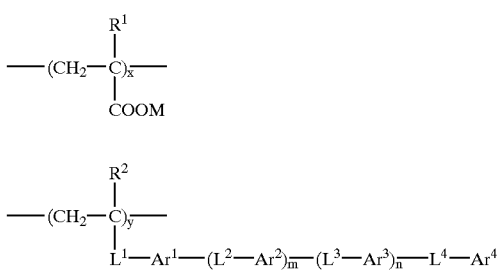

(II)

(III)

In the formula (II), $R^1$ is hydrogen, a halogen atom or an alkyl group having 1 to 6 carbon atoms; preferably hydrogen or an alkyl group having 1 to 6 carbon atoms; more preferably hydrogen, methyl or ethyl; most preferably hydrogen or methyl. If $R^1$ is hydrogen, the polymer is acrylic copolymer. If $R^1$ is methyl, the polymer is methacrylic copolymer.

In the formula (II), M is proton, an alkali metal ion ($Li^+$, $Na^+$, $K^+$, $Cs^+$) or an ammonium ion, which may be substituted with organic groups (e.g., methyl) [namely, the ammonium ion may be primary, secondary, tertiary or quaternary). Examples of the ammonium ion include $NH_4$, $NH_3CH_3$, $NH_2(CH_3)_2$, $NH(CH_3)_3$ and $N(CH_3)_4$.

Since COOM in the formula (II) is a hydrophilic group, the acrylic copolymer is water-soluble. Accordingly, the orientation layer can be formed with an aqueous solvent.

In the formula (II), x is 10 to 95 mol. %, preferably 25 to 90 mol. %.

In the formula (III), $R^2$ is hydrogen, a halogen atom or an alkyl group having 1 to 6 carbon atoms, preferably hydrogen or an alkyl group having 1 to 6 carbon atoms, more preferably hydrogen, methyl or ethyl, and most preferably hydrogen or methyl.

In the formula (III), $L^1$ is a divalent linking group selected from the group consisting of —O—, —CO—, —NH—, an alkylene group and a combination thereof. The divalent linking group $L^1$ is preferably —CO—O—, —CO—NH—, —CO—O-alkylene-, —CO—O-alkylene-O— or —CO—O-alkylene—CO—O—, and more preferably —CO—O— or —CO—NH—.

The alkylene group may have a branched or cyclic structure. The alkylene group preferably has 1 to 30 carbon atoms, has more preferably 1 to 15 carbon atoms, and most preferably has 1 to 12 carbon atoms.

In the formula (III), each of $L^2$, $L^3$ and $L^4$ is independently a single bond or a divalent linking group selected from the group consisting of —O—, —CO—, —NH—, —$SO_2$—, an alkylene group, an alkenylene group, an alkynylene group and a combination thereof. At least one of $L^2$, $L^3$ and $L^4$ is preferably a single bond or ethynylene (—C≡C—), more preferably ethynylene. Preferably, each of $L^2$, $L^3$ and $L^4$ is independently a single bond, ethynylene, —CO—, —O—CO—, —CO—O—, -alkylene-O—, —CO—NH—, —O—CO—O—, —NH—$SO_2$— or —NH—CO—O—.

The alkylene, alkenylene or alkynylene group may have a branched or cyclic structure. The alkylene group preferably has 1 to 30 carbon atoms, more preferably has 1 to 15 carbon atoms, and most preferably has 1 to 12 carbon atoms. The alkenylene or alkynylene group preferably has 2 to 30 carbon atoms, more preferably has 2 to 15 carbon atoms, and most preferably has 2 to 12 carbon atoms.

In the formula (III), each of $Ar^1$, $Ar^2$, $Ar^3$ and $Ar^4$ independently is an aromatic or aromatic heterocyclic ring, which can have a substituent group. Each of $Ar^1$, $Ar^2$, $Ar^3$ and $Ar^4$ preferably is an aromatic ring (which may have substituent groups).

The aromatic ring consists of preferably 6 to 18 carbon atoms. Examples of the aromatic ring include benzene ring, naphthalene ring, anthracene ring, phenanthrene ring, pyrene ring and naphthacene ring. Benzene ring and naphthalene ring are preferred, and benzene ring is particularly preferred.

Examples of the substituent group which may be contained in the aromatic or aromatic heterocyclic ring include a halogen atom, carboxyl, cyano, nitro, carbamoyl, sulfamoyl, an alkyl group, an alkoxy group, an alkylthio group, an acyl group, an acyloxy group, an alkylsubstituted carbamoyl group, an alkyl-substituted sulfamoyl group, an amido group, a sulfonamido group and an alkylsulfonyl group.

The alkyl group may have a branched or cyclic structure. The alkyl group preferably has 1 to 20 carbon atoms, more preferably has 1 to 15 carbon atoms, further preferably has 1 to 10 carbon atoms, and most preferably has 1 to 6 carbon atoms.

The alicyclic hydrocarbon group is preferably cyclohexyl. The heterocyclic group is preferably pyrimidine.

In the formula (III), each of m and n is independently 0 or 1. Preferably, m is 0 or 1 while n is 0 (the number of the aromatic ring and the aromatic heterocyclic ring is 2 or 3). More preferably, each of m and n is 0 (the number of the aromatic ring and the aromatic heterocyclic ring is 2).

In the formula (III), y is 5 to 90 mol. %, and preferably is 10 to 75 mol. %.

Examples of the repeating unit represented by the formula (III) are shown below (except that the cases where $L^2$, $L^3$ or $L^4$ is —C≡C—).

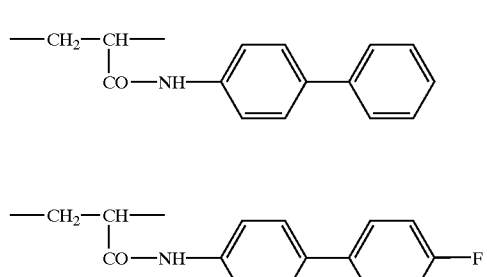

(III-1)

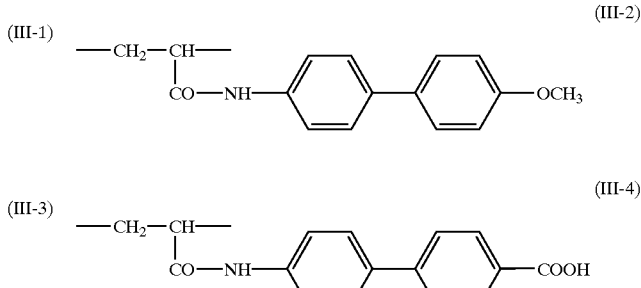

(III-2)

(III-3)

(III-4)

-continued
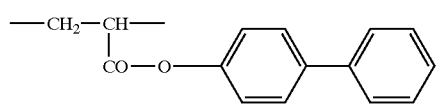 (III-5)
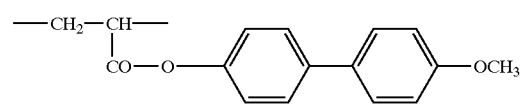 (III-6)
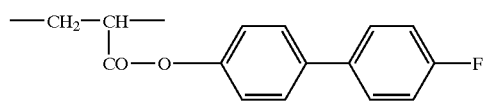 (III-7)
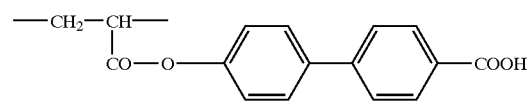 (III-8)
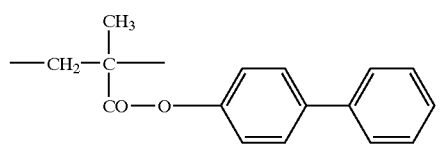 (III-9)
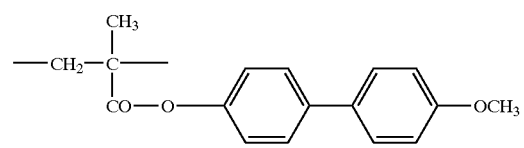 (III-10)
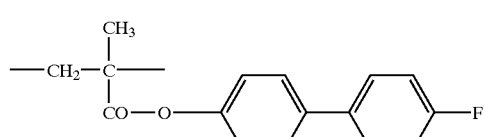 (III-11)
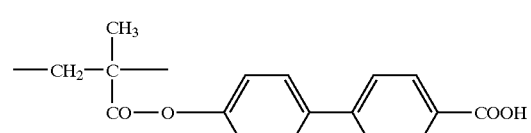 (III-12)
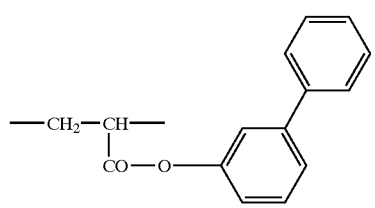 (III-13)
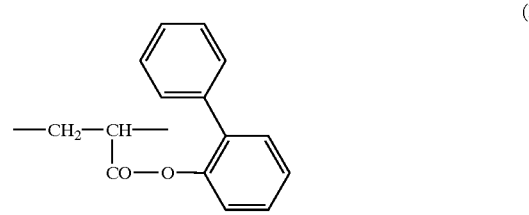 (III-14)
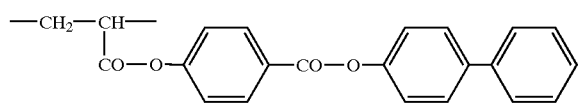 (III-15)
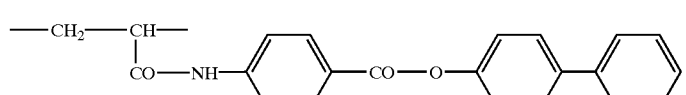 (III-16)
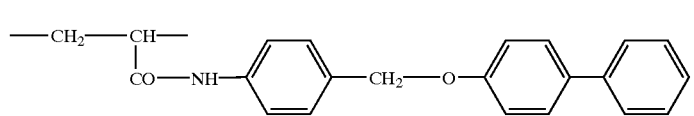 (III-17)
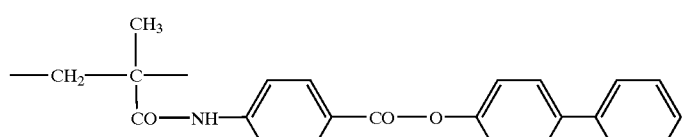 (III-18)
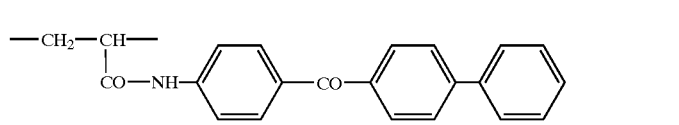 (III-19)
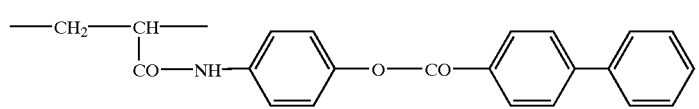 (III-20)

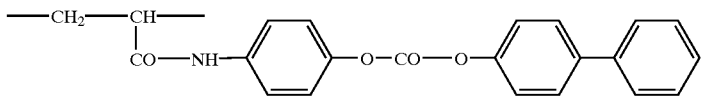
(III-21)
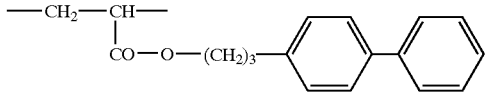
(III-22)
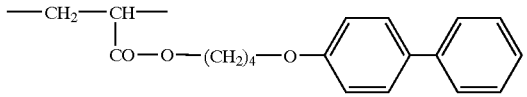
(III-23)
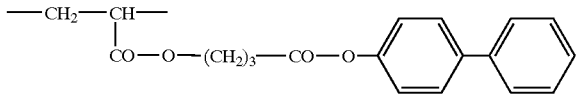
(III-24)
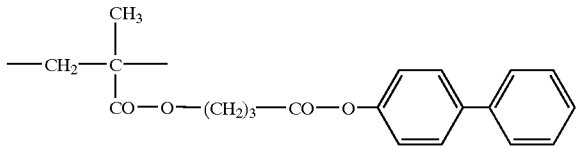
(III-25)
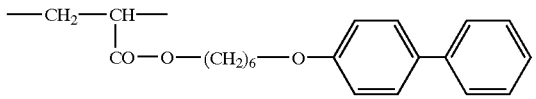
(III-26)
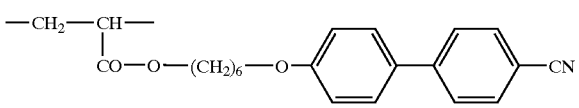
(III-27)
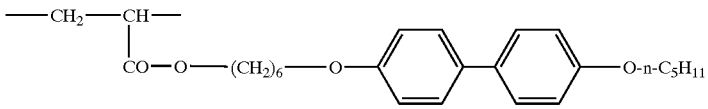
(III-28)
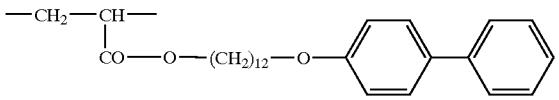
(III-29)
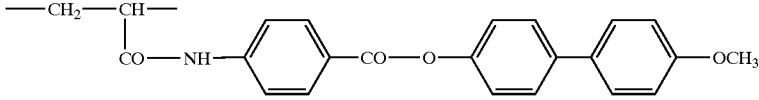
(III-30)
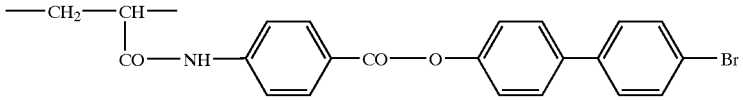
(III-31)
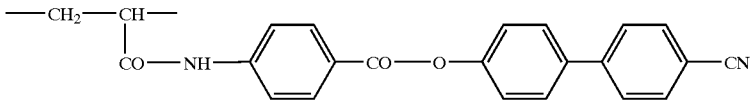
(III-32)
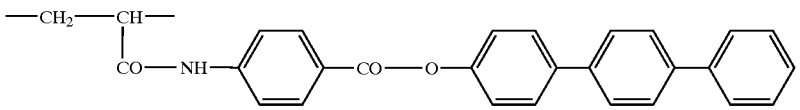
(III-33)

-continued
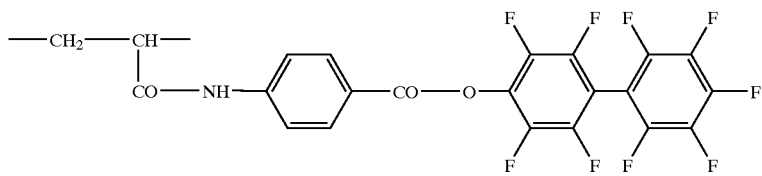 (III-34)
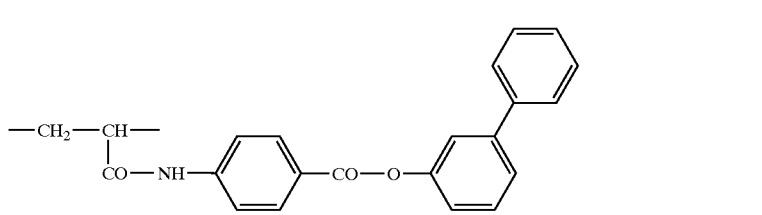 (III-35)
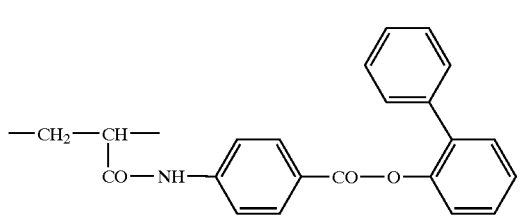 (III-36)
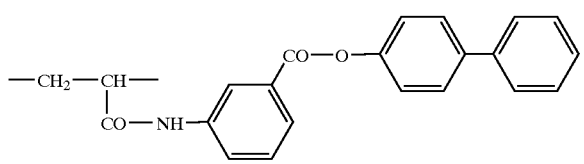 (III-37)
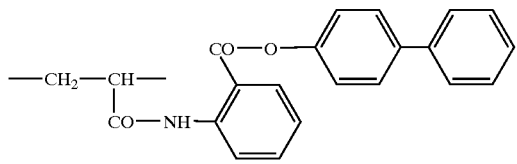 (III-38)
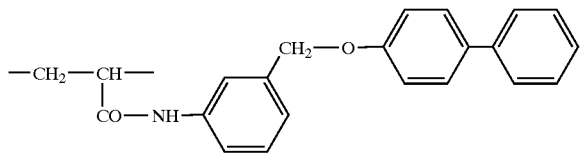 (III-39)
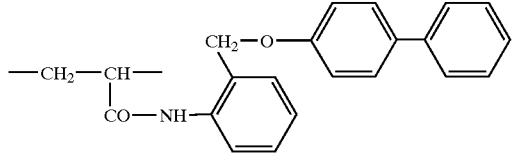 (III-40)
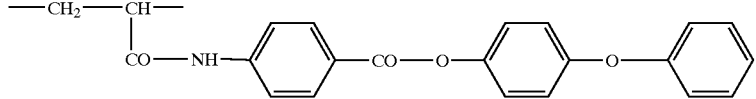 (III-41)
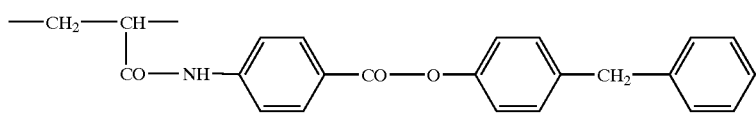 (III-42)

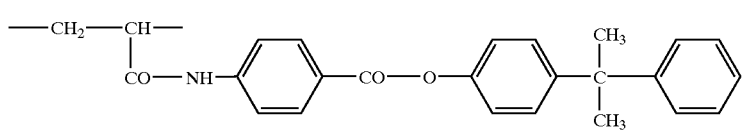
(III-43)
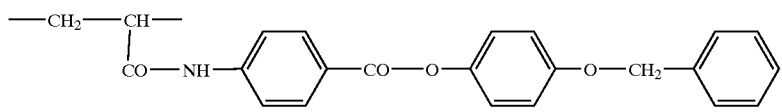
(III-44)
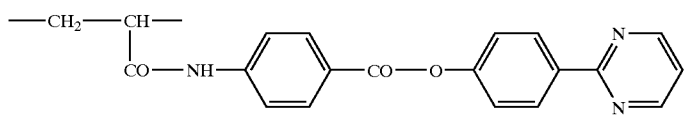
(III-45)
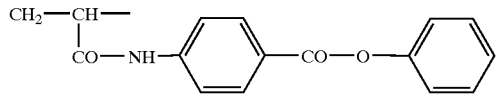
(III-46)
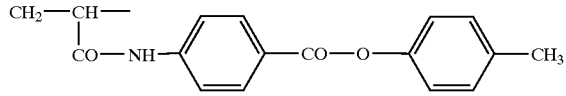
(III-47)
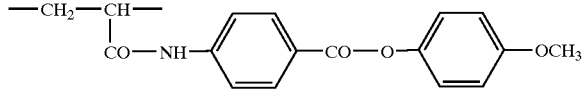
(III-48)
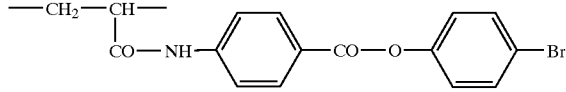
(III-49)
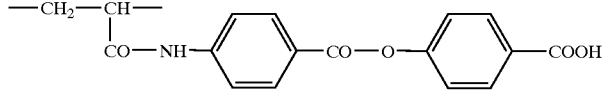
(III-50)
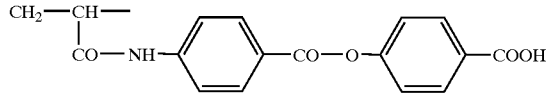
(III-51)
(III-51)
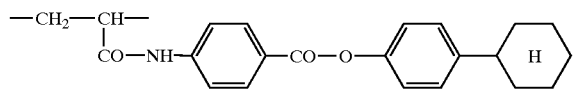
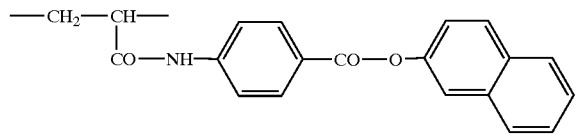
(III-52)
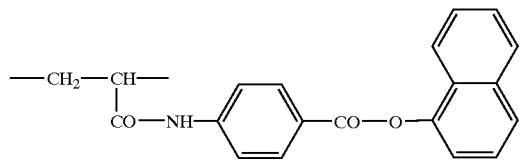
(III-53)

-continued

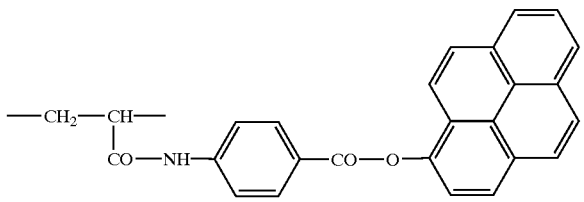
(III-54)

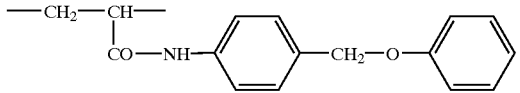
(III-55)

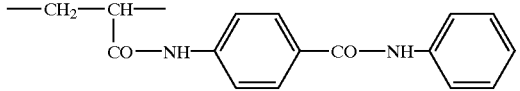
(III-56)

(III-57)

Examples of the acrylic copolymer are shown below (except that the cases where $L^2$, $L^3$ or $L^4$ is —C≡C—). In the following examples, AA and MA represent repeating units derived from acrylic acid and methacrylic acid, respectively. The ratio of each repeating unit is in terms of mol. %.

| | |
|---|---|
| PA101: | -(AA)60-(III-1)40- |
| PA102: | -(AA)70-(III-2)30- |
| PA103: | -(AA)60-(III-5)40- |
| PA104: | -(AA)65-(III-9)55- |
| PA105: | -(AA)70-(III-11)30- |
| PA106: | -(AA)80-(III-15)20- |
| PA107: | -(AA)70-(III-15)30- |
| PA108: | -(AA)60-(III-15)40- |
| PA109: | -(AA)70-(III-16)30- |
| PA110: | -(AA)60-(III-16)40- |
| PA111: | -(AA)50-(III-16)50- |
| PA112: | -(AA)70-(III-18)30- |
| PA113: | -(AA)60-(III-18)40- |
| PA114: | -(AA)50-(III-18)50- |
| PA115: | -(AA)60-(III-23)40- |
| PA116: | -(AA)60-(III-25)40- |
| PA117: | -(AA)60-(III-32)40- |
| PA118: | -(AA)60-(III-35)40- |
| PA119: | -(AA)60-(III-37)40- |
| PA120: | -(AA)60-(III-45)40- |
| PA121: | -(AA)60-(III-55)40- |
| PA122: | -(MA)60-(III-1)40- |
| PA123: | -(MA)70-(III-2)30- |

-continued

| | |
|---|---|
| PA124: | -(MA)60-(III-5)40- |
| PA125: | -(MA)65-(III-9)35- |
| PA126: | -(MA)70-(III-11)30- |
| PA127: | -(MA)80-(III-15)20- |
| PA128: | -(MA)70-(III-15)30- |
| PA129: | -(MA)60-(III-15)40- |
| PA130: | -(MA)70-(III-16)30- |
| PA131: | -(MA)60-(III-16)40- |
| PA132: | -(MA)50-(III-16)50- |
| PA133: | -(MA)70-(III-18)30- |
| PA134: | -(MA)60-(III-18)40- |
| PA135: | -(MA)60-(III-18)40- |
| PA136: | -(MA)60-(III-23)40- |
| PA137: | -(MA)60-(III-25)40- |
| PA138: | -(MA)60-(III-32)40- |
| PA139: | -(MA)60-(III-35)40- |
| PA140: | -(MA)60-(III-37)40- |
| PA141: | -(MA)60-(III-45)40- |
| PA142: | -(MA)60-(III-55)40- |

The repeating unit preferably has a side chain containing tolan structure (in which $L^2$, $L^3$ or $L^4$ is —C≡C—, and both sides of —C≡C— connect to aromatic rings). Examples of the repeating unit having the side chain of tolan structure are shown below.

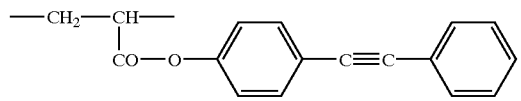
(III-101)

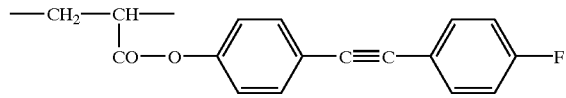
(III-102)

-continued
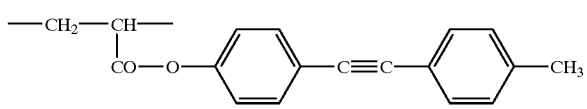 (III-103)
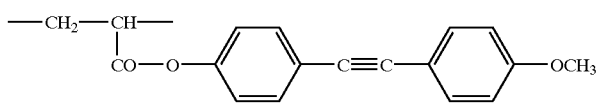 (III-104)
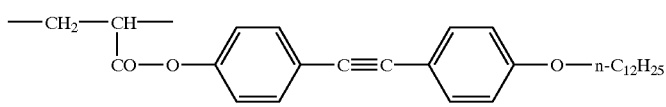 (III-105)
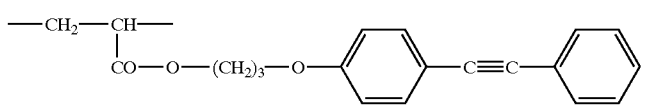 (III-106)
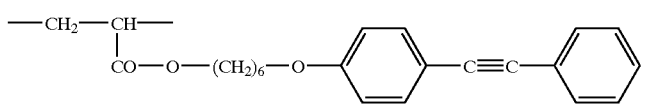 (III-107)
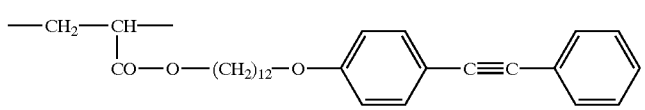 (III-108)
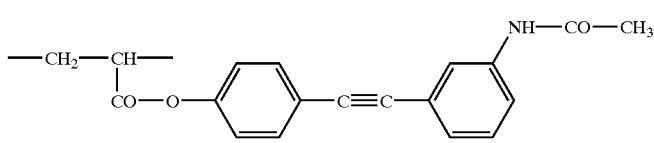 (III-109)
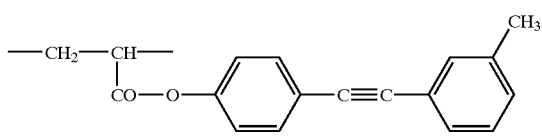 (III-110)
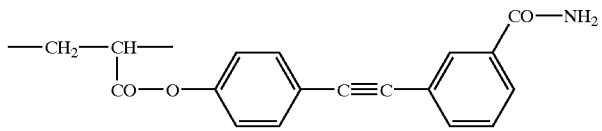 (III-111)
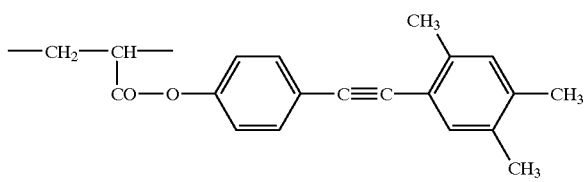 (III-112)
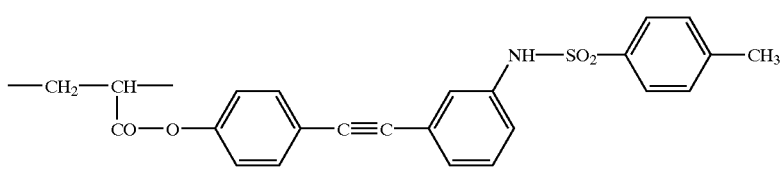 (III-113)
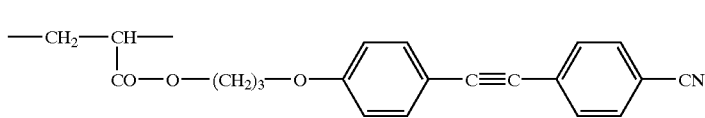 (III-114)

-continued
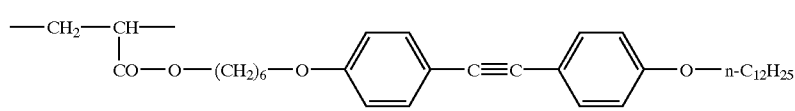
(III-115)
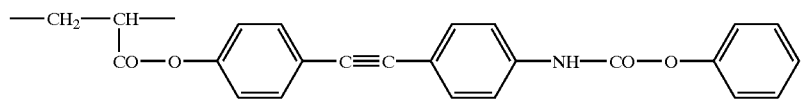
(III-116)
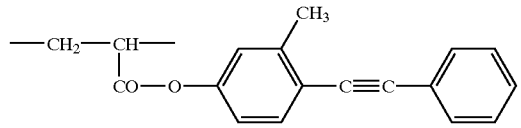
(III-117)
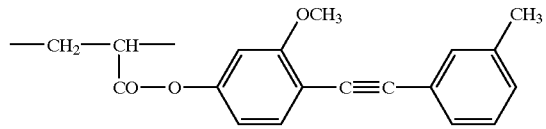
(III-118)
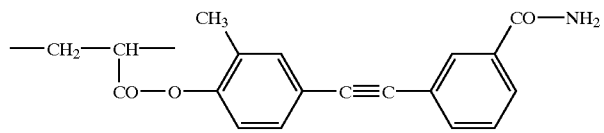
(III-119)
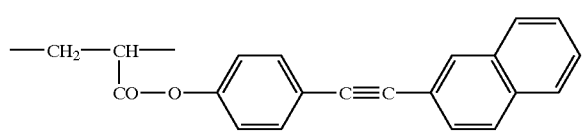
(III-120)
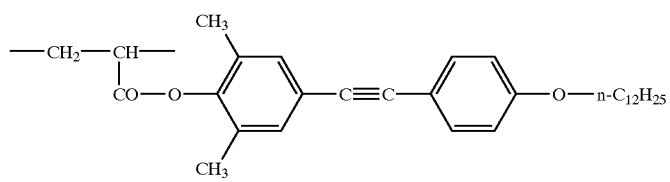
(III-121)
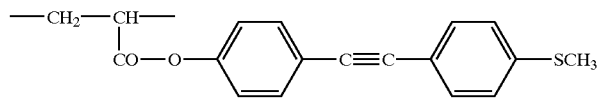
(III-122)
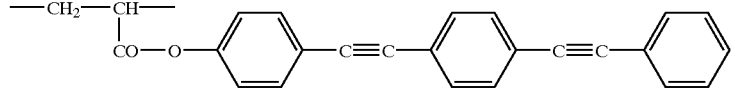
(III-123)
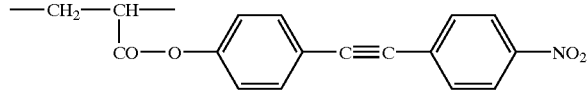
(III-124)
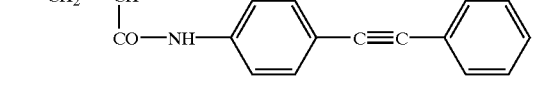
(III-125)
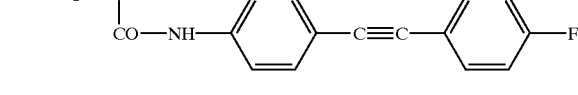
(III-126)
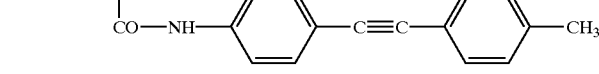
(III-127)

-continued
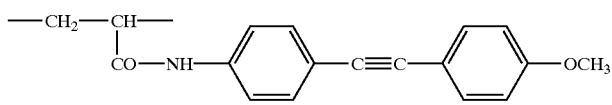
(III-128)
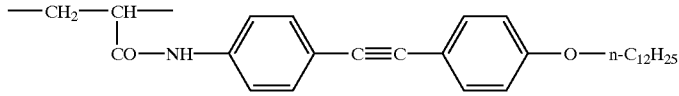
(III-129)
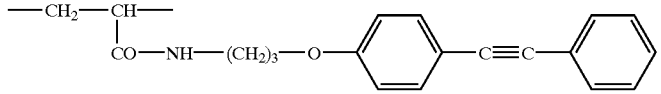
(III-130)
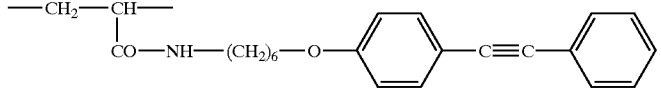
(III-131)
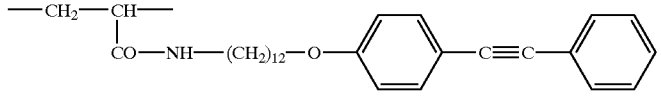
(III-132)
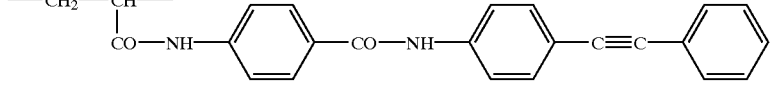
(III-133)
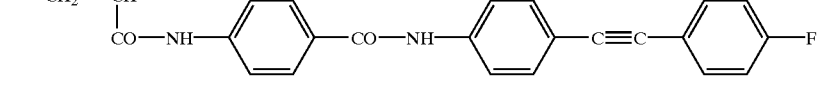
(III-134)
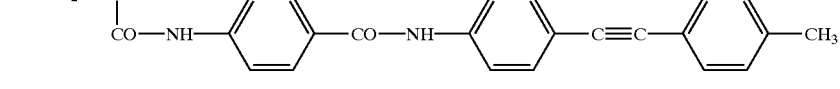
(III-135)
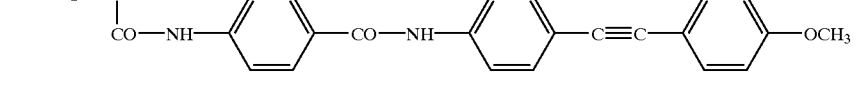
(III-136)
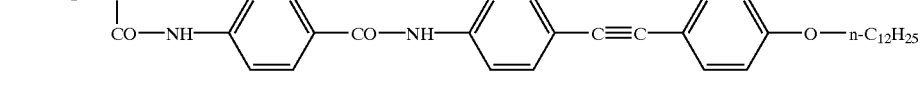
(III-137)
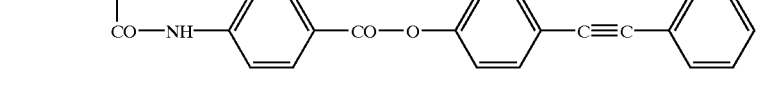
(III-138)
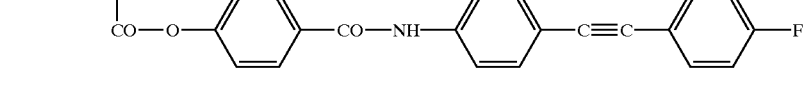
(III-139)
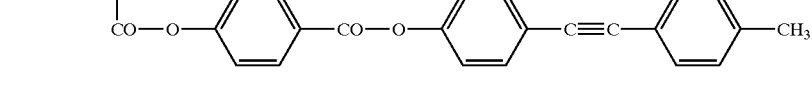
(III-140)
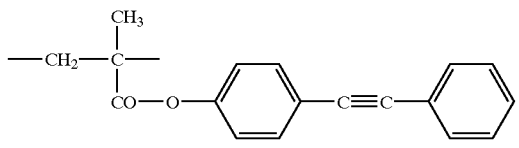
(III-141)

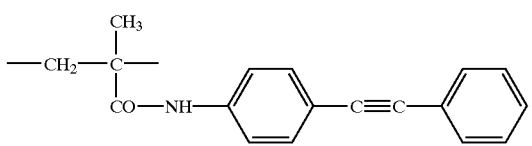
(III-142)

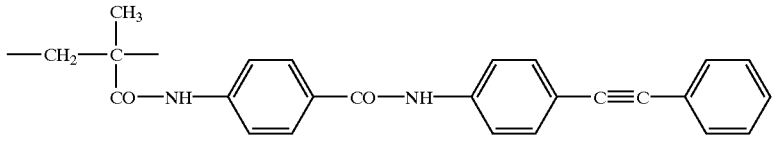
(III-143)

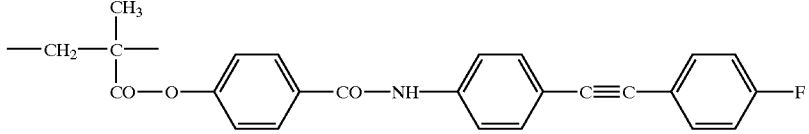
(III-144)

Examples of the acrylic copolymer having the repeating unit containing tolan structure are shown below. In the following examples, AA and MA represent repeating units derived from acrylic acid and methacrylic acid, respectively. The ratio of each repeating unit is in terms of mol. %.

| | |
|---|---|
| PA201: | -(AA)60-(III-101)40- |
| PA202: | -(AA)70-(III-101)30- |
| PA203: | -(AA)60-(III-102)40- |
| PA204: | -(AA)65-(III-107)35- |
| PA205: | -(AA)70-(III-111)30- |
| PA206: | -(AA)80-(III-114)20- |
| PA207: | -(AA)70-(III-120)30- |
| PA208: | -(AA)60-(III-123)40- |
| PA209: | -(AA)70-(III-125)30- |
| PA210: | -(AA)60-(III-125)40- |
| PA211: | -(AA)50-(III-125)50- |
| PA212: | -(AA)70-(III-126)30- |
| PA213: | -(AA)60-(III-128)40- |
| PA214: | -(AA)50-(III-132)50- |
| PA215: | -(AA)70-(III-133)30- |
| PA216: | -(AA)60-(III-133)40- |
| PA217: | -(AA)70-(III-138)30- |
| PA218: | -(AA)60-(III-138)40- |
| PA219: | -(AA)60-(III-139)40- |
| PA220: | -(AA)60-(III-141)40- |
| PA221: | -(AA)60-(III-143)40- |
| PA222: | -(MA)60-(III-101)40- |
| PA223: | -(MA)70-(III-101)30- |
| PA224: | -(MA)60-(III-102)40- |
| PA225: | -(MA)65-(III-107)35- |
| PA226: | -(MA)70-(III-111)30- |
| PA227: | -(MA)80-(III-114)20- |
| PA228: | -(MA)70-(III-120)30- |
| PA229: | -(MA)60-(III-123)40- |
| PA230: | -(MA)70-(III-125)30- |
| PA231: | -(MA)60-(III-125)40- |
| PA232: | -(MA)50-(III-125)50- |
| PA233: | -(MA)70-(III-126)30- |
| PA234: | -(MA)60-(III-128)40- |
| PA235: | -(MA)50-(III-132)50- |
| PA235: | -(MA)70-(III-133)30- |
| PA237: | -(MA)60-(III-133)40- |
| PA238: | -(MA)70-(III-138)30- |
| PA239: | -(MA)60-(III-138)40- |
| PA240: | -(MA)60-(III-139)40- |
| PA241: | -(MA)60-(III-141)40- |
| PA242: | -(MA)60-(III-142)40- |
| PA243: | -(MA)60-(III-143)40- |

Polymerizable groups may be introduced into the acrylic copolymer. The acrylic copolymer having the polymerizable groups and the rod-like liquid crystal molecules having the polymerizable groups may be used in combination, so that the copolymer and the liquid crystal molecules may be chemically combined through the interface between the liquid crystal layer and the orientation layer. If so, an optically anisotropic element comprising the rod-like liquid crystal molecules can be improved in durability.

The polymerizable groups in the copolymer are reacted with those (Qs) of the liquid crystal molecules so as to chemically combine them through the interface between the liquid crystal layer and the orientation layer. Accordingly, the polymerizable group of the copolymer is determined according to that of the liquid crystal molecules. As described above, the polymerizable group (Q) of the liquid crystal molecule preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6). Also the polymerizable group of the copolymer preferably is an unsaturated polymerizable group, an epoxy group or an aziridinyl group, more preferably is an unsaturated polymerizable group, and most preferably is an ethylenically unsaturated group.

In the acrylic copolymer, the main chain preferably connects to the polymerizable group through a linking group. Examples of the linking group include —CO—, —CO—O—, —CO—NH—, —CO—NH-alkylene-, —CO—NH-alkylene-O—, —CO—NH-alkylene-CO—O—, —CO—NH-alkylene-O—CO—, —CO—NH-alkylene-CO—NH—, —CO-alkylene-O—CO—, —CO-arylene-O-alkylene-O—CO—, —CO-arylene-O-alkylene-O—, —CO-arylene-O-alkylene- or —CO-alkylene-O—CO—. In each example, the left and right sides connect to the main chain and the polymerizable group, respectively.

The above alkylene group may have a branched or cyclic structure. The alkylene group has preferably 1 to 30, more preferably 1 to 20, further preferably 1 to 15, most preferably 1 to 12 carbon atoms.

The above arylene group is preferably phenylene or naphthylene, more preferably phenylene, and most preferably p-phenylene. The arylene group may have a substituent group. Examples of the substituent group include a halogen atom (F, Cl, Br), carboxyl, cyano, nitro, carbamoyl, sulfamoyl, an alkyl group, a cycloalkyl group, an alkoxy group, an alkylthio group, an acyl group, an acyloxy group, an alkyl-substituted carbamoyl group, an alkyl-substituted sulfamoyl group, an amido group, a sulfoneamido group and an alkylsulfonyl group.

The above alkyl group may have a branched structure. The alkyl group has preferably 1 to 20, more preferably 1 to 15, further preferably 1 to 10, most preferably 1 to 6 carbon atoms.

The above cycloalkyl group is preferably cyclohexyl.

The above alkoxy group may have a branched structure. The alkoxy group has preferably 1 to 20, more preferably 1 to 15, further preferably 1 to 10, most preferably 1 to 6 carbon atoms.

The above alkylthio group may have a branched structure. The alkylthio group has preferably 1 to 20, more preferably 1 to 15, further preferably 1 to 10, most preferably 1 to 6 carbon atoms.

The above acyl group has preferably 2 to 20, more preferably 2 to 15, further preferably 2 to 10, most preferably 2 to 6 carbon atoms.

The above acyloxy group has preferably 2 to 20, more preferably 2 to 15, further preferably 2 to 10, most preferably 2 to 6 carbon atoms.

The above alkyl-substituted carbamoyl group has preferably 2 to 20, more preferably 2 to 15, further preferably 2 to 10, most preferably 2 to 6 carbon atoms. The alkyl moiety of the alkyl-substituted carbamoyl group may further have a substituent group (e.g., an alkoxy group).

The above alkyl-substituted sulfamoyl group has preferably 2 to 20, more preferably 2 to 15, further preferably 2 to 10, most preferably 2 to 6 carbon atoms. The alkyl moiety of the alkyl-substituted sulfamoyl group may further have a substituent group (e.g., an alkoxy group).

The above amido group has preferably 2 to 20, more preferably 2 to 15, further preferably 2 to 10, most preferably 2 to 6 carbon atoms.

The above sulfonamido group has preferably 1 to 20, more preferably 1 to 15, further preferably 1 to 10, most preferably 1 to 6 carbon atoms.

The above alkylsulfonyl group has preferably 1 to 20, more preferably 1 to 15, further preferably 1 to 10, most preferably 1 to 6 carbon atoms. The alkyl moiety of the alkylsulfonyl group may further have a substituent group (e.g., an alkoxy group).

The side chain may have two or more polymerizable groups.

The polymerizable group may be introduced into a side chain of a repeating unit or into a repeating unit represented by the formula (III). In the former case, the repeating unit having a side chain with a polymerizable group is preferably represented by the formula (IV).

$$\mathrm{-CH_2-\underset{\underset{CO-L^{11}-Q}{|}}{\overset{R^3}{\underset{|}{C}}}-} \qquad (IV)$$

In the formula (IV), $R^3$ is hydrogen or methyl.

In the formula (IV), $L^{11}$ is a linking group selected from the group consisting of —NH-alkylene-O—CO—, -alkylene-O—CO—, —O-alkylene-O—CO—, —O-arylene-O-alkylene-O—CO—, —O-arylene-O-alkylene-, —O-arylene-O—, —NH-alkylene-O—CO—, —NH-alkylene-O— and —NH-alkylene-. Preferred are —NH-alkylene-O—CO—, -alkylene-O—CO—, —O-alkylene-O—CO—, —O-arylene-O-alkylene-O—CO—, —O-arylene-O— or —NH-alkylene-O—CO—. Particularly preferred is —NH-alkylene-O—CO—.

The alkylene group may have a branched or cyclic structure. The alkylene group has preferably 1 to 30, more preferably 1 to 20, further preferably 1 to 15, most preferably 1 to 12 carbon atoms.

The arylene group is preferably phenylene or naphthylene, more preferably phenylene, and most preferably p-phenylene. The arylene group may have a substituent group. Examples of the substituent group are the same as those described above.

In the formula (IV), Q is a polymerizable group, which is preferably the same as the polymerizable group (Q) of the rod-like liquid crystal molecule.

Examples of the repeating unit having a side chain with a polymerizable group are shown below.

$$\mathrm{-CH_2-CH-} \atop \mathrm{\underset{CO-NH-(CH_2)_2-O-CO-\underset{|}{\overset{CH_3}{C}}=CH_2}{|}} \qquad (IV\text{-}1)$$

$$\mathrm{-CH_2-CH-} \atop \mathrm{\underset{CO-(CH_2)_2-O-CO-CH=CH_2}{|}} \qquad (IV\text{-}2)$$

$$\mathrm{-CH_2-CH-} \atop \mathrm{\underset{CO-O-(CH_2)_2-O-CO-CH=CH_2}{|}} \qquad (IV\text{-}3)$$

$$\mathrm{-CH_2-CH-} \atop \mathrm{\underset{CO-O-\langle C_6H_4 \rangle-O-(CH_2)_4-O-CO-CH=CH_2}{|}} \qquad (IV\text{-}4)$$

$$\mathrm{-CH_2-CH-} \atop \mathrm{\underset{CO-O-\langle C_6H_4 \rangle-O-(CH_2)_4-epoxide}{|}} \qquad (IV\text{-}5)$$

$$\mathrm{-CH_2-CH-} \atop \mathrm{\underset{CO-O-\langle C_6H_4 \rangle-O-(CH_2)_4-aziridine}{|}} \qquad (IV\text{-}6)$$

$$\mathrm{-CH_2-CH-} \atop \mathrm{\underset{CO-O-\langle C_6H_4 \rangle-O-CH=CH_2}{|}} \qquad (IV\text{-}7)$$

$$\mathrm{-CH_2-CH-} \atop \mathrm{\underset{CO-NH-(CH_2)_2-O-CO-CH=CH_2}{|}} \qquad (IV\text{-}8)$$

$$\mathrm{-CH_2-CH-} \atop \mathrm{\underset{CO-NH-(CH_2)_3-O-CH=CH_2}{|}} \qquad (IV\text{-}9)$$

$$\mathrm{-CH_2-CH-} \atop \mathrm{\underset{CO-NH-(CH_2)_4-epoxide}{|}} \qquad (IV\text{-}10)$$

$$\mathrm{-CH_2-CH-} \atop \mathrm{\underset{CO-NH-(CH_2)_4-aziridine}{|}} \qquad (IV\text{-}11)$$

$$\mathrm{-CH_2-CH-} \atop \mathrm{\underset{CO-O-CH_2-\underset{|}{\overset{OH}{CH}}-CH_2-O-CO-\underset{|}{\overset{CH_3}{C}}=CH_2}{|}} \qquad (IV\text{-}12)$$

In the case where the acrylic copolymer contains the repeating unit having a side chain with a polymerizable group, the amount of that repeating unit is preferably in the range of 0.1 to 10 mol. %, more preferably in the range of 3 to 5 mol. %.

In the case where the polymerizable group may be introduced into a repeating unit represented by the formula (III), the polymerizable group is preferably a substituent group of an aromatic or aromatic heterocyclic group, more preferably a substituent group of an aromatic or aromatic heterocyclic group at the terminal position.

The polymerizable group preferably connects to the aromatic or aromatic heterocyclic group through a linking group. Examples of the linking group include —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene-, —O-alkylene- and -alkylene-O—. In each example, the left and right sides connect to the aromatic or aromatic heterocyclic ring and the polymerizable group, respectively.

The alkylene group may have a branched or cyclic structure. The alkylene group preferably has 1 to 30, more preferably has 1 to 20, further preferably has 1 to 15, and most preferably has 1 to 12 carbon atoms.

The alkenylene or alkynylene group may have a branched or cyclic structure. The alkenylene or alkynylene group has preferably 2 to 30, more preferably 2 to 20, further preferably 2 to 15, most preferably 2 to 12 carbon atoms.

The aromatic or aromatic heterocyclic ring may have two or more polymerizable groups as substituent groups.

The repeating unit of the formula (III) having a polymerizable group is preferably represented by the formula (V).

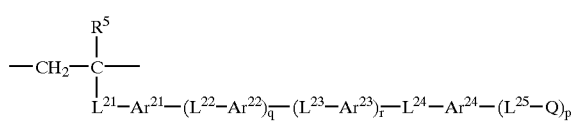

(V)

In the formula (V), R$^5$ is hydrogen or methyl.

In the formula (V), L$^{21}$ is a single bond or a linking group selected from the group consisting of —CO—, —CO—NH—, -alkylene-, —CO—NH-alkylene-, —CO—NH-alkylene-O—, —CO—NH-alkylene-CO—O— and —CO—NH-alkylene-CO—NH—. Preferred are —CO—, —CO—NH— and -alkylene-, and particularly preferred is —CO—NH—.

The alkylene group may have a branched or cyclic structure. The alkylene group has preferably 1 to 30, more preferably 1 to 20, further preferably 1 to 15, most preferably 1 to 12 carbon atoms.

In the formula (V), each of L$^{22}$, L$^{23}$, L$^{24}$ and L$^{25}$ is independently a single bond or a linking group selected from the group consisting of —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene-, —O-alkylene- and -alkylene-O—. Preferably, at least one of L$^{22}$, L$^{23}$ and L$^{24}$ is a single bond or -alkylene-.

In the formula (V), each of Ar$^{21}$, Ar$^{22}$, Ar$^{23}$ and Ar$^{24}$ is independently an aromatic ring or aromatic heterocyclic ring, preferably benzene ring. Particularly preferably each of Ar$^{21}$, Ar$^{22}$ and Ar$^{23}$ is p-phenylene. The aromatic or aromatic heterocyclic ring may have a substituent group. Examples of the substituent group are the same as those of the aromatic or aromatic heterocyclic ring in the formula (III).

In the formula (V), each of q and r is independently 0 or 1. Preferably, q is 0 or 1 while r is 0 (the number of the aromatic or aromatic heterocyclic rings is 2 or 3). It is particularly preferred that q and r be both 0 (the number of the aromatic rings or aromatic heterocyclic rings is 2).

In the formula (V), p is 1, 2 or 3 (preferably 1 or 2, more preferably 1).

Examples of the repeating unit having 2 to 4 aromatic or aromatic heterocyclic ring and a polymerizable group at the side chain are shown below.

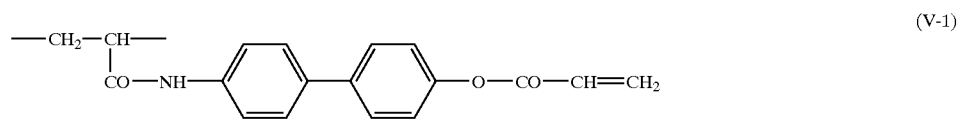

(V-1)

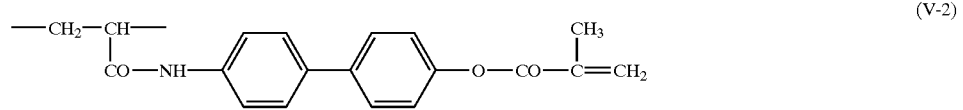

(V-2)

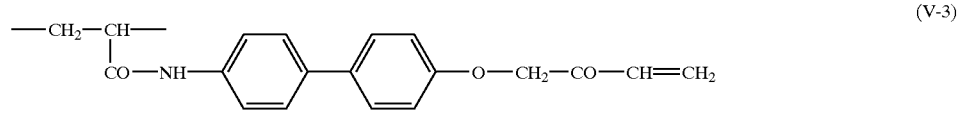

(V-3)

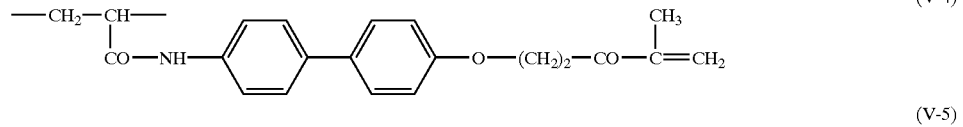

(V-4)

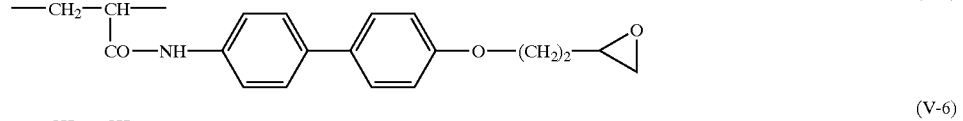

(V-5)

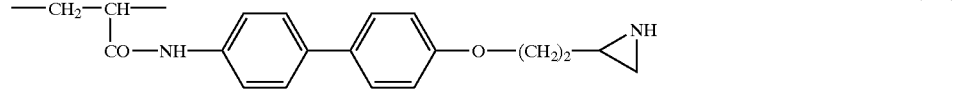

(V-6)

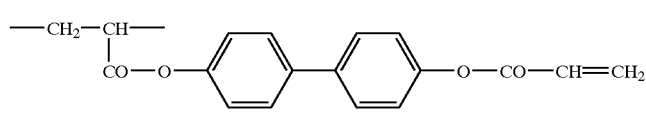
(V-7)

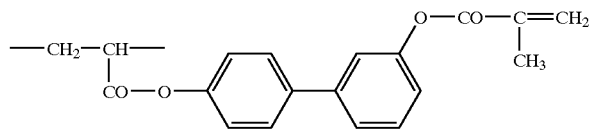
(V-8)

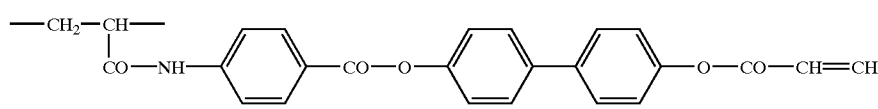
(V-9)

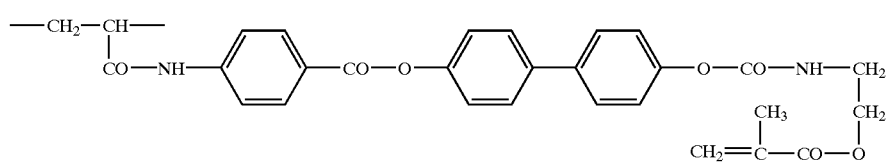
(V-10)

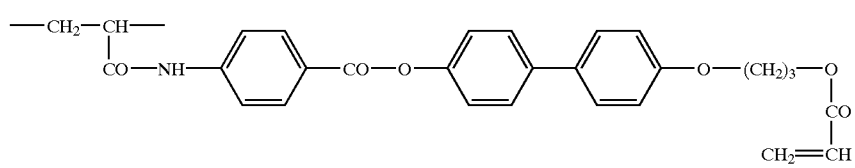
(V-11)

An acrylic copolymer having two or more of the above repeating units in combination may be used. For example, the acrylic copolymers having the repeating units (II), (III) and (IV) in combination, having the repeating units (II), (IV) and (V) in combination, and having the repeating units (II), (III), (IV) and (V) in combination are usable.

Two or more acrylic copolymers may be used in combination.

The acrylic copolymer may be cross-linked. The cross-linking reaction is preferably conducted while or after the coating solution for the orientation layer is applied. For example, a cross-linking agent makes cross-links in the copolymer by the cross-linking reaction between carboxyl groups in the copolymer and the agent. The cross-linking agent is described in detail in S. Yamashita and T. Kaneko, 'Handbook of cross-linking agent (written in Japanese)', Taiseisha. Examples of the cross-linking agents include methylolphenol resin, amino resins (e.g., resins prepared by addition polymerization of melamine, benzoguanamine or urea with formaldehyde or alcohol), amine compounds, triazine compounds, isocyanate compounds, epoxy compounds, metal oxides, metal halides compounds, organic metal halide compounds, organic acid metal salts, metal alkoxides and compounds containing oxazoline groups.

The amount of the cross-linking agent is preferably in the range of 0.1 to 20 wt. %, more preferably in the range of 0.5 to 15 wt. % based on the amount of the orientation layer. In the resultant orientation layer, the cross-linking agent remains preferably in the range of 1.0 wt. % or less, more preferably in the range of 0.5 wt. % or less based on the amount of the orientation layer.

The acrylic copolymer is applied to form a layer, which is then subjected to rubbing treatment to form an orientation layer. In the rubbing treatment, the surface of the layer is rubbed several times with paper, cloth or rubber along a certain direction (usually along the longitudinal direction).

In forming the orientation layer, a precursor of the acrylic copolymer may be applied and then heated to cause condensation polymerization before the rubbing treatment.

The thickness of the orientation layer is preferably in the range of 0.01 to 10 $\mu$m, more preferably in the range of 0.05 to 5 $\mu$m, most preferably in the range of 0.1 to 1 $\mu$m.

After the rod-like liquid crystal molecules in the liquid crystal layer are aligned on the orientation layer, the liquid crystal layer may be transferred onto a transparent support. The rod-like liquid crystal molecules fixed with the alignment maintained can keep the alignment without the orientation layer.

The orientation layer is preferably formed by the steps of: applying onto a support a coating solution containing the acrylic copolymer to form a coating layer, drying the coating layer, subjecting the surface of the layer to the rubbing treatment, and heating the rubbed layer.

In the heating step, the layer is heated preferably in the range of 50 to 300° C., more preferably in the range of 50 to 250° C., further preferably in the range of 100 to 250° C.

For heating the layer, the layer on the support is brought into contact with a heating media (preferably, a hot plate) heated at the above temperature. Otherwise, the support with the layer may be left in a container heated at the above temperature, or the layer may be blown directly or along the rubbing direction by hot gas (preferably, air) heated at the above temperature. The time for heating is determined according to the heating temperature. The lower the temperature is, the longer time the layer must be heated for. For example, if the temperature is 100° C., 130° C. or 160° C., the heating time is in the range of 1 to 30 minutes, 30 seconds to 10 minutes, or 10 seconds to 3 minutes, respectively. The interval between the rubbing treatment and the heating treatment is preferably within a week, more preferably within three days, most preferably within three hours.

[Support]

The support of the optically anisotropic element is preferably transparent. Here, the term 'transparent' means that light transmittance is not less than 80%.

As the transparent support, an optically isotropic polymer film is generally used. Here, the term 'optical isotropic' means that retardation values in plane (Re) and along the thickness direction (Rth) are both preferably less than 10 nm, more preferably less than 5 nm. The Re and Rth retardation values are defined by the following formulas:

$$Re=(nx-ny)\times d$$

$$Rth=[\{(nx+ny)/2\}-nz]\times d$$

in which each of nx and ny is a refractive index in plane; nz is a refractive index along the thickness; and d is the thickness of the transparent support.

According to mode of the liquid crystal display, there is a case that an optically anisotropic polymer film is used as the transparent support. In that case, the optically anisotropic support is preferably optically monoaxial or biaxial. If the support is optically monoaxial, it may be either optically positive (the refractive index parallel to the optical axis is larger than that perpendicular to the optical axis) or optically negative (the refractive index perpendicular to the optical axis is larger than that parallel to the optical axis). In the case that the support is optically biaxial, the values of nx, ny and nz in the above formula are all different from each other.

In the optically anisotropic transparent support, a retardation value in plane (Re) is preferably in the range of 10 to 1,000 nm, more preferably in the range of 15 to 300 nm, and most preferably in the range of 20 to 200 nm. A retardation value along the thickness direction (Rth) is preferably in the range of 10 to 1,000 nm, more preferably in the range of 15 to 300 nm, and most preferably in the range of 20 to 200 nm.

Materials for the transparent support are determined according to whether it is optically isotropic or optically anisotropic. The optically isotropic transparent support is generally made of glass or cellulose ester. The optically anisotropic transparent support is generally made of synthetic polymers (e.g., polycarbonate, polysulfone, polyethersulfone, polyacrylate, polymethacrylate, norbornene resin). According to European Patent No. 0,911,656 A2, an optically anisotropic cellulose ester film (giving high retardation) can be prepared (1) with a retardation increasing agent, (2) from a cellulose ester having a low acetylation degree or (3) according to the cooling dissolution method.

The transparent support of polymer film is formed preferably according to the solvent casting method.

The optically anisotropic transparent support is preferably obtained by stretching a polymer film.

The optically monoaxial support can be obtained by a normal monoaxial or biaxial stretching.

The optically biaxial support is preferably produced by unbalance biaxial stretching. The procedure of unbalance biaxial stretching comprises the steps of: stretching a film along one direction to expand by a certain extent (e.g., 3 to 100%, preferably 5 to 30%), and then stretching the film vertically to the direction of the first stretching to expand by a more extent than that in the first stretching (e.g., 6 to 200%, preferably 10 to 90%). In the procedure, the film may be stretched along the two vertical directions at the same time.

The direction of stretching (direction of high extension in the case of unbalance biaxial stretching) is preferably essentially parallel to the slow axis in plane of the stretched film. Here 'essentially parallel' means that the angle between the stretching direction and the slow axis is preferably in the range of less than 10°, more preferably less than 5°, most preferably less than 3°.

The transparent support has a thickness preferably in the range of 10 to 500 μm, and more preferably in the range of 50 to 200 μm.

The transparent support can be subjected to a surface treatment (e.g., glow discharge treatment, corona discharge treatment, ultraviolet (UV) treatment, flame treatment) to improve adhesion to a layer formed on the support (e.g., adhesive layer, orientation layer, optically anisotropic layer). The support may contain UV absorber.

An adhesive layer (undercoating layer) can be provided on the transparent support. Japanese Patent Provisional Publication No. 7(1995)-333433 describes the adhesive layer. The adhesive layer has a thickness preferably in the range of 0.1 to 2 μm, more preferably 0.2 to 1 μm.

[Liquid Crystal Display]

The optically anisotropic element can be used as an optical compensatory sheet in a liquid crystal cell of various display modes. Examples of the display modes include TN (twisted nematic) mode, IPS (inplane switching) mode, FLC (ferroelectric liquid crystal) mode, OCB (optically compensatory bend) mode, STN (super twisted nematic) mode, VA (vertically aligned) mode and ECB (electrically controlled birefringence) mode, HAN (hybrid aligned nematic) mode and GH (guest-host) mode. For any display mode, the optically anisotropic element of the invention can be used as an optical compensatory sheet.

EXAMPLE 1

Acrylic copolymer (PA210) and sodium hydroxide (neutralizing agent) were added to a mixed solvent of methanol and water (weight ratio: 30/70) to prepare a 4 wt. % solution. The solution was applied on a glass support by means of a bar coater, to form a layer of 1 μm thickness. The layer was heated and dried at 120° C. for 5 minutes, and then subjected to the rubbing treatment. Thus, an orientation layer is formed.

On the above-prepared orientation layer, the following coating solution was applied to form a layer of 0.7 μm thickness.

| Coating solution for liquid crystal layer | |
|---|---|
| Rod-like liquid crystal molecules (N26) | 100 weight parts |
| Alignment promoter (33) | 0.5 weight part |
| Methyl ethyl ketone | 400 weight parts |

The formed layer was heated at 100° C. for 1 minute to align the rod-like liquid crystal molecules. Thus, an optically anisotropic element was produced. The alignment of the rod-like liquid crystal molecules in the liquid crystal layer was observed with a polarizing microscope, and thereby it was confirmed that the liquid crystal molecules were aligned at the angle of 90° to the support (namely, in a vertical (homeotropic) alignment).

EXAMPLE 2

The procedure of Example 1 was repeated except that acrylic polymer (PA242) was used in place of PA210, to produce an optically anisotropic element was produced.

The alignment of the rod-like liquid crystal molecules in the liquid crystal layer was observed with a polarizing microscope, and thereby it was confirmed that the liquid crystal molecules were aligned at the angle of 90° to the support (namely, in a vertical (homeotropic) alignment).

EXAMPLE 3

The procedure of Example 1 was repeated except that alignment promoter (29) was used in place of (33) in the same amount, to produce an optically anisotropic element was produced.

The alignment of the rod-like liquid crystal molecules in the liquid crystal layer was observed with a polarizing microscope, and thereby it was confirmed that the liquid crystal molecules were aligned at the angle of 90° to the support (namely, in a vertical (homeotropic) alignment).

EXAMPLE 4

Acrylic copolymer (PA210) and sodium hydroxide (neutralizing agent) were added to a mixed solvent of methanol and water (weight ratio: 30/70) to prepare a 4 wt. % solution. The solution was continuously applied by means of a bar coater on a transferring cellulose acetate film support, to form a layer of 1 μm thickness. The layer was heated and dried at 120° C. for 5 minutes, and then continuously subjected to the rubbing treatment. Thus, an orientation layer is formed.

On the above-prepared orientation layer, the following coating solution was continuously applied to form a layer.

| Coating solution for liquid crystal layer | |
| --- | --- |
| Rod-like liquid crystal molecules (N26) | 100 weight parts |
| Alignment promoter (33) | 0.5 weight part |
| Photopolymerization initiator (Irgacure 907, Ciba-Geigy) | 3 weight parts |
| Sensitizer (Kayacure DETX, Nippon Kayaku Co., Ltd.) | 1 weight part |
| Methyl ethyl ketone | 400 weight parts |

The formed layer was heated at 100° C. for 1 minute to align the rod-like liquid crystal molecules. While the temperature was kept at 100° C., the layer was exposed to ultraviolet light of 400 mJ/cm² for 4 seconds to polymerize the molecules and thereby to fix the alignment of the molecules. Thus, a liquid crystal layer was formed to produce an optically anisotropic element. The optical axis of the device was found to be perpendicular to the substrate, and this meant that the liquid crystal molecules were aligned and fixed at the angle of 90° to the support (namely, in a vertical (homeotropic) alignment).

We claim:

1. A process for alignment of rod-like liquid crystal molecules, which comprises the steps of: forming an orientation layer for vertical alignment on a support; and forming a liquid crystal layer containing rod-like liquid crystal molecules and a compound represented by the formula (I) on the orientation layer to align the rod-like liquid crystal molecules at an average inclined angle of 50 to 90°:

$$(Hb—L^1—Cy^1—L^2—)_n Cy^2 \quad (I)$$

in which Hb is an aliphatic group having 6 to 40 carbon atoms or a siloxanoxy group substituted with an aliphatic group having 6 to 40 carbon atoms; $L^1$ is a single bond or a divalent linking group selected from the group consisting of an alkylene group, a fluorine-substituted alkylene group, —O—, —S—, —CO—, —NR—, —SO$_2$— and a combination thereof, wherein R is hydrogen or an alkyl group having 1 to 30 carbon atoms; $Cy^1$ is a divalent aromatic group or a divalent heterocyclic group; $L^2$ is a single bond or a divalent linking group selected from the group consisting of an alkylene group, an alkenylene group, an alkynylene group, —O—, —S—, —CO—, —NR—, —SO$_2$— and a combination thereof, wherein R is hydrogen or an alkyl group having 1 to 30 carbon atoms; n is 2, 3 or 4; and $Cy^2$ is an n-valent aromatic group or an n-valent heterocyclic group.

2. The process as defined in claim 1, wherein Hb in the formula (I) is a fluorine-substituted aliphatic group having 6 to 40 carbon atoms.

3. The process as defined in claim 1, wherein Hb in the formula (I) is a branched aliphatic group having 6 to 40 carbon atoms.

4. The process as defined in claim 1, wherein $L^1$ in the formula (I) is a divalent linking group selected from the group consisting of an alkylene group, —O—, —S—, —CO—, —NR—, —SO$_2$— and a combination thereof, wherein R is hydrogen or an alkyl group having 1 to 20 carbon atoms.

5. The process as defined in claim 1, wherein $Cy^1$ in the formula (I) is a divalent aromatic group.

6. The process as defined in claim 5, wherein $Cy^1$ is a divalent aromatic group to which another aromatic ring is connected through a single bond, a vinylene bond or a ethynylene bond.

7. The process as defined in claim 1, wherein $L^2$ in the formula (I) is a divalent linking group selected from the group consisting of —O—, —S—, —CO—, —NR—, —SO$_2$— and a combination thereof, wherein R is hydrogen or an alkyl group having 1 to 20 carbon atoms.

8. The process as defined in claim 1, wherein n in the formula (I) is 3 or 4.

9. The process as defined in claim 1, wherein $Cy^2$ in the formula (I) is an n-valent benzene residue or an n-valent aromatic heterocyclic residue.

10. The process as defined in claim 1, wherein the orientation layer for vertical alignment comprises a copolymer, which comprises repeating units represented by the formulas (II) and (III):

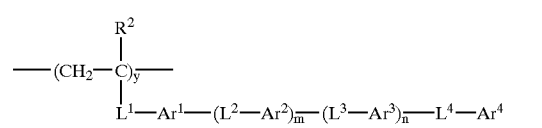

wherein in formulas (II) and (III), each of $R^1$ and $R^2$ independently is hydrogen, a halogen atom or an alkyl group having 1 to 6 carbon atoms; M is a proton, an alkali metal ion or an ammonium ion; $L^1$ is a divalent linking group selected from the group consisting of —O—, —CO—, —NH—, an alkylene group and a combination thereof; each of $L^2$, $L^3$ and $L^4$ independently is a single bond or a divalent linking group selected from the group consisting of —O—, —CO—, —NH—, —SO$_2$—, an alkylene group, an alkenylene group, an alkynylene group and a combination thereof; each of $Ar^1$, $Ar^2$, $Ar^3$ and $Ar^4$ independently is an aromatic hydrocarbon ring, a substituted aromatic hydrocarbon ring, an aromatic heterocyclic ring or a substituted aromatic heterocyclic ring, each of m and n independently is 0 or 1; x represents 10 to 95 mol. %; and y represents 5 to 90 mol. %.

11. The process as defined in claim 10, wherein in formula (III), at least one of $L^2$, $L^3$ and $L^4$ is ethynylene.

12. The process as defined in claim 1, wherein the rod-like liquid crystal molecules have polymerizable groups, and the process further comprises a step of polymerizing the rod-like liquid crystal molecules to fix alignment of the molecules after the step of forming a liquid crystal layer.

13. The process as defined in claim 12, wherein the orientation layer for vertical alignment comprises a polymer having polymerizable groups, and the process further comprises a step of polymerizing the rod-like liquid crystal molecules and the polymerizable polymer to fix alignment of the molecules after the step of forming a liquid crystal layer.

14. The process as defined in claim 10, wherein the copolymer further has polymerizable groups.

15. An optically anisotropic element comprising a transparent support and a liquid crystal layer containing rod-like liquid crystal molecules, wherein the rod-like liquid crystal molecules are aligned at an average inclined angle of 50 to 90°, and the liquid crystal layer further contains a compound represented by the formula (I) in an amount of 0.01 to 20 wt. % based on the amount of the liquid crystal molecules:

 (I)

in which Hb is an aliphatic group having 6 to 40 carbon atoms or a siloxanoxy group substituted with an aliphatic group having 6 to 40 carbon atoms; $L^1$ is a single bond or a divalent linking group selected from the group consisting of an alkylene group, a fluorine-substituted alkylene group, —O—, —S—, —CO—, —NR—, —SO$_2$— and a combination thereof, wherein R is hydrogen or an alkyl group having 1 to 30 carbon atoms; $Cy^1$ is a divalent aromatic group or a divalent heterocyclic group; $L^2$ is a single bond or a divalent linking group selected from the group consisting of an alkylene group, an alkenylene group, an alkynylene group, —O—, —S—, —CO—, —NR—, —SO$_2$— and a combination thereof, wherein R is hydrogen or an alkyl group having 1 to 30 carbon atoms; n is 2, 3 or 4; and $Cy^2$ is an n-valent aromatic group or an n-valent heterocyclic group.

16. The optically anisotropic element as defined in claim 15, wherein the rod-like liquid crystal molecules are polymerized while keeping the alignment.

* * * * *